United States Patent [19]

Takagi

[11] Patent Number: 5,590,251
[45] Date of Patent: Dec. 31, 1996

[54] COLOR REPRODUCING DEVICE FOR REPRODUCING MATCHED COLORS AND AN OUTPUTTING DEVICE FOR OUTPUTTING INFORMATION FOR REPRODUCING A COLOR OF A COATED SURFACE

[75] Inventor: Atsushi Takagi, Toyota, Japan

[73] Assignee: Toyota Jidosha Kabushiki Kaisha, Toyota, Japan

[21] Appl. No.: 286,350

[22] Filed: Aug. 5, 1994

[30] Foreign Application Priority Data

| Aug. 6, 1993 | [JP] | Japan | 5-196082 |
| Nov. 30, 1993 | [JP] | Japan | 5-300386 |

[51] Int. Cl.$^6$ .................................................. G06T 15/50
[52] U.S. Cl. .................................................. 395/131
[58] Field of Search .................... 395/130–131, 395/129, 127, 126, 9

[56] References Cited

U.S. PATENT DOCUMENTS

| 4,457,718 | 7/1984 | Lerner | 434/98 |
| 4,477,833 | 10/1984 | Clark et al. | 358/525 |
| 4,605,687 | 8/1986 | Panush | 523/171 |
| 4,615,940 | 10/1986 | Panush et al. | 428/324 |
| 4,959,711 | 9/1990 | Hung et al. | 358/80 |
| 4,971,841 | 11/1990 | Panush et al. | 427/407.1 |
| 5,033,857 | 7/1991 | Kubota et al. | 356/402 |
| 5,045,933 | 9/1991 | Tatsumi | 358/80 |
| 5,056,234 | 11/1991 | Hung et al. | 358/80 |
| 5,151,751 | 9/1992 | Nakajima et al. | 356/402 |
| 5,185,661 | 2/1993 | Ng | 358/75 |
| 5,231,472 | 7/1993 | Marcus et al. | 356/402 |
| 5,231,504 | 7/1993 | Magee | 358/75 |
| 5,255,350 | 10/1993 | Hermann et al. | 395/109 |
| 5,296,923 | 3/1994 | Hung | 358/527 |
| 5,315,380 | 5/1994 | Ingraham et al. | 358/500 |
| 5,317,425 | 5/1994 | Spence et al. | 358/504 |
| 5,333,069 | 7/1994 | Spence | 358/517 |
| 5,363,318 | 11/1994 | McCauley | 364/571.01 |
| 5,386,496 | 1/1995 | Arai et al. | 395/22 |
| 5,412,491 | 5/1995 | Bachar | 358/500 |
| 5,416,890 | 5/1995 | Beretta | 395/131 |

FOREIGN PATENT DOCUMENTS

| 62-149760 | 7/1987 | Japan . |
| 64-1151 | 1/1989 | Japan . |
| 488584 | 3/1992 | Japan . |
| 5322657 | 12/1993 | Japan . |
| 5324850 | 12/1993 | Japan . |
| 5322655 | 12/1993 | Japan . |
| WO9120047 | 12/1991 | WIPO . |

OTHER PUBLICATIONS

R. A. Prosser et al., "Color Matching Spanning the Visible and Near–Infra: Use of the Cubic Spline Function in Interpolation", Technical Report Natick/TR–90/006, Nov., 1989.
E. Allen, "Basic Equations Used in Computer Color Matching", J. Opt. Soc. Am., vol. 56, No. 9, pp. 1256–1259, 1966.

(List continued on next page.)

*Primary Examiner*—Heather R. Herndon
*Assistant Examiner*—Rudolph Buchel
*Attorney, Agent, or Firm*—Cushman, Darby & Cushman

[57] ABSTRACT

By inputting a predetermined number of first data to a color reproducing device, a predetermined number of reproduced colors are respectively measured, and a plurality of relationships of correspondence between inputted first data and measured second data are determined. On the basis of the plurality of relationships of correspondence between the first data and the second data, relationships of interpolated correspondence, which express relationships between second data other than the measured second data and first data corresponding to the second data other than the measured second data, are estimated. After second data which is the same as or closest to a color to be reproduced is selected, first data corresponding to selected second data is selected on the basis of the relationships of correspondence and the relationships of interpolated correspondence. Selected first data is then inputted to the color reproducing device, and a color to be reproduced is reproduced.

16 Claims, 63 Drawing Sheets

OTHER PUBLICATIONS

E. Allen, "Basic Equations Used in Computer Color Matching, II. Tristimulus Match, Two–Constant Theory", J. Opt. Soc. Am., vol. 64, No. 7, pp. 991–993, 1974.

"Image Processing for Color Reproduction", Imaging Part 1, Supplementary vol. Kodera, 1988 pp. 44–55 (Shashin Kogyo and compiled by the Electrophotography Society.

A. Takagi et al, "Accurate Rendering Technique Based on Colorimetric Conception:", Computer Graphics, vol. 24 No. 4, 1990, pp. 263–272.

T. Oshima et al, "System for Color Design of a Car", Eurographics '92, vol. 11 No. 3, 1992 pp. C381–C390.

A. Tagaki et al, "Rendering Technique Based on Colorimetric Conception", Computer Graphics, vol. 24, No. 4, 1990 pp. 263–272.

Foley, James D., et al, *Computer Graphics: Principles and Practices*, Addison–Wesley Publishing Co., 2nd ed. pp. 574–589 and 754–773, (1990).

Haskell, Barry H., "Interpolative, Predictive and Pyramid Transform Coding of Color Images", *ICASSP '88: Acoustics, Speech and Signal Processing Conference*, 1988, pp. 785–787.

Meyer, Gary W., et al, "Color–Defective Vision—Color–Defective Vision and Computer Graphic Displays", *IEEE Computer Graphics and Applications Magazine*, Sep. 1988, vol. 8, Iss. 5, pp. 28–40.

Abe, Satoshi et al, "A Neural Network Approach for RGB to YMCK Color Conversion", *Tecon '94–1994 IEEE Region 10 Conference on Frontiers of . . .* , 1994, pp. 6–9.

Kleiman, Larry, "XYZ Technology", *Instruments and Measurement Technology Conference*, 1992, pp. 84–89.

Trussel, H. J., "DSP Solutions Run the Gamut for Color Systems", *IEEE ASSP Magazine*, Apr. 1993, vol. 10, Iss. 2, pp. 8–23.

Lee, Hsien–Che, et al, "Modeling Light Reflection For Computer Color Vision", *IEEE transactions on Pattern Analysis and Machine Intelligence*, Apr. 1990, vol. 12, Iss. 4, pp. 402–409.

Wolff, Lawrence B., "Diffuse Reflection", *Computer Vision and Pattern Recognition (CVPR)*, 1992, pp. 472–478.

Yaohua, Pang et al, "Development of Anti–Glare Coating for High Resolution Color Display Tubes", *Electronic Manufacturing, 1991 11th IEEE/CHMT International Symposium*, 1991, pp. 371–373.

Onishi, Hiroshi et al, "Thermal Dissolution Ink Transfer for Full–Color Printing", *IEEE Transactions on Electron Devices*, Jan. 1993, pp. 69–74.

Dias, Maria Lurdes, "Ray Tracing Interference Color", *IEEE Computer Graphics and Applications Magazine*, Mar. 1991, pp. 54–60.

Sato, Yoichi et al, "Temporal–Color Space Analysis of Reflection", *Computer Vision and Pattern Recognition*, 1993, (CVPR), pp. 570–576.

Ikeda, Hiroaki et al, "A Study on Colometric Errors Caused by Quantizing Color Information", *IEEE Transactions on Instrumentation and Measurement*, 1992, pp. 845–849.

Healy, Glen et al, "A Color Metric for Computer Vision", *Computer Vision and Pattern Recognition*, (CVPR), 1988, pp. 10–17.

Robertson, Philip K., "Perceptual Color Spaces", *IEEE Computer Graphics and Applications Magazine*, 1988, pp. 50–64.

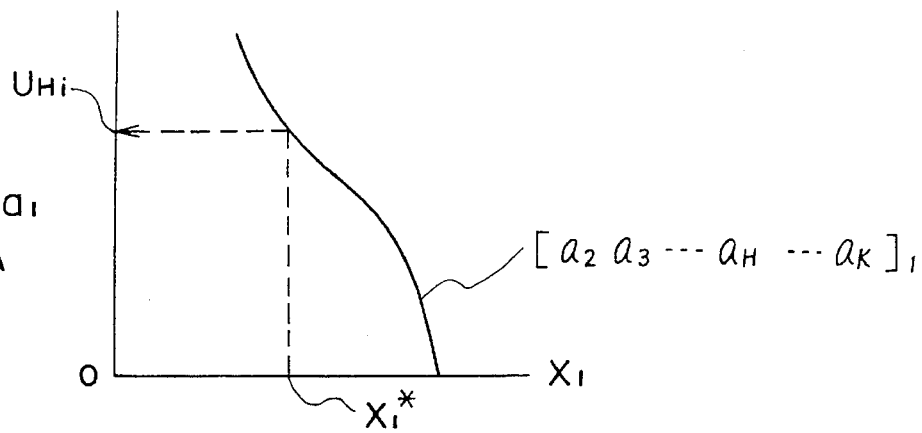
FIG. 24A
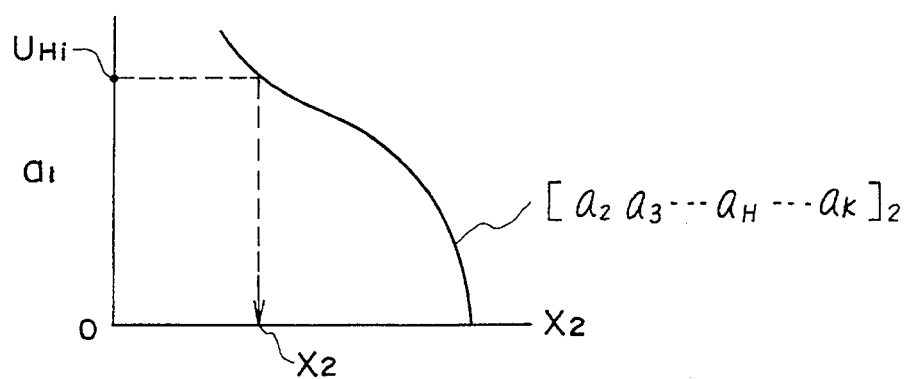
FIG. 24B
FIG. 24C
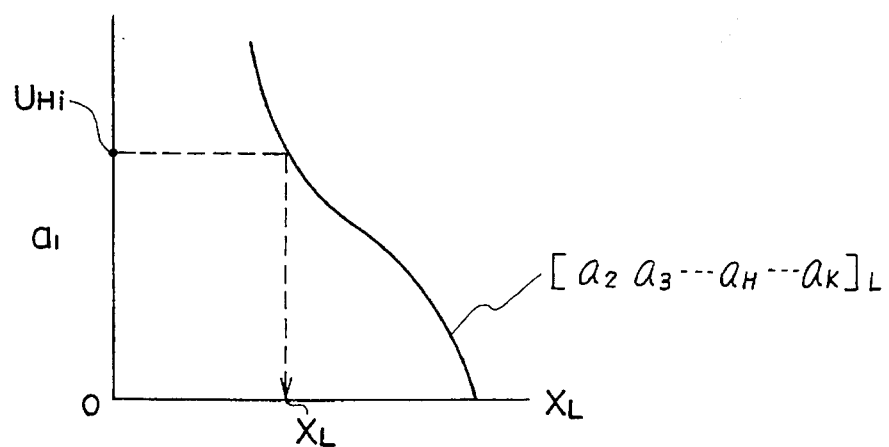

METALLIC COATING

PEARL MICA COATING

SOLID COATING

COLOR REPRODUCING DEVICE FOR REPRODUCING MATCHED COLORS AND AN OUTPUTTING DEVICE FOR OUTPUTTING INFORMATION FOR REPRODUCING A COLOR OF A COATED SURFACE

BACKGROUND OF THE INVENTION

1. Field of the Invention

The present invention relates to a method of color reproduction, a method of reproducing a coating color, and a method of selecting a coating color. More particularly, the present invention concerns a method of color reproduction by determining in advance correlations between input values and an outputted color for reproducing a specific color in an apparatus for color printing, color display, or the like, as well as a method of reproducing a coating color and a method of selecting a coating color so as to reproduce a coating color of a coated surface intended by a designer or the like when obtaining a coated surface by coating the surface with a paint or the like or when displaying a coated surface on a color CRT.

2. Description of the Related Art

As is known, the color of an object surface, a color original image, or the like can be specified in a standardized manner by determining the position where chromaticity coordinates, which are expressed by using tristimulus values X, Y, and Z of the color in the CIE (International Commission on Illumination) standard XYZ colorimetric system, are located in a chromaticity diagram. Namely, if the spectral distribution $I(\lambda)$ of light reflected from or transmitted through the object or the like can be measured, the tristimulus values X, Y, and Z can be determined from the following Formula (1):

$$\begin{pmatrix} X \\ Y \\ Z \end{pmatrix} = \frac{1}{k} \int I(\lambda) \begin{pmatrix} \bar{x}(\lambda) \\ \bar{y}(\lambda) \\ \bar{z}(\lambda) \end{pmatrix} d\lambda \qquad (1)$$

where $k = 100 \cdot \int \{I(\lambda)\bar{y}(\lambda)d\lambda\}$, $\bar{x}(\lambda), \bar{y}(\lambda), \bar{z}(\lambda)$: CIE color matching functions, $\lambda$: wavelength This value Y shows the brightness of the light having $I(\lambda)$, and the color can be specified by plotting points on a chromaticity diagram of an orthogonal coordinate system, in which values of x and y obtained from the following Formulae (2) are set as chromaticity coordinates, and x is plotted as the abscissa and y as the ordinate in a conventionally known manner (all the colors are included within a slanted bell shape):

$x = X/(X+Y+Z)$ $y = Y/(X+Y+Z)$ \qquad (2)

Recently, there has been a need for reproduction of colors which can be specified in a standardized manner as described above. For instance, in the field of design, there has been a demand for color-reproducing techniques which make it possible to faithfully reproduce necessary colors for the purpose of evaluation of color design. As examples of apparatus which require color reproduction of color original images, there are display units for displaying color-reproduced images that are color-reproduced on the basis of color data on color original images, as well as color copying apparatus (color hard-copying apparatus) for copying color-reproduced images that are color-reproduced on the basis of color data on color original images.

As a method of color reproduction during color hard copying in the color hard-copy apparatus, a method of color reproduction is known for faithfully reproducing a necessary color by using image processing (Kodera: "Image Processing for Color Reproduction" in Supplementary Volume "Imaging Part 1" of the Shashin Kogyo (Photo Industry) published by Shashin Kogyo and compiled by the Electrophotography Society).

However, since the color can be specified by the mixing of pigments of YMC colors, RGB signals for the display, or the like, the RGB colorimetric system based on the three primary colors (reference stimuli) is in most cases used as the colorimetric system for specifying actual colors. Hence, conversion of color data in the RGB colorimetric system to and from color data in the XYZ colorimetric system is required.

By taking the aforementioned color copying apparatus as an example, color specification in this color copying apparatus is generally effected by mixing predetermined color materials (R material, G material, and B material) to form a reproduced image (a copy of the original) and output the same. Because respective colors of this reproduced image can be specified by data in the XYZ colorimetric system, i.e., color data using the tristimulus values X, Y, and Z, on the basis of reproducing conditions such as a mixing ratio of the color materials and values of measurement by a spectrophotometer or the like, each of these colors may be considered as a function f for computing the tristimulus values X, Y, and Z using data (r, g, and b) of the color materials as parameters, as shown in the following Formula (3):

$f: (r, g, b) \rightarrow (X, Y, X)$ \qquad (3)

Since the density based on these color materials can generally be changed in 256 gradations for r, g, and b, respectively, it is possible to reproduce a color original image in $256^3$ (=16,777,216) combinations.

Here, since the color data when the color original image is read can be converted to color data in the XYZ colorimetric system, as described above, it is possible to compute the tristimulus values X, Y, and Z of the colors to be reproduced as a reproduced image. Accordingly, if the data (r, g, and b) of the color material, in which the tristimulus values X, Y, and Z, i.e., output values of the function f, are equal to the tristimulus values X, Y, and Z of the color data on the color original image, are determined, color reproduction is possible with high accuracy. For this reason, it is possible to form a reproduced image with a high level of color reproducibility by determining an inverse function $f^{-1}$ of Formula (3) in advance and then by using the data (r, g, and b) on the color material determined by this inverse function $f^{-1}$.

However, in the aforementioned color copying apparatus, since color formation is generally based on the subtractive mixture of color stimuli, Formula (3) above becomes nonlinear. For this reason, it is difficult to determine the inverse function $f^{-1}$. To overcome this problem, it is conceivable to determine and store in advance all of the tristimulus values X, Y, and Z and the data on the color materials with respect to the $256^3$ combinations mentioned above and to extract data on the color materials which are in a relationship of the inverse function $f^{-1}$ during reproduction processing. However, the amount of computation for processing in advance is enormously large, and a storage area for storing the relationships determined also becomes enormously large, so that this scheme is not practically feasible.

In addition, an object surface, such as the body of a vehicle, is formed by a coated surface having a coating color obtained by applying a paint or the like. To obtain a coated surface of a desired coating color intended by a user, a designer, and the like, a paint or the like obtained by mixing a plurality of pigments and the like by using a color sample as a reference is applied to the object.

A method is conventionally known in which, with respect to an object surface having uniform optical properties, the color of the object is reproduced and displayed three-dimensionally and realistically with accuracy with the semblance of the actual object by computing coloring on the basis of a ray tracing method using the reflectance of the object surface, such as the spectral reflectance factor (A. Takagi et al. "Computer Graphics," Vol. 24, No. 4, 1990, and the like). In this method, color specification values (tristimulus values) of the CIE standard XYZ colorimetric system are first determined on the basis of a spectral reflectance factor and the like of the object surface. These tristimulus values are then converted to color specification values peculiar to the colorimetric system through a linear combination transformation, are subjected to $\gamma$ correction, and are converted to RGB gradients, thereby reproducing the object color and displaying an image. According to this method, if the reflectance of the object can be specified, it is possible to reproduce and display the object color. At the same time, the reflectance of the object corresponding to the displayed color can be specified by processing in the reverse order, and virtual color components for obtaining the displayed color can be determined. It is possible to obtain a desired coating color, if the object is coated with a paint or the like obtained by mixing a plurality of pigments and the like in quantities corresponding to the quantities of these color components.

However, the setting of a ratio of mixing or compounding pigments for obtaining the desired coating color requires the trained skill of a technician, and is very low in productivity. In addition, it does not necessarily follow that the coating color on the finished coated surface can always be reproduced to the coating color intended by the user, the designer, and the like owing to differences and variations in the type of component materials such as pigments.

To overcome this problem, computer color matching (hereafter referred to as CCM) has been widely used in which compounding involving the setting of a mixing ratio of pigments, which requires trained skill, is determined by computation by a computer in compounding basic color materials (coloring agents such as pigments) in accordance with the Kubelka-Munk's theory. In this CCM, the mixing ratio and the like of a plurality of pigments whose reflectances are known are determined by computation by a computer, such that the reflectance will be equal to the reflectance of a color sample measured by a spectrophotometer or the like. In another case, the mixing ratio and the like of a plurality of pigments whose tristimulus values are known are determined by computation by a computer, such that the tristimulus values will be equal to the tristimulus values of the color sample. Thus, a method is known for determining the mixing ratio and the like of coloring agents by using CCM so as to reproduce an intended coating color (Japanese Patent Application Laid-Open No. 149760/1987).

With the conventional methods of reproducing a coating color using CCM, however, since compounding is determined in accordance with the Kubelka-Munk's theory, it is impossible to effect compounding by mixing substances whose surface reflectances do not conform to the Kubelka-Munk's theory. In addition, it is impossible to specify a coating color which includes bright materials such a metallic paint and mica as its component materials.

In addition, although the above-described CCM is effective in obtaining a coating color which coincides with a color sample or the like, reflectance values and tristimulus values for specifying the coating color are not subjective. Therefore, it is difficult for the above-described CCM to reflect trends of sensuous coating colors, such as reddish and glossy colors, which are used by designers and the like as specification for obtaining desired coating colors from already existing coating colors.

SUMMARY OF THE INVENTION

In view of the above-described circumstances, it is a primary object of the present invention to provide a method of color reproduction which makes it possible to reproduce a necessary color only by simple processing by using a small amount of known data without using a huge amount of data or effecting massive data processing.

A second object of the present invention is to provide a method of reproducing a coating color which makes it possible to reproduce a coating color intended by a user or a designer who does not have expert knowledge on such as color science and reflection properties of objects, irrespective of the composition and types of paints, as well as a method of selecting a coating color which makes it possible to select an optimum coating color intended by such as the user or designer.

To attain the primary object, in accordance with a first aspect of the present invention, there is provided a method of color reproduction comprising the steps of: on the basis of a plurality of predetermined relationships of correspondence between first values expressed in a predetermined colorimetric system for outputting a predetermined number of colors and second values expressed in a colorimetric system different from the predetermined colorimetric system for specifying a color to be reproduced, estimating a plurality of the second values other than predetermined ones of the second values, and estimating the first values corresponding to the estimated second values; selecting the second values which are identical to or closest to the second values of an arbitrary color from the estimated second values as well as the first values corresponding to the identical or closest second values when the arbitrary color is to be reproduced; and reproducing the color on the basis of the selected first values.

In this method of color reproduction, the aforementioned plurality of relationships of correspondence can be made nonlinear relationships.

In addition, in accordance with a second aspect of the present invention, there is provided a method of reproducing a coating color, comprising the steps of: with respect to a predetermined coating color on a coated surface which is formed with one or a plurality of layers on an object to be coated and in which each of the layers is formed of at least one component material, determining in advance a plurality of relationships of corespondence between characteristic values constituted by amounts of respective ones of all the component materials constituting the coated surface and a spectral reflectance distribution of the coated surface based on the characteristic values; estimating on the basis of the plurality of relationships of correspondence a plurality of relationships of interpolated correspondence expressing correspondence between characteristic values and spectral reflectance distributions of coating colors in which a quantity of at least one component material of all the component materials that are determined on the basis of the relationships of correspondence is varied; selecting a spectral reflectance distribution which is in the relationships of interpolated correspondence corresponding to a coating color to be reproduced when a coating color other than the predetermined coating color is reproduced; and determining quantities of all the component materials by characteristic values that are determined on the basis of the relationships of interpolated correspondence with respect to the selected spectral reflectance distribution, and reproducing the coating color.

In accordance with a third aspect of the present invention, there is provided a method of selecting a coating color, comprising the steps of: with respect to a predetermined coating color on a coated surface which is formed with one or a plurality of layers on an object to be coated and in which each of the layers is formed of at least one component material, determining in advance a plurality of relationships of corespondence between characteristic values constituted by amounts of respective ones of all the component materials constituting the coated surface and a spectral reflectance distribution of the coated surface based on the characteristic values, and determining in advance tristimulus values based on a spectral reflectance distribution of the coated surface based on the characteristic values; estimating on the basis of the plurality of relationships of correspondence a plurality of relationships of interpolated correspondence expressing correspondence between characteristic values and spectral reflectance distributions of coating colors in which a quantity of at least one component material of all the component materials that are determined on the basis of the relationships of correspondence is varied, and determining the tristimulus values based on the spectral reflectance distribution of the coated surface based on characteristic values of the estimated relationships of interpolated correspondence; determining coordinate values on coordinates of a predetermined colorimetric system with respect to each of the tristimulus values and interpolated tristimulus values, and setting a plurality of coordinate values among the determined coordinate values as reference coordinate values for expressing reference colors; and when a tendency of one of the reference colors is to be reflected on an instructed color instructed for reproducing the coating color, selecting the coating color by consecutively selecting coordinate values in a direction from coordinate values specifying the instructed color to the reference coordinate values, starting with proximate coordinate values.

In accordance with a fourth aspect of the present invention, there is provided a method of selecting a coating color, comprising the steps of: with respect to a predetermined coating color on a coated surface which is formed with one or a plurality of layers on an object to be coated and in which each of the layers is formed of at least one component material, determining in advance a plurality of relationships of corespondence between characteristic values constituted by amounts of respective ones of all the component materials constituting the coated surface and a spectral reflectance distribution of the coated surface based on the characteristic values; estimating on the basis of the plurality of relationships of correspondence a plurality of relationships of interpolated correspondence expressing correspondence between characteristic values and spectral reflectance distributions of coating colors in which a quantity of at least one component material of all the component materials that are determined on the basis of the relationships of correspondence is varied; determining varied-angle characteristics of the coated surface expressing flip-flop relationships between a varied angle when a light-receiving angle is varied during reception of light reflected from the coated surface and brightness at the varied angle, on the basis of the spectral reflectance distributions in the relationships of interpolated correspondence or the spectral reflectance distributions in the relationships of correspondence; and selecting the coated color by selecting the varied-angle characteristic of the coating color to be reproduced from the determined varied-angle characteristics.

In accordance with a fifth aspect of the present invention, there is provided a method of selecting a coating color, comprising the steps of: with respect to a predetermined coating color on a coated surface which is formed with one or a plurality of layers on an object to be coated and in which each of the layers is formed of at least one component material, determining in advance a plurality of relationships of corespondence between characteristic values constituted by amounts of respective ones of all the component materials constituting the coated surface and a spectral reflectance distribution of the coated surface based on the characteristic values; estimating on the basis of the plurality of relationships of correspondence a plurality of relationships of interpolated correspondence expressing correspondence between characteristic values and spectral reflectance distributions of coating colors in which a quantity of at least one component material of all the component materials that are determined on the basis of the relationships of correspondence is varied; determining a particle-size distribution of each of the component materials for each of the characteristic values in the relationships of correspondence and the characteristic values in the relationships of interpolated correspondence, and determining depth indexes specifying the depth of coating colors on the basis of the spectral reflectance distributions in the relationships of interpolated correspondence or the spectral reflectance distributions in the relationships of interpolated correspondence and the determined particle-size distribution; and selecting the coating color by selecting from the selected depth indexes.

In accordance with a sixth aspect of the present invention, there is provided a method of reproducing a coating color, comprising the steps of: estimating on the basis of a plurality of relationships of correspondence determined in advance a relationship of correspondence between a spectral reflectance distribution and a characteristic value of a coating color selected by the method of selecting a coating color in accordance with at least one of the third, fourth, and fifth aspects of the invention; and reproducing the coating color by determining a quantity of each of all the component materials by characteristic values which are determined from the estimated relationship of correspondence.

In accordance with the first aspect of the invention, a plurality of predetermined relationships of correspondence are determined in advance between first values expressed in a predetermined colorimetric system for outputting a predetermined number of colors and second values expressed in a colorimetric system different from the predetermined colorimetric system for specifying a color to be reproduced. These relationships of correspondence may be nonlinear relationships. For example, the predetermined colorimetric system includes an RGB colorimetric system, and the difference colorimetric system includes an XYZ colorimetric system. The first values include data on color materials, and the second values include tristimulus values. A plurality of the second values other than predetermined ones of the second values are estimated by interpolation or the like on the basis of the plurality of relationships of correspondence, and the first values corresponding to the estimated second values are estimated. Accordingly, it is possible to determine a plurality of relationships of correspondence including a desired relationship of correspondence from the predetermined plurality of relationships of correspondence. When an arbitrary color is to be reproduced, the second values which are identical to or closest to the second values of the arbitrary color are estimated from the estimated second values, and the first values corresponding to the identical or closest second values are selected. If the color is reproduced on the basis of the selected first values, it is possible to reproduce and output a color close to the desired color or that color itself.

In accordance with the second aspect of the invention, a plurality of relationships of correspondence are determined in advance with respect to a predetermined coating color on a coated surface. This coated surface is formed with one or a plurality of layers on an object to be coated, and each of its layers is formed of at least one component material. A plurality of relationships of correspondence between characteristic values constituted by amounts of respective ones of all the component materials constituting the coated surface and a spectral reflectance distribution of the coated surface based on the characteristic values are determined in advance. These relationships of correspondence can be determined by, for instance, making use of sample coated plates whose spectral reflectances, pigments and the like are already known. A plurality of relationships of interpolated correspondence, which express correspondence between characteristic values and spectral reflectance distributions of coating colors in which a quantity of at least one component material of all the component materials that are determined on the basis of the relationships of correspondence is varied, are estimated by interpolation or the like on the basis of the plurality of relationships of correspondence. Accordingly, the relationships of interpolated correspondence between characteristic values and spectral reflectance distributions can be determined with respect to a desired coating color on the basis of a plurality of predetermined relationships of correspondence. Here, when a coating color other than the predetermined coating color is to be reproduced, a spectral reflectance distribution which is in the relationships of interpolated correspondence corresponding to the coating color to be reproduced is selected. If quantities of all the component materials, including such as color materials and bright materials, are determined by characteristic values that are determined on the basis of the relationships of interpolated correspondence with respect to this selected spectral reflectance distribution, it is possible to reproduce the composition of the coated surface and a desired coating color on a CRT or by means of a color-material mixing apparatus or the like.

In the method of selecting a coating color in accordance with the third aspect of the invention, a plurality of relationships of corespondence between characteristic values constituted by amounts of respective ones of all the component materials constituting the coated surface in the second aspect of the invention and a spectral reflectance distribution of the coated surface based on the characteristic values are determined in advance. At the same time, tristimulus values based on a spectral reflectance distribution of the coated surface based on the characteristic values are determined in advance. These tristimulus values include values represented by a colorimetric system such as the XYZ colorimetric system, and can be represented by coordinate values on chromaticity coordinates. In addition, the Munsell color system can be also used. on the basis of the plurality of relationships of correspondence, a plurality of relationships of interpolated correspondence, described in relation to the second aspect of the invention, are estimated. At the same time, the tristimulus values based on the spectral reflectance distribution of the coated surface based on characteristic values of the estimated relationships of interpolated correspondence are determined. Coordinate values with respect to these tristimulus values and interpolated tristimulus values are determined on coordinates of a predetermined colorimetric system, such as the XYZ colorimetric system, and a plurality of coordinate values among the determined coordinate values are set as reference coordinate values for expressing reference colors. As these reference colors, it is preferable to set basic colors that are used in coating or printing, such as red, blue, yellow, green, magenta, cyan, white, and black. When a tendency of one of the reference colors is to be reflected on an instructed color instructed for reproducing the coating color, if the coating color is selected by consecutively selecting coordinate values in a direction from coordinate values specifying the instructed color to the reference coordinate values, starting with proximate coordinate values, then the coating colors corresponding to the selected coordinate values gradually come to reflect the tendency of the reference color. Accordingly, if the quantities of all the component materials including such as color materials and bright materials are determined on the basis of the characteristic values of the coating color corresponding to the selected coordinate values, it is possible to reproduce a desired coating color on which the tendency of the reference color is reflected.

Here, there are cases where a sensuous flip-flop texture, such as a modulated texture of light and darkness, is included among the coating colors desired by the designer or the like. Accordingly, in the method of selecting a coating color in accordance with the fourth aspect of the invention, varied-angle characteristics of the coated surface expressing flip-flop relationships between a varied angle when a light-receiving angle is varied during reception of light reflected from the coated surface and brightness at the varied angle, are determined on the basis of the spectral reflectance distributions in the relationships of interpolated correspondence or the spectral reflectance distributions in the relationships of correspondence. Since the sensuous flip-flop texture can be expressed by this varied-angle characteristic, if the varied-angle characteristic of the coating color to be reproduced is selected from the determined varied-angle characteristics, it is possible to select a coating color on which the flip-flop texture is reflected. Accordingly, if the quantities of all the component materials, including such as color materials and bright materials, are determined on the basis of the characteristic values of the coating color corresponding to the selected varied-angle characteristic, it is possible to reproduce a coating color on which the sensuous flip-flop texture desired by the designer or the like is reflected.

In addition, sensuous instructions such as "a color having a texture of depth" are also included among the coating colors desired by the designer or the like. Accordingly, in the method of selecting a coating color in accordance with the fifth aspect of the invention, a particle-size distribution of each of the component materials for each of characteristic values in the relationships of correspondence determined in advance and characteristic values in the relationships of interpolated correspondence. Then, depth indexes specifying the depth of coating colors are determined on the basis of the spectral reflectance distributions in the relationships of interpolated correspondence or the spectral reflectance distributions in the relationships of interpolated correspondence and the determined particle-size distribution. Accordingly, sensuous depths corresponding to the selected depth indexes can be expressed as amounts, and if the plurality of depth indexes thus determined are selected, it is possible to select a coating color exhibiting a desired depth. Hence, if the quantities of all the component materials, including such as color materials and bright materials, are determined on the basis of the characteristic values of the coating color corresponding to the selected depth index, it is possible to reproduce a coating color having a desired depth desired by the designer or the like.

In addition, in the sixth aspect of the invention, at least one of a coating color on which the tendency of a reference color is reflected, a coating color having a varied-angle characteristic expressing a flip-flop relation, and a coating color having a desired texture of depth is selected. Then, a relationship of correspondence between a spectral reflectance distribution and a characteristic value of this selected coating color selected is estimated on the basis of a plurality of relationships of correspondence determined in advance. Accordingly, even in a case where coating colors which are desired by the designer or the like and are expressed sensuously are combined, if the quantity of each of all the component materials, such as color materials and bright materials, are determined by characteristic values which are determined from the estimated relationship of correspondence, it is possible to faithfully reproduce the desired, sensuously expressed coating color.

As described above, in accordance with the first aspect of the invention, it is possible to determine a multiplicity of relationships from a small number of relationships determined in advance by a simple algorithm. As a result, there is an advantage in that input values for obtaining required values can be obtained easily.

In accordance with the second aspect of the invention, it is possible to determine the characteristic values of a surface coated with a coating color constituted by a plurality of component materials including color materials and bright materials. Therefore, there is an advantage in that even in the case of a coated surface containing bright materials, such as metal pearl mica, which do not conform to the Kubelka-Munk's theory, it is possible to accurately reproduce a desired color as a coating color.

In accordance with the third aspect of the invention, colors midway in a direction from an instructed color to a reference color can be selected consecutively. Hence, there is an advantage in that, even if a coating color tinged with a tone is instructed by the designer or the like, such as a more reddish color, it is readily possible to select a coating color matching the sense of the designer or the like. In addition, since the characteristic values of a coated surface of a coating color selected as a coating color matching the sense of the designer or the like can be determined, there is an advantage in that a desired coating color tinged with a tone can be reproduced accurately.

In accordance with the fourth aspect of the invention, since it is possible to determine and select varied-angle characteristics of a coated surface expressing the relationship between the varied angle, which allows the sensuous flip-flop texture to be expressed, and the brightness at the varied angle, there is an advantage in that it is possible to select a coating color on which a modulated texture of light and shade desired by the designer or the like is reflected. In addition, since it is possible to determine the characteristic values of a coated surface of the coated color selected as a coating color matching the sense of flip-flop texture of the designer or the like, there is an additional advantage in that it is possible to accurately reproduce the coating color incorporating the desired flip-flop texture.

In accordance with the fifth aspect of the invention, since the depth indexes expressing the depth of coating colors are determined on the basis of the particle-size distributions of the component materials for each characteristic value, there is an advantage in that it is possible to select a coating color having a desired texture of depth, which is sensuously expressed as depth, as the coating color desired by the designer or the like. Moreover, since a coated surface can be formed on the basis of the characteristic values of the coating color with respect to the depth index, there is an advantage in that a coating color presenting a sensuous texture of depth desired by the designer or the like can be reproduced.

In accordance with the sixth aspect of the invention, since relationships of correspondence with respect to a coating color with the tendency of a reference color reflected thereon, a coating color having a flip-flop texture, or a coating color having a desired texture of depth can be selectively estimated, there is an advantage in that, even if sensuous coating colors desired by the designer or the like are combined, it is possible to faithfully reproduce the desired sensuous color as the coating color.

The above and other objects, features and advantages of the present invention will become more apparent from the following detailed description of the invention when read in conjunction with the accompanying drawings.

BRIEF DESCRIPTION OF THE DRAWINGS

FIGS. 5A to 5C are characteristic diagrams illustrating relationships between color data and tristimulus values, in which FIG. 5A shows the relationship between a value $a_1$ (Ye) and a value $x_1$ (X), FIG. 5B shows the relationship between the value $a_1$ and a value $x_2$, and FIG. 5C shows the relationship between the value $a_1$ and a value $x_3$;

FIGS. 6A to 6E are characteristic diagrams illustrating relationships between the color data and the tristimulus values when the value $a_3$ (Cy) is varied in the characteristic diagram shown in FIG. 5A, in which FIG. 6A shows the case of $a_3=0$; FIG. 6B, the case of $a_3=63$; FIG. 6C, the case of $a_3=127$; FIG. 6D, the case of $a_3=191$; and FIG. 6E, the case of $a_3=255$;

FIGS. 14A to 14C are image diagrams illustrating a process for determining the values $x_2$, $x_3$ corresponding to points of intersection, in which FIG. 14A shows a process for determining the value al; FIG. 14B, a process for determining the value $x_2$; and FIG. 14c, a process for determining the value $x_3$;

FIGS. 15A to 15C are image diagrams in which FIG. 15 shows a curve having a plurality of points of intersection with a straight line; FIG. 15B shows a process for determining the value $x_2$ from a plurality of points of intersection; and FIG. 15C shows a process for determining the value $x_3$;

FIGS. 24A to 24C are image diagrams illustrating a process for determining the values $x_2$ to $X_N$ corresponding to the points of intersection in accordance with the second embodiment, in which FIG. 24A shows a process for determining the value al; FIG. 24B, a process for determining the value $x_2$; and FIG. 24c, a process for determining the value $X_N$;

FIGS. 30A to 30C are image diagrams illustrating configurations of coated surfaces, in which FIG. 30A shows a metallic coated surface, FIG. 30B shows a pearl-mica coated surface, and FIG. 30C shows a solid-coated surface;

DESCRIPTION OF THE PREFERRED EMBODIMENTS

Figure 1:
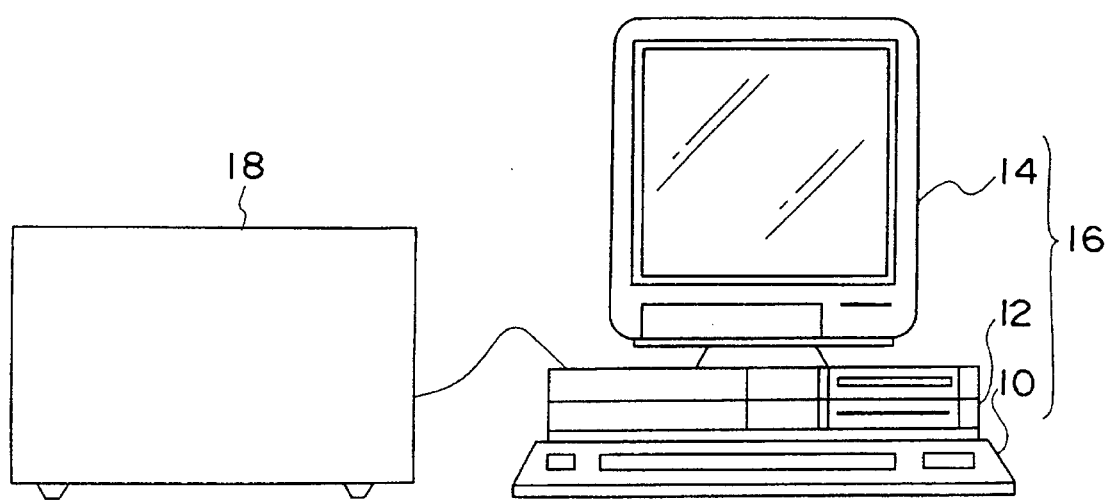
FIG. 1 is a schematic diagram including a personal computer in accordance with a first embodiment of the present invention.

Referring now to the accompanying drawings, a description will be given of the preferred embodiments of the present invention. As shown in FIG. 1, a color reproducing apparatus includes a personal computer 16 and a color copying apparatus 18. This personal computer 16 is comprised of a keyboard 10 for entering data and the like, a main unit 12 of the computer for computing and outputting data for outputting a desired color from the color copying apparatus 18 in accordance with a program stored in advance, and a CRT 14 for displaying such as the results of computation by the main unit 12 of the computer. As this color copying apparatus 18, color hard-copying apparatus are known which are based on a thermal transfer process, an ink-jet process, an electrophotographic process, and a silver-halide photographic process for outputting color copy images using color data in the RGB colorimetric system as input values.

In a first embodiment, when a predetermined color is reproduced by the color copying apparatus 18, color data in the RGB colorimetric system to be converted to arbitrary color data in the XYZ colorimetric system required for color reproduction are determined on the basis of combinations of a specific number ($5^3$ sets) of color data in the XYZ colorimetric system and color data in the RGB colorimetric system (trichromatic system), which are set in advance as physical amounts, so as to effect color reproduction.

It should be noted that, as for the color data that are inputted to the color copying apparatus 18, the color filter densities (yellow, magenta, and cyan) based on subtractive mixture of inks or the like are used as color data (Ye, Ma, and Cy). In addition, it is assumed that the inks or the like have ideal color filter density (absorption) characteristics. When the invention is applied to general inks or the like which undergo secondary absorption, it suffices to reduce in advance unnecessary spectral absorption due to the sum of components of the inks or the like when the inks or the like are mixed (so-called color-correction masking).

Figure 2:
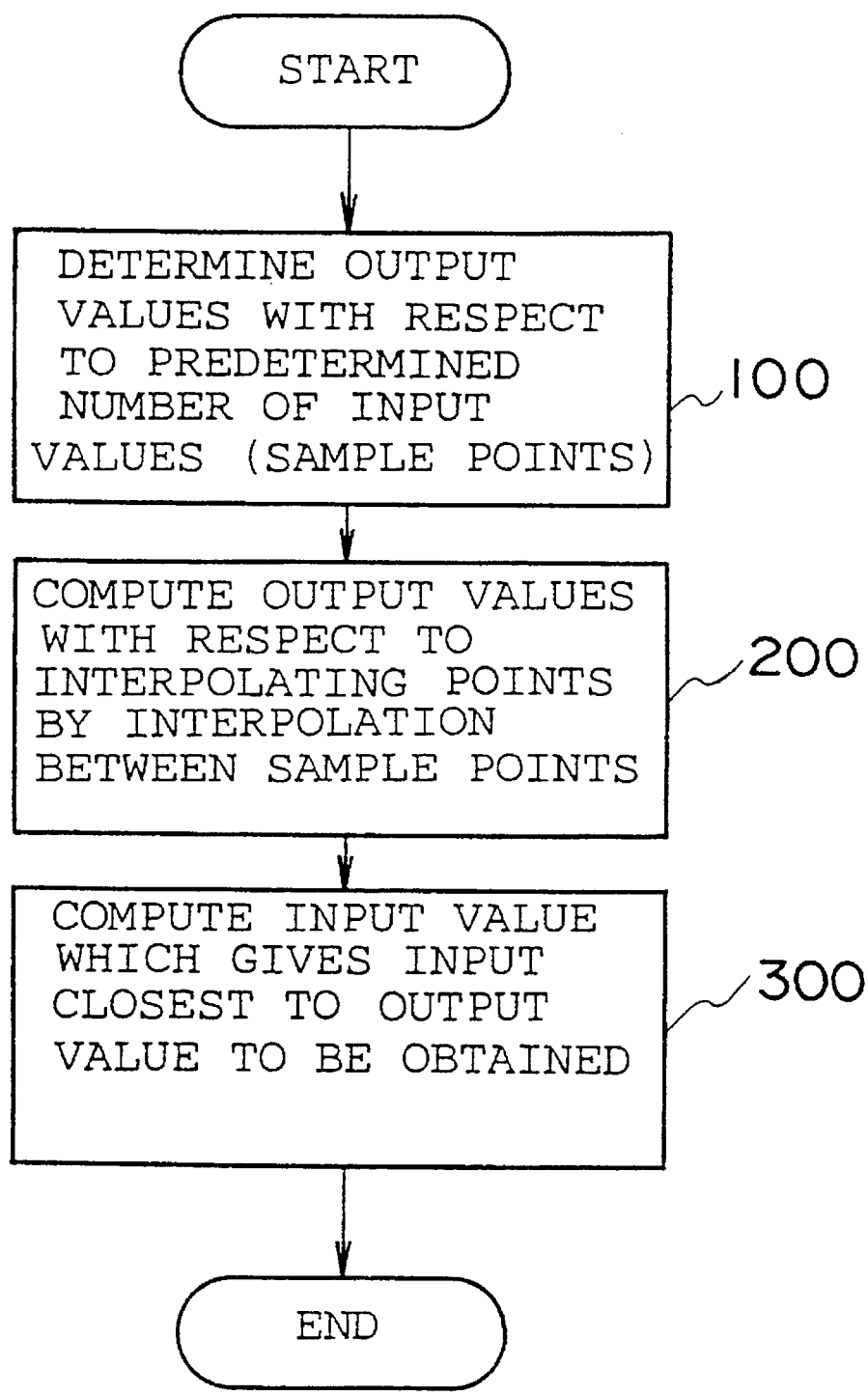
FIG. 2 is a flowchart illustrating the flow of color reproduction processing in accordance with the first embodiment.

FIG. 2 shows a routing for processing a program for reproducing a desired color in accordance with this embodiment. In addition, the combination of the group of color data in the XYZ colorimetric system and the group of color data in the RGB colorimetric system for expressing a predetermined color by the color copying apparatus 18 is considered to be in a mapping relation between a set A representing the group of color data in the RGB colorimetric system and a set XX representing the group of color data in the XYZ colorimetric system. Accordingly, respective relations in this processing routine are shown as images in FIGS. 3A to 3C.

Figure 3A:
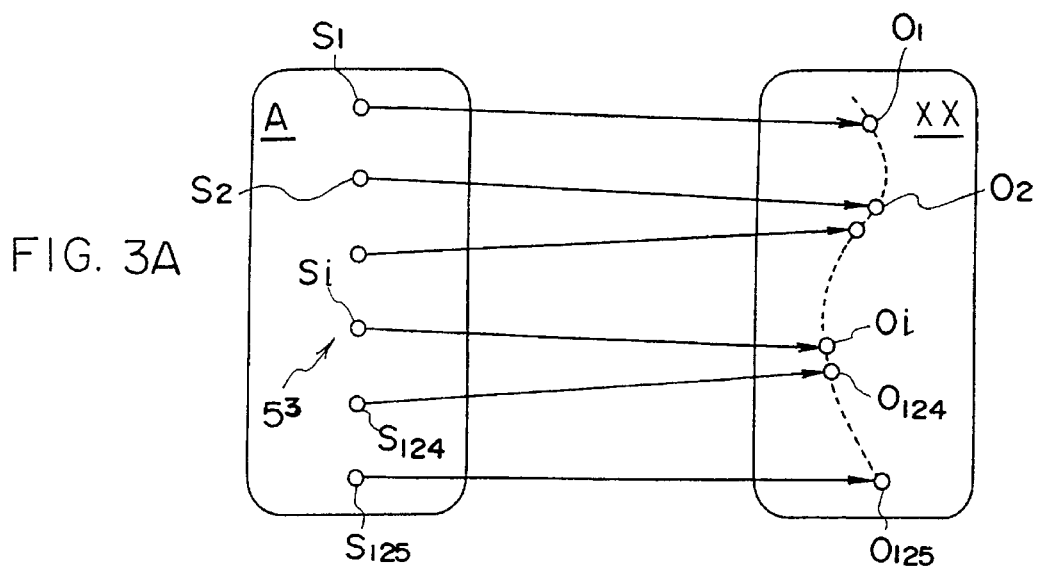
FIGS. 3A to 3C are image diagrams illustrating the flow of the color reproduction processing shown in FIG. 2.
Figure 3B:
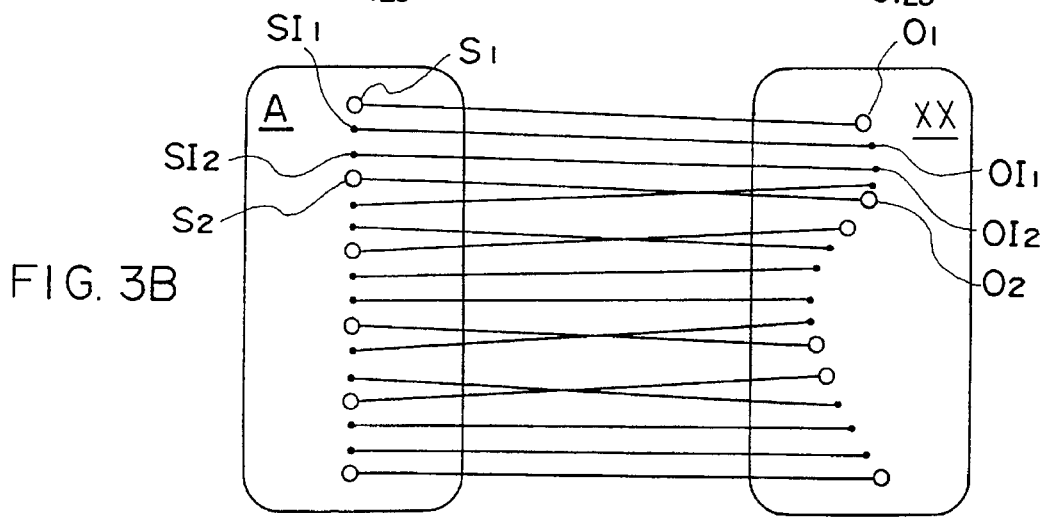
Figure 3C:
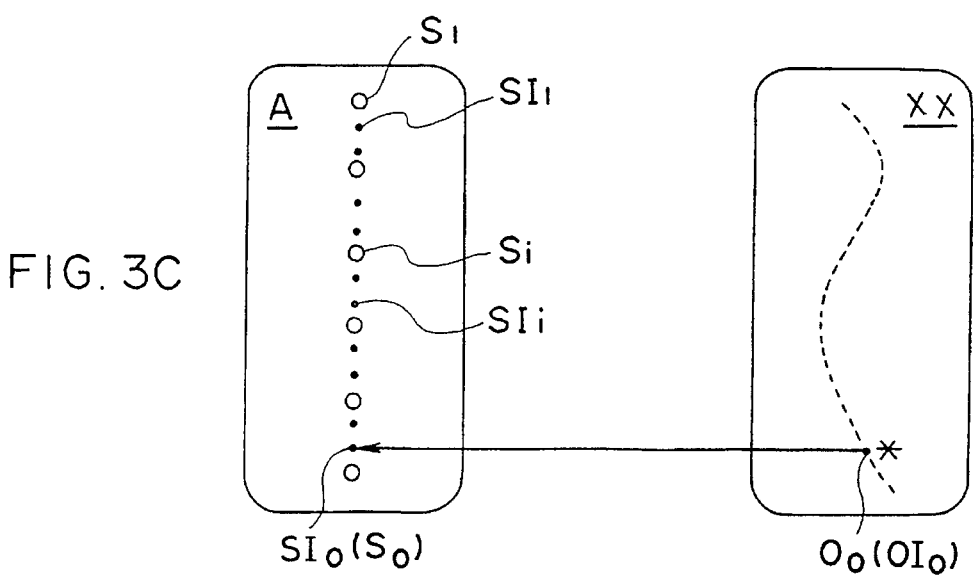

In Step 100 in FIG. 2, an output value Oi (i: 1 to 125) is determined with respect to each of a predetermined number of (in this embodiment, it is assumed that each of Ye, Ma, and Cy is specified by one of five values; hence, all the combinations at that time, i.e., $5^3$=125) samples Si (i: 1 to 125) (FIG. 3A). Namely, relations are determined between 125 kinds of color data (Ye, Ma, and Cy) which are input values Si for the color copying apparatus 18 and data on the tristimulus values X, Y, and Z of the color which are output results (output values Oi) with respect to the color data. In Step 200, correspondence between an interpolating point SIi (i: 1, 2, ... ) and an estimated output value OIi is calculated by performing interpolation on the basis of the relationship of correspondence between the sample point Si and the output value Oi (FIG. 3B). In Step 300, an output value Oo or an estimated output value OIo, which is identical or closest to an output value to be obtained and corresponding to a desired color (i.e., color data on the color to be reproduced, and indicated by a mark * in FIG. 3C), is selected, and an input value (So or SIo) corresponding to the selected value (Oo or OIo) is determined (FIG. 3C).

More particularly, in Step 100, 125 kinds of color data (Ye, Ma, and Cy) are inputted to the color copying apparatus 18, and the color copying apparatus 18 outputs a color medium which has formed a color corresponding to the inputted color data. This outputted color medium is photometrically measured with a spectrometer such as a spectrophotometer, thereby determining tristimulus values (X, Y, and Z). Consequently, the tristimulus values (X, Y, and Z) corresponding to the 125 kinds of color data (Ye, Ma, and Cy) are determined.

It should be noted that, to simplify the description which follows, as for the five kinds of color data (Ye, Ma, and Cy) that are inputted to the color copying apparatus 18, each of the values of Ye, Ma, and Cy is any one of five equispaced values, 0, 63, 127, 191, and 255.

Figure 4:
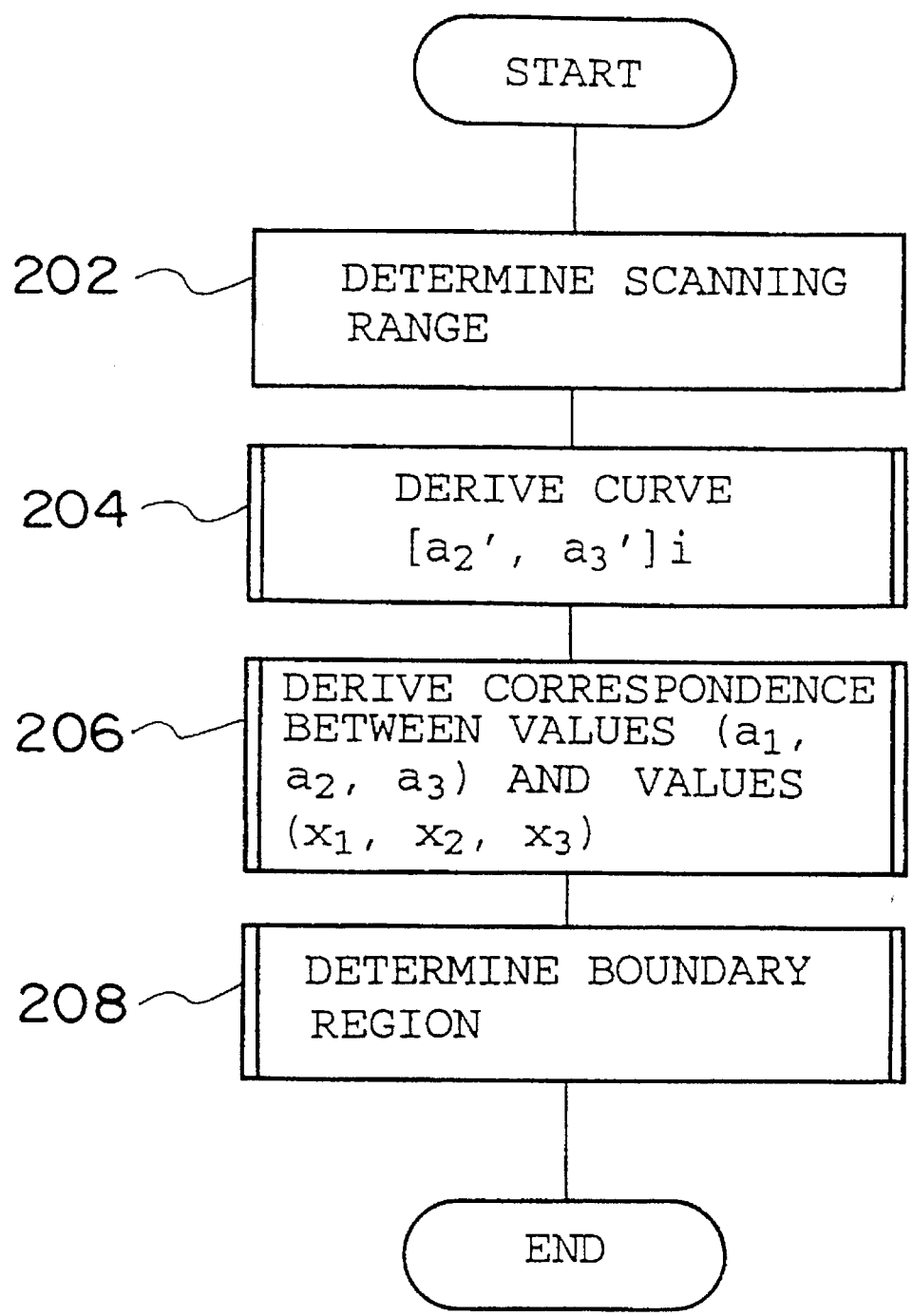
FIG. 4 is a is a flowchart illustrating the details of an interpolation processing routine (Step 200 in FIG. 2) in accordance with the first embodiment.

Referring now to FIG. 4, a description will be given of the interpolation processing routine in Step 200. It should be noted that, in the description that follows, values of the color data (Ye, Ma, and Cy) and the tristimulus values (X, Y, and Z) serving as input values are set as follows:

Color data (Ye, Ma, and Cy): values (a1, $a_2$, $a_3$)

Tristimulus values (X, Y, and Z) : values ($x_1$, $x_2$, $x_3$)

and a description will be given by using these values ai and xi (i=1, 2, 3).

It should be noted that, in the color copying apparatus 18, an image of 256 gradations is outputted, and a desired color is designated by using tristimulus values in the XYZ colorimetric system, so that the value ai and the value xi can be expressed as follows:

$0 \leq ai \leq 255$ $0 < xi < 100$

In this embodiment, since each of various values ai (i: 1, 2, 3) at the aforementioned sample points to be determined in advance is any one of the five values as described above, this value will be denoted by j and written as a value aij (i: 1, 2, 3, j: 1, 2, 3, 4, 5). It should be noted that these values at the sample points need not be equispaced, and should preferably be used at dense and sparse intervals so as to cover a range which involves a sudden change.

Figure 5C:
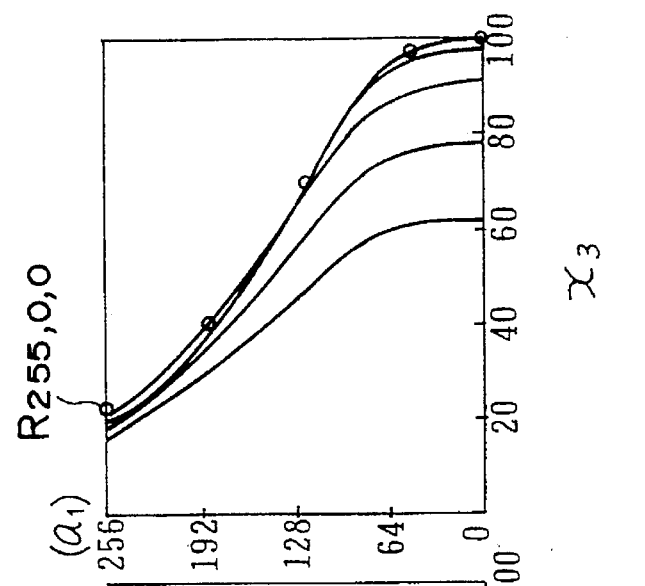
Figure 5B:
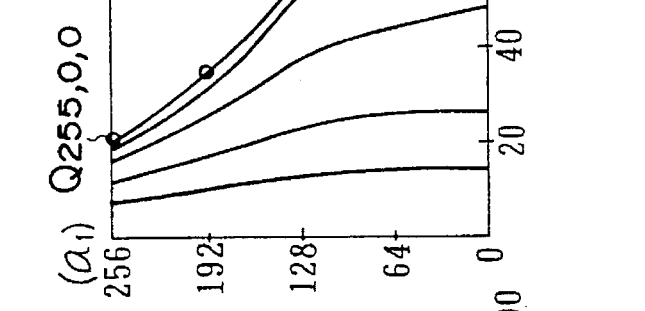
Figure 5A:
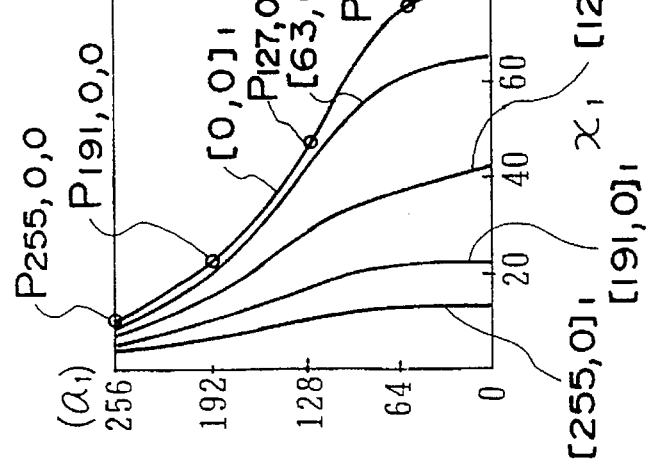

In Step 202, the range of values which are actually used as the values ($a_1$, $a_2$, $a_3$) is determined. First, a change of the value $a_i$ with respect to the value xi with the values $a_2$ and $a_3$ set as parameters is examined. In FIGS. 5A to 5C, relationships between the value $a_1$ and the value xi when the value $a_3$ is 0 and the values $a_2$ are 0, 63, 127, 191, and 255 ($a_2j$) are shown on an $a_1$–xi coordinate plane in which the value $a_1$ is taken as the ordinate and the value xi as the abscissa. FIG. 5A shows relationships between the value $a_1$ and the value $x_1$ on an $a_1$–$x_1$ coordinate plane. FIG. 5B shows relationships between the value $a_1$ and the value $x_2$ on an $a_1$–$x_2$ coordinate plane. FIG. 5C shows relationships between the value $a_1$ and the value $x_3$ on an $a_1$–$x_3$ coordinate plane.

Curves in the drawings are determined as follows: The five values ($x_1$, $x_2$, $x_3$) when the values $a_1$ are 0 ($a_{11}$), 63($a_{12}$), 127 ($a_{13}$), 191(a14), and 255($a_{15}$) when $a_3$=0 and $a_2$=0 are determined in Step 100. Accordingly, it is possible to plot five points corresponding to the sample points on the respective $a_1$–xi coordinate planes in FIGS. 5A to 5C through correspondence between the values of color data on the sample points and the values ($x_1$, $x_2$, $x_3$). It should be noted that points plotted on the $a_1$–$x_1$ coordinate plane are represented as points Pa1, $a_2$, $a_3$; points plotted on the $a_1$–$x_2$ coordinate plane are represented as points Qa1, $a_2$, $a_3$; and points plotted on the $a_1$–$x_3$ coordinate plane are represented as points Ra1, $a_2$, $a_3$.

Curves as obtained by performing spline interpolation with respect to the plurality of points plotted on each of these $a_1$–xi coordinate planes. Hereafter, these curves will be written as curves [$a_2$, $a_3$]i (i: 1, 2, 3). For example, a curve on the $a_1$–$x_1$ coordinate plane when the value $a_3$ is 0 and the value $a_2$ is 0 becomes a curve [0, 0]$_1$, as shown in FIG. 5A. In addition, the examination of the change of the curve [$a_2$, $a_3$]i by changing the value ai (i=2, 3) will be referred to as scanning by the value ai.

Figure 6A:
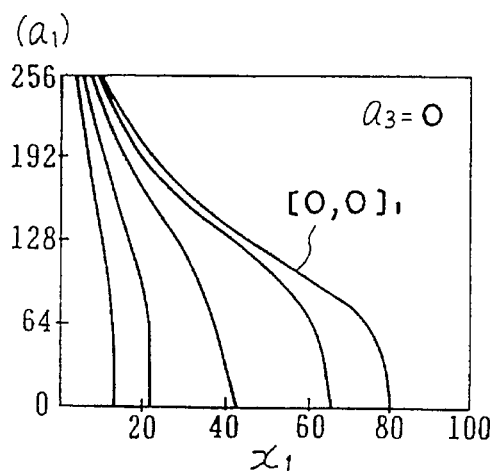
Figure 6D:
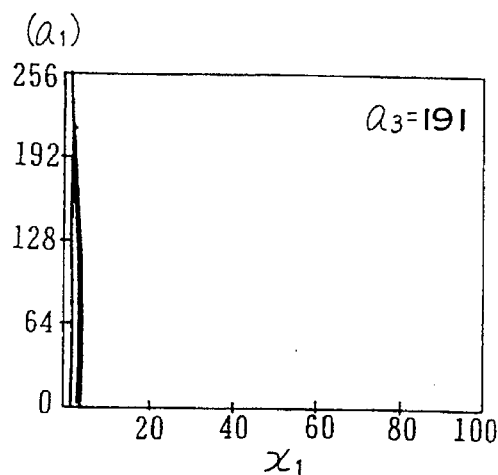
Figure 6B:
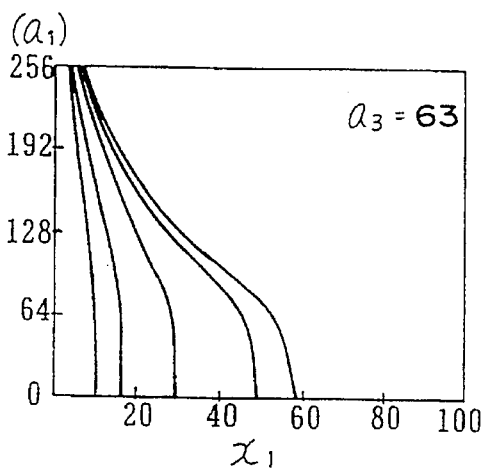
Figure 6E:
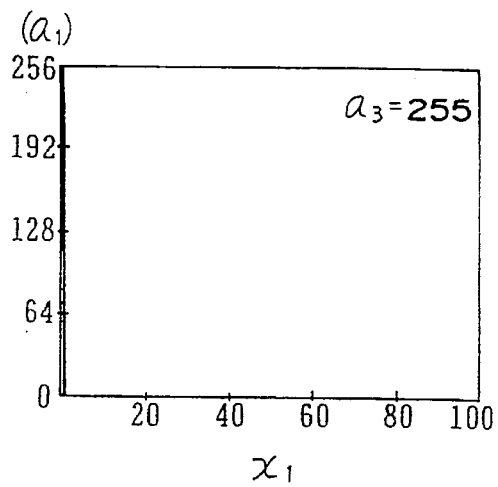
Figure 6C:
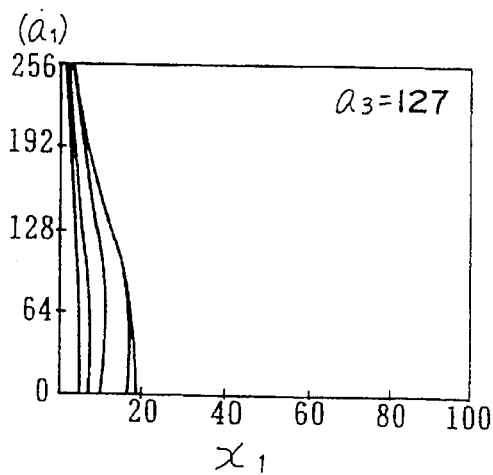

FIGS. 6A to 6E show relationships between the value $a_1$ and the value $x_1$ when the value $a_3$ is one of 0, 63, 127, 191, and 255, respectively. FIG. 6A shows relationships between the value $a_1$ and the value $x_1$ when the value $a_3$ is 0 in the same was as in FIG. 5A. FIG. 6B shows relationships when the value $a_3$ is 63. FIG. 6C shows relationships when the value $a_3$ is 127. FIG. 6D shows relationships when the value $a_3$ is 191. FIG. 6E shows relationships when the value $a_3$ is 255.

Here, in a case where each of the values $a_2$ and $a_3$ is changed in stages in the order of 0, 1, 2, . . . , 255 with respect to the curve [$a_2$, $a_3$]i to calculate output values for interpolating points by the interpolation from sample points, as for the curve [$a_2$, $a_3$]i to be determined, it suffices to determine only the value ai corresponding to a value xi* which falls within the range of the values xi which are predetermined values of the desired color. Namely, only a curve [$a_2$, $a_3$]$_1$ having a point of intersection with a straight line $x_1$=$x_1$* on the $a_1$–$x_1$ coordinate plane is required. For instance, if the range $10 \leq x_1^* \leq 100$ is considered, as can be appreciated from FIGS. 6A to 6E, it is estimated that scanning is not required for the range $191 \leq a_3 \leq 255$.

Accordingly, the range of scanning is determined as described below by using the curves obtained by the above-described spline interpolation. It should be noted that since the curve [$a_2$, $a_3$]i is required to have at least the aforementioned point of intersection with respect to the value $x_1$, only the curve [$a_2$, $a_3$]$_1$ is processed in this processing.

If the curve [$a_2$, $a_3$]$_1$ and the curve [$a_2$–64, $a_3$]1 with the value $a_3$ varied consecutively in the order of 0, 63, 127, 191, and 255 do not have a point of intersection with the straight line $x_1$=$x_1$* on the coordinate plane, the scanning by the value $a_2$ which assumes a value from ($a_2$–64) to $a_2$ is not necessary. Incidentally, if the value $a_2$ is 63, processing is performed with respect to the curve [63, $a_3$]1 and the curve [0, $a_3$]$_1$.

Similarly, if the curve [$a_2$, $a_3$]$_1$ and the curve [$a_2$, $a_3$–64]$_1$ with the value $a_2$ varied consecutively in the order of 0, 63, 127, 191, and 255 do not have a point of intersection with the straight line $x_1$=$x_1$* on the coordinate plane, the scanning by the value $a_3$ which assumes a value from ($a_3$–64) to $a_3$ is not necessary. Incidentally, if the value $a_3$ is 63, processing is performed with respect to the curve [$a_2$, 63]$_1$ and the curve [$a_2$, 0]$_1$.

Figure 7:
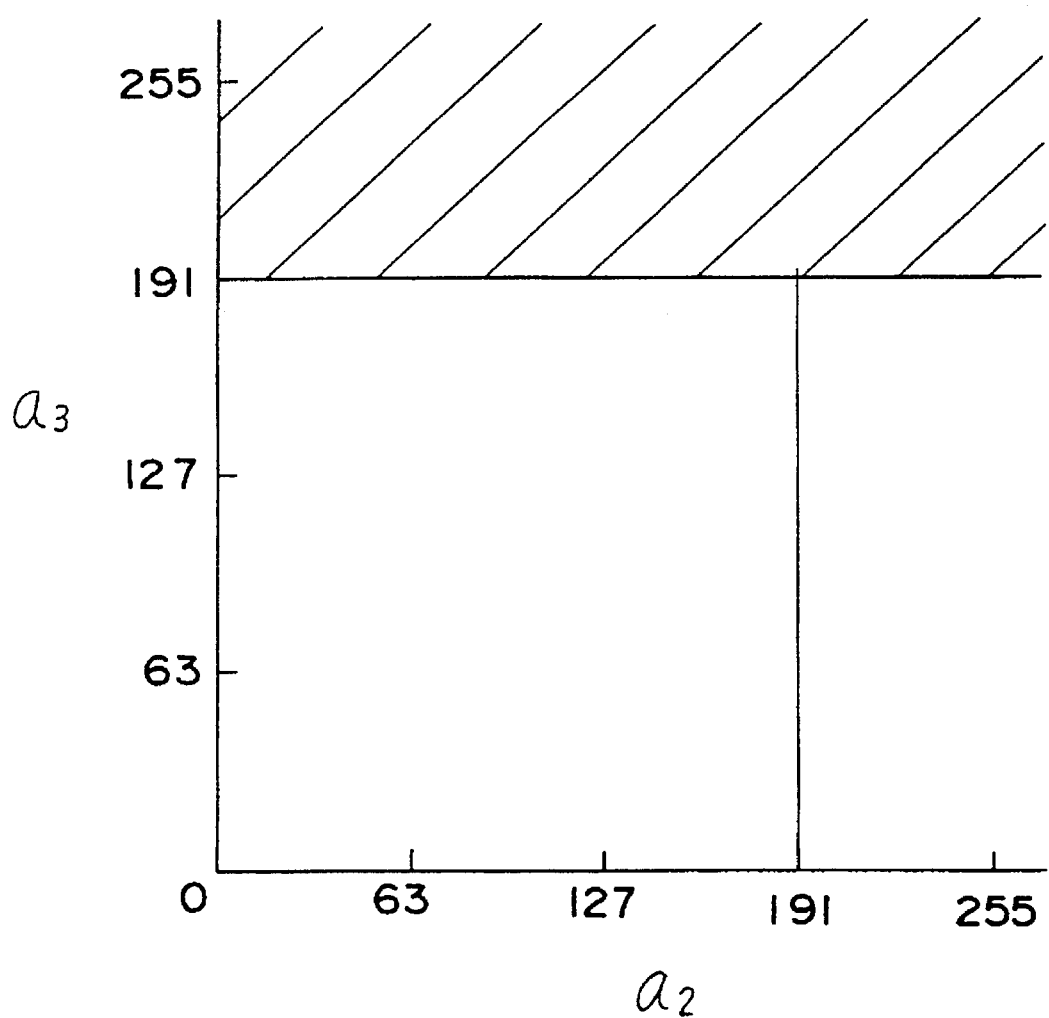
FIG. 7 is an image diagram illustrating a scanning range required by the values $a_2$, $a_3$.

As a result of this processing, if the value $a_3$ exceeds 191, as shown by the hatched portion in FIG. 7, it can be appreciated that scanning is not required irrespective of the value $a_2$.

Figure 8:
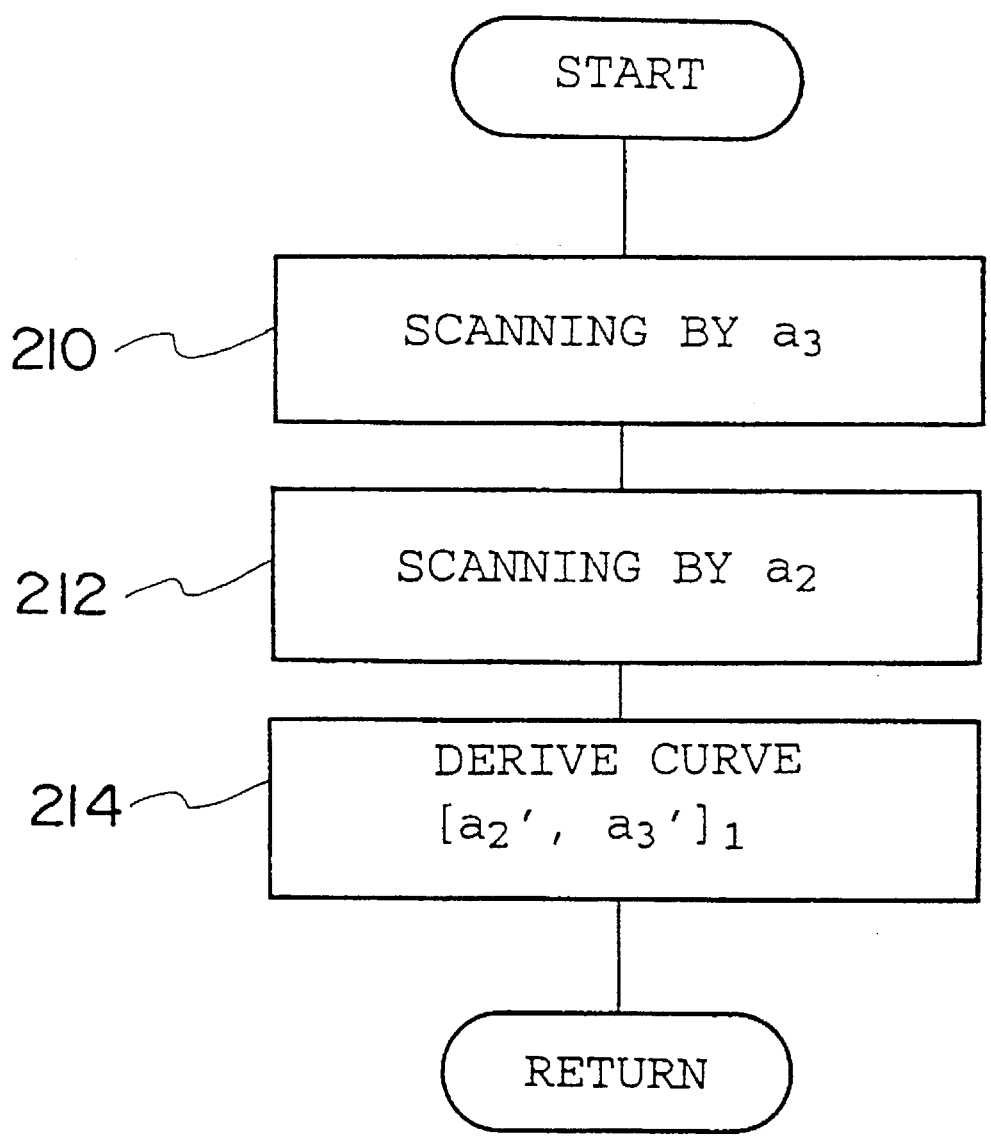
FIG. 8 is a flowchart illustrating the details of a curve-deriving processing routine (Step 204 in FIG. 4) in accordance with the first embodiment.

In an ensuing Step 204, a curve [$a_2$', $a_3$']i including arbitrary values ($a_1$', $a_2$', $a_3$') is determined by the computing routine shown in FIG. 8. This curve [$a_2$', $a_3$']i is determined by performing spline interpolation from five points plotted on each $a_1$–xi coordinate plane when the values $a_1$ are 0, 63, 127, 191, and 255. In other words, the curve [$a_2$', $a_3$']i is determined from the respective five points from points Pa1, $a_2$', $a_3$' on the $a_1$–$x_1$ coordinate plane, points Qa1,$a_2$',$a_3$' on the $a_1$–$x_2$ coordinate plane, and points Ra1, $a_2$', $a_3$' on the $a_1$–$x_3$ coordinate plane, respectively. Hereafter, a description will be given by using the points Pa1, $a_2$', $a_3$' plotted on the $a_1$–$x_1$ coordinate plane as an example.

In Step 210 in FIG. 8, $x_1$-coordinates of the point Pa1, $a_2$',$a_3$' ($a_1$, $a_2$: 0, 63, 127, 191, 255) are determined by scanning by the value $a_3$ as shown below. First, a description will be given of an example in which the value $a_1$ is 0, and the value $a_2$ is 255.

Figure 9:
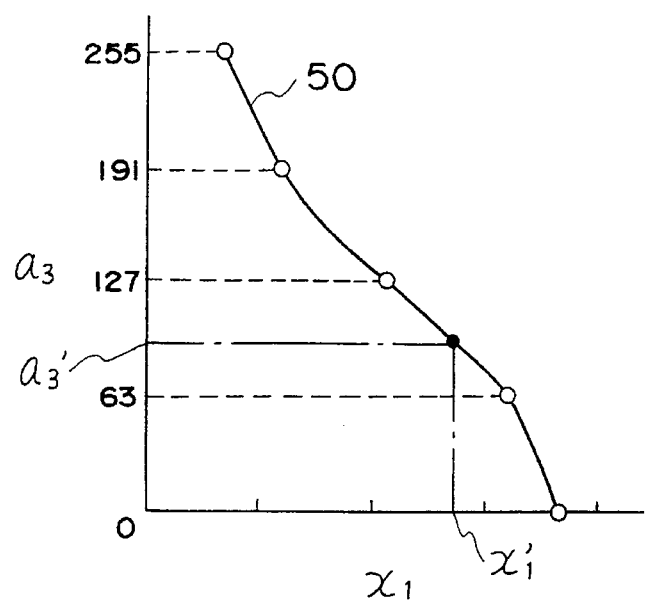
FIG. 9 is an image diagram illustrating a process for determining $x_1$ coordinates on the basis of the value $a_3$.

The $x_1$-coordinates of the point P$_{0,255}$,$a_3$' are found by performing spline interpolation from the $x_1$-coordinates of five points including a point $P_{0,255,0}$, a point $P_{0,255,63}$, a point $P_{0,255,127}$, a point $P_{0,255,191}$, and a point $P_{0,255,25}$. That is, since the $x_1$-coordinates of these five points are already known as described above, by using these coordinates, points are plotted on the $a_3$-$x_1$ coordinate plane where the value $a_3$ and the value $x_1$ perpendicularly intersect each other, and spline interpolation is performed with respect to these plotted points, thereby obtaining a continuous line 50, as shown in FIG. 9. Then, the coordinate of intersection between the straight line $a_3 32 a_3'$ and this continuous line 50 is determined, and this intersection coordinate is set as a solution (a value $x_1'$ of the $x_1$-coordinate of the point $P_{0,255}, a_3'$).

By setting this value $a_2$ consecutively to 0, 63, 127, 191, and 255 and performing processing similar to the one described above, it is possible to determine a coordinate value of the $x_1$-coordinate of each point $Pa_1$, $a_2'$, $a_3'$ ($a_1$: 0, 63, 127, 191, 255).

In an ensuing Step 212, scanning is effected by the value $a_2$ by using the coordinate values of the $x_1$-coordinates determined in Step 210, so as to determine the $x_1$-coordinates of the points $Pa_1$, $a_2'$, $a_3'$ ($a_1$: 0, 63, 127, 191, 255). First, a description will be given by citing an example in which the value $a_1$ is 0.

Figure 10:
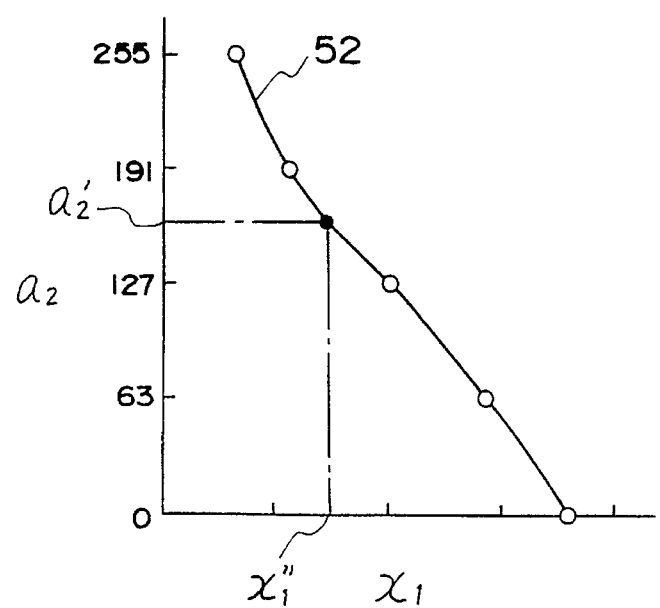
FIG. 10 is an image diagram illustrating a process for determining $x_1$ coordinates on the basis of the value $a_2$.

The $x_1$-coordinates of the point $P_0$, $a_2'$, $a_3'$ are found by performing spline interpolation from the $x_1$-coordinates of five points including a point $P_{0,0}, a_3'$, a point $P_{0,63}, a_3'$, point $P_{0,127}, a_3'$, a point $P_{0,191}, a_3'$, and a point $P_{0,255}, a_3'$. That is, since the $x_1$-coordinates of these five points have already been found in Step 204, by using these coordinates, points are plotted on the $a_2$-$x_1$ coordinate plane where the value $a_2$ and the value $x_1$ perpendicularly intersect each other, and spline interpolation is performed with respect to these plotted points, thereby obtaining a continuous line 52, as shown in FIG. 10. Then, the coordinate of intersection between the straight line $a_2=a_2'$ and this continuous line 52 is determined, and this intersection coordinate is set as a solution (a value $x_1''$ of the $x_1$-coordinate of the point $P_0$, $a_2'$, $a_3'$).

By setting this value $a_1$ consecutively to 0, 63, 127, 191, and 255 and performing processing similar to the one described above, it is possible to determine a coordinate value of each $x_1$-coordinate of the point $Pa_1$, $a_2'$, $a_3'$.

In an ensuing Step 214, the curve $[a_2', a_3']_1$ is determined by using the coordinate values of the points determined above. Namely, since the $x_1$-coordinates of the points $Pa_1$, $a_2'$, $a_3'$ are determined in Steps 210 and 212, points can be plotted on the respective $a_1$-$x_1$ coordinate plane; hence, by performing spline interpolation with respect to these plotted points, it is possible to obtain an arbitrary curve $[a_2', a_3']_1$.

It should be noted that, with respect to the curve $[a_2', a_3']_2$ on the $a_1$-$x_2$ coordinate plane and the curve $[a_2', a_3']_3$ on the $a_1$-$x_3$ coordinate plane as well, it is possible to obtain an arbitrary curve by changing the coordinate plane used above.

Thus, it is possible to determine curves $[a_2', a_3']i$ ($i=1, 2, 3$) with respect to arbitrary values ($a_2', a_3'$). Consequently, it is possible to determine values ($x_1, x_2, x_3$) corresponding to arbitrary values ($a_1', a_2', a_3'$).

Figure 11:
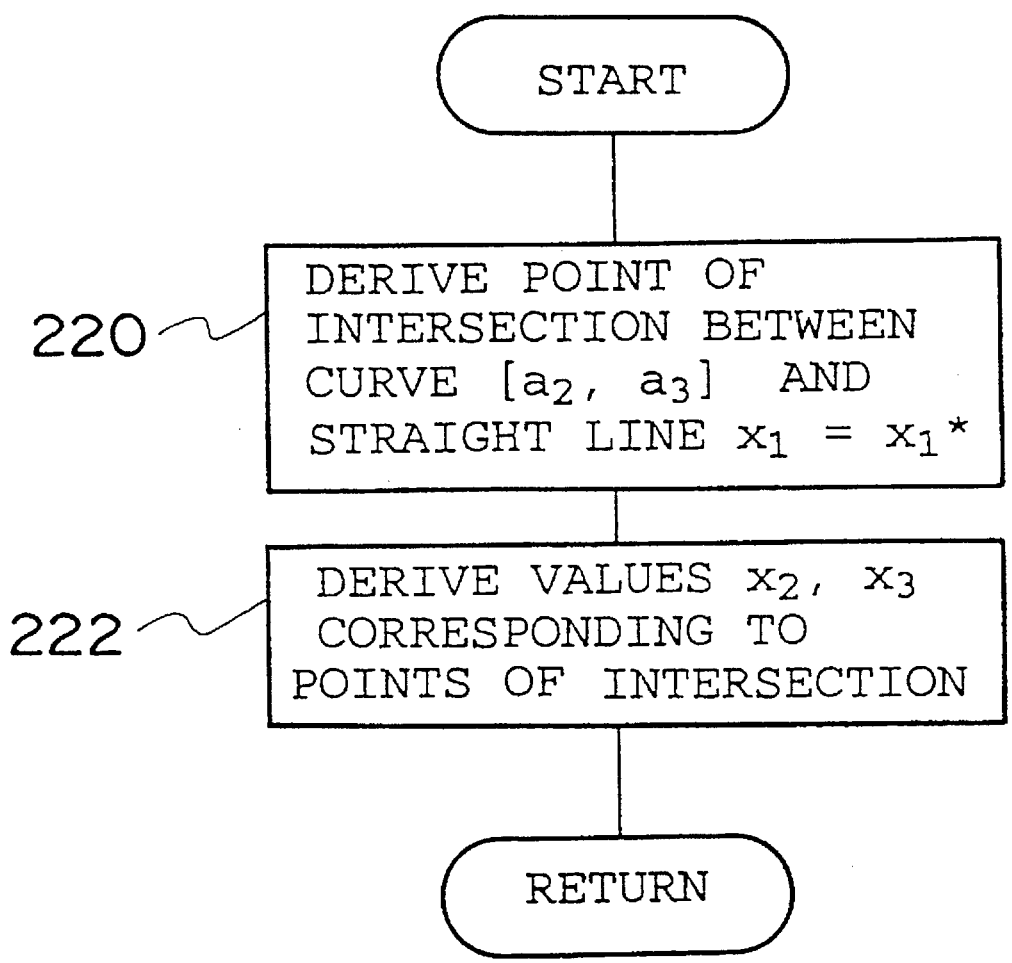
FIG. 11 is a flowchart illustrating the details of a computing routine (Step 206 in FIG. 4) for determining correspondence between the color data and the tristimulus values in the accordance with the first embodiment.

In an ensuing Step 206, correspondence is determined between the values ($a_1, a_2, a_3$) of the color data (Ye, Ma, Cy) and the values ($x_1, x_2, x_3$) of the tristimulus values (X, Y, Z) by the computing routine shown in FIG. 11. It should be noted that, to simplify the description, a description will be given hereafter by citing an example in which the value $x_1$ is a desired predetermined value $x_1^*$. In Step 220 of FIG. 11, by using the curves $[a_2', a_3']_1$, scanning is effected by the values $a_2, a_3$ (by setting the values of $a_2, a_3$ to 0, 1, 2, . . . , 255) so as to determine a point of intersection between each curve $[a_2, a_3]_1$ and the straight line $x_1=x_1^*$.

Figure 12:
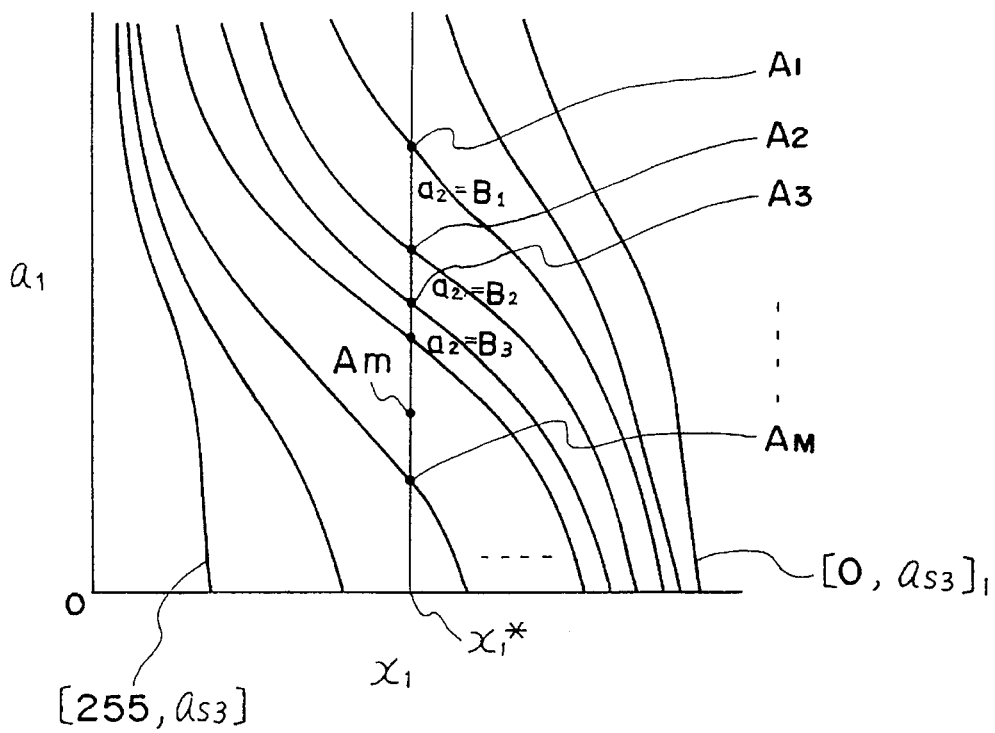
FIG. 12 is an image diagram illustrating a process for determining intersection coordinates between each curve and a straight line.

First, the value $a_3$ is set to a predetermined value $a_{s3}$, and the value $a_2$ is varied consecutively in the order of 0, 1, . . . , 255, so as to determine intersection coordinates (FIG. 12). Namely, a point of intersection between the curve $[a_2, a_{s3}]_1$ with the value $a_2$ varied and the straight line $x_1=x_1^*$ is computed, a coordinate value Am (m: 1, 2, . . . . . , M; M is a maximum number of intersection), i.e., an $a_1$-coordinate value, is determined in the order of these intersection coordinates. In addition, the value $a_2$ of the curve $[a_2, a_{s3}]_1$ corresponding to this coordinate value Am is set as Bm (m: 1, 2, . . . , M; Bm: 1, 2, . . . , 255).

Figure 13:
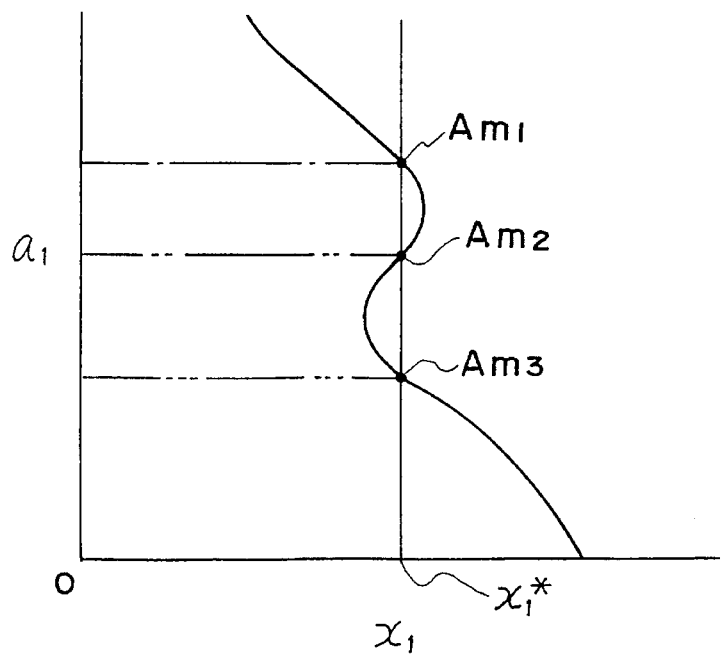
FIG. 13 is an image diagram illustrating a process for determining a plurality of intersection coordinates between a curve and a straight line.

Here, there are cases where a plurality of points of intersection are present in one curve, as shown in FIG. 13. In this case, it is assumed that one curve has a plurality of points of intersection, and coordinate values Amn (n: 1, 2, . . . , K; K is a maximum number of intersection points, 3 in FIG. 13) of the points of intersection are stored in sequence.

In an ensuing Step 222, values $x_2, x_3$ corresponding to the points of intersection found in Step 220 are determined.

Figure 14A:
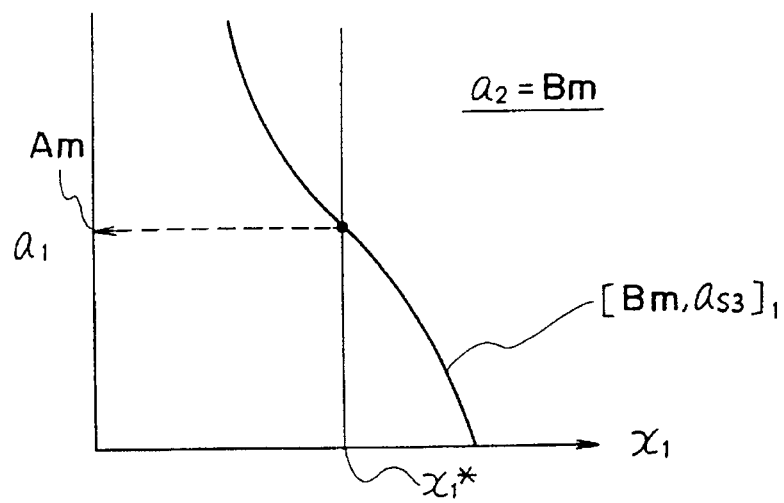
Figure 14B:
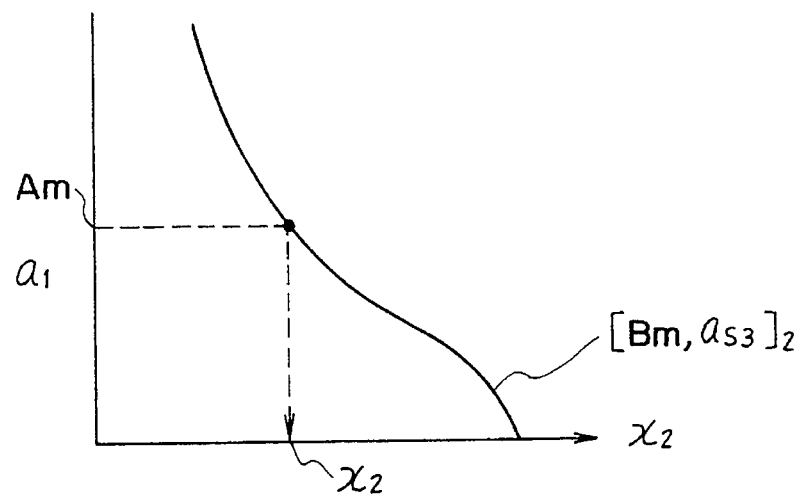

First, in order to determine the value $x_2$, the value $x_2$ is determined by using the curve $[a_2, a_{s3}]_2$ corresponding to the curve $[a_2, a_{s3}]_1$ having a point of intersection. Namely, as shown in FIG. 14A, in a case where the point of intersection on the curve $[Bm, a_{s3}]_1$ in which the value $a_2$ is Bm is the coordinate value Am, a value $x_2$ at which the value $a_1$ is the coordinate value Am is determined in the curve $[Bm, a_{s3}]_2$ (corresponding to the aforementioned curve) on the $a_1$-$x_2$ coordinate plane.

Figure 14C:
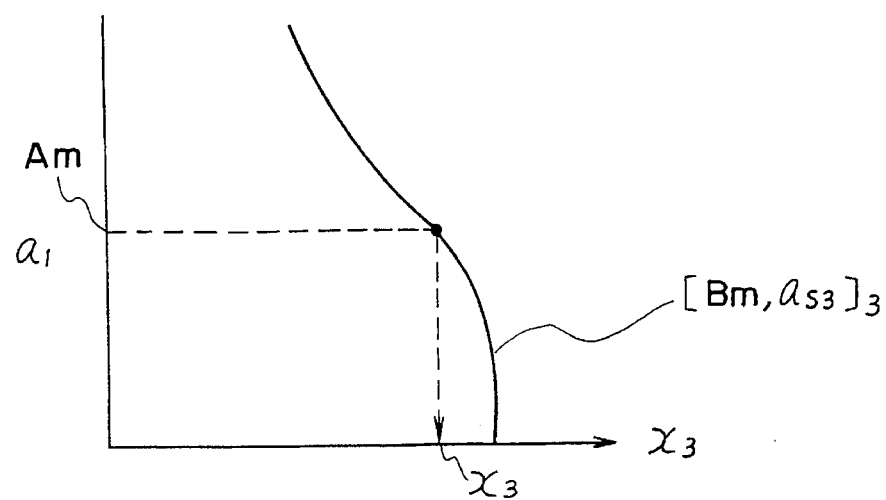

Similarly, the value $x_3$ can be determined from the curve $[a_2, a_{s3}]_3$ on the $a_1$-$x_3$ coordinate plane, as shown in FIG. 14C.

Figure 15A:
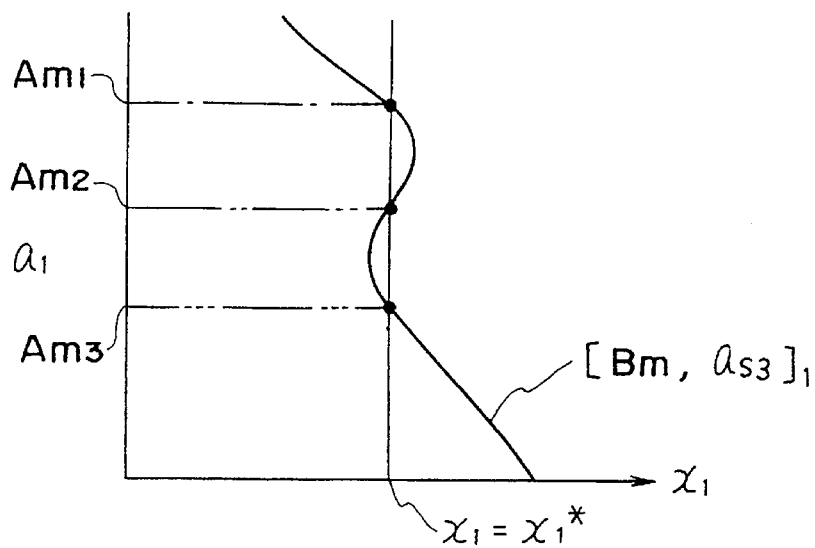
Figure 15B:
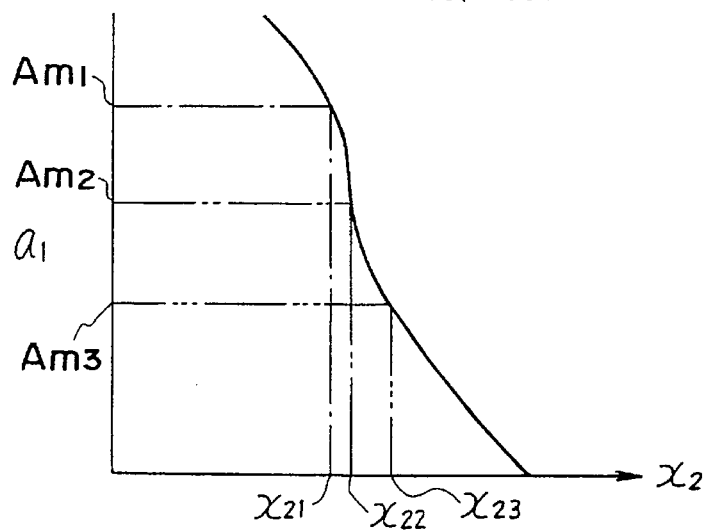

Here, there are cases where a plurality of points of intersection are present in one curve, as described above (FIG. 15A). In this case as well, in order to determine the value $x_2$, a value $x_{2k}$ (k: 1, 2, . . . . , K; K is a maximum number of intersection points) at which the value $a_1$ is the coordinate value Amn is determined in the curve $[Bm, a_{s3}]_2$ on the $a_1$-$x_2$ coordinate plane, as shown in FIG. 15B. Additionally, a value $x_{3k}$ is determined from the curve $[a_2, a_{s3}]_3$ on the $a_1$-$x_3$ coordinate plane.

In the above-described manner, correspondence can be determined between values ($x_1^*, x_2, x_3$) and values ($a_1, a_2, a_{s3}$) in a case where the value $a_3$ is set to a predetermined value $a_{s3}$. Accordingly, by varying the value $a_3$ set in Step 220 consecutively to 0, 1, 2, . . . . , 255 and by executing the processing, it is possible to obtain all correspondences between the values ($a_1, a_2, a_3$) of the color data (Ye, Ma, Cy) and the values ($x_1^*, x_2, x_3$) of the tristimulus values (X, Y, Z).

Although, in the above, a description has been given by citing an example in which the value $x_1$ is a predetermined value $x_1^*$, if the above-described processing is executed by varying this value $x_1$ in the range ($0 \leq x_1 \leq 100$) that the value $x_1$ can assume, it is possible to obtain all correspondences between the values ($a_1, a_2, a_3$) of the color data (Ye, Ma, Cy) and the values ($x_1, x_2, x_3$) of the tristimulus values (X, Y, Z).

Figure 16:
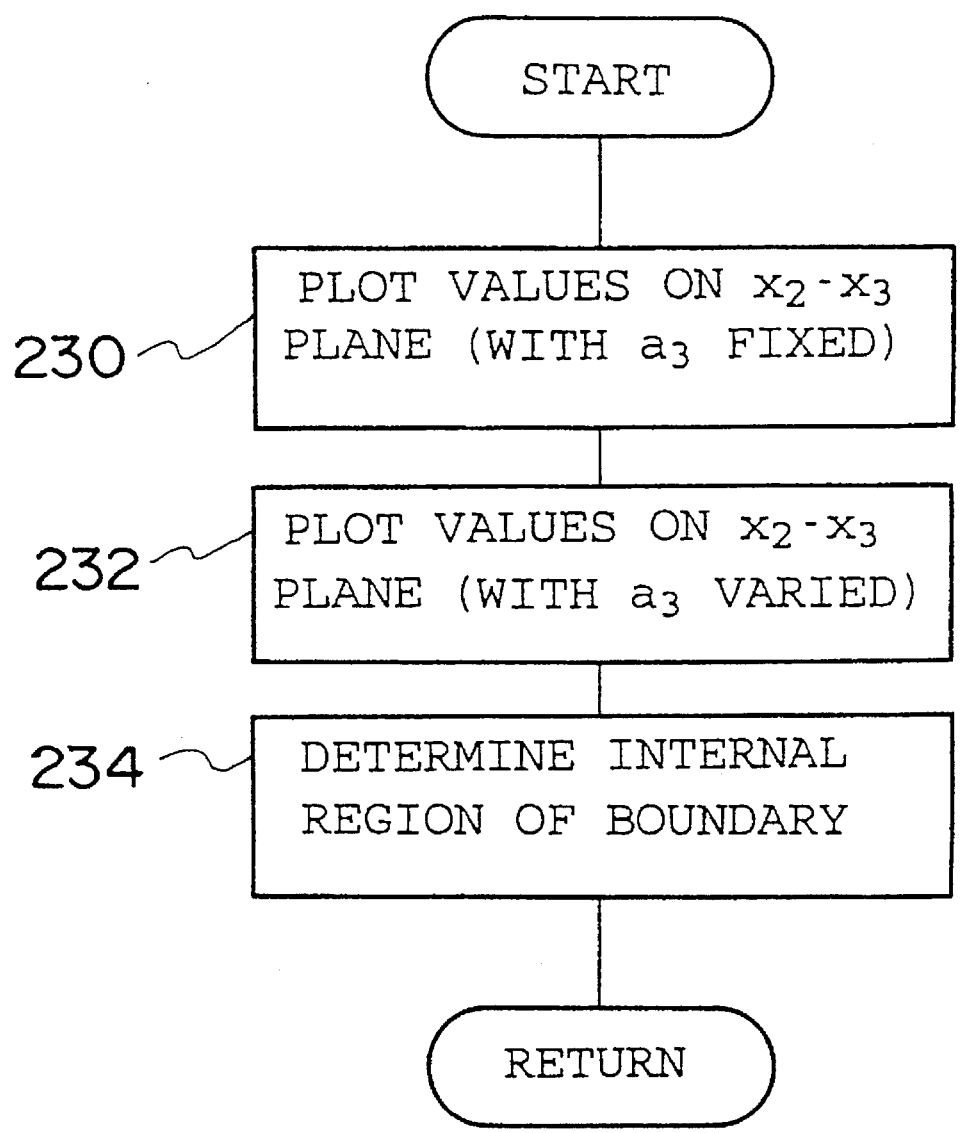
FIG. 16 is a flowchart illustrating the flow of a computing routine (Step 208 in FIG. 4) for determining a boundary in accordance with the first embodiment.

In an ensuing Step 208, a boundary serving as a determination region including arbitrary values is determined from the respective values $x_2, x_3$ of the points of intersection determined by the computing routine of FIG. 16. In this case, an $x_1=x_1^*$ plane in an $x_1$-$x_2$-$x_3$ space, which is a coordinate axis where the respective values ($x_1, x_2, x_3$) perpendicularly intersect each other, is assumed.

Figure 17:
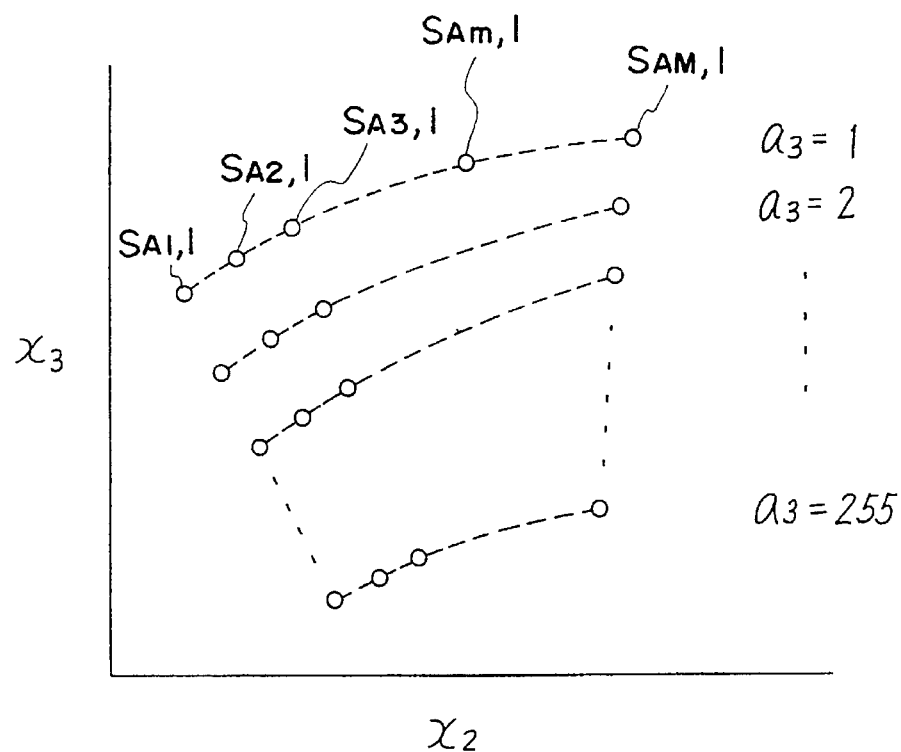
FIG. 17 is an image diagram illustrating a process for plotting points corresponding to points of intersection on an $x_2$–$x_3$ coordinate plane in accordance with the first embodiment.

In Step 230 in FIG. 16, the aforementioned values $x_2, x_3$ of the points of intersection, which are determined in the case where the value $a_3$ is a predetermined value when $x_1=x_1^*$, are plotted on the $x_2$-$x_3$ coordinate plane. In an ensuing Step 232, the respective values $x_2$, $x_3$ of the points of intersection, which are determined in the case where the value $a_3$ is varied consecutively in the order of 0, 1, 2, ... 255, are plotted on the $x_2$-$x_3$ coordinate plane (see FIG. 17). The points in the drawing are represented by $S_{Am}$, $a_3$ (m: 1, 2, ..., M).

Figure 18:
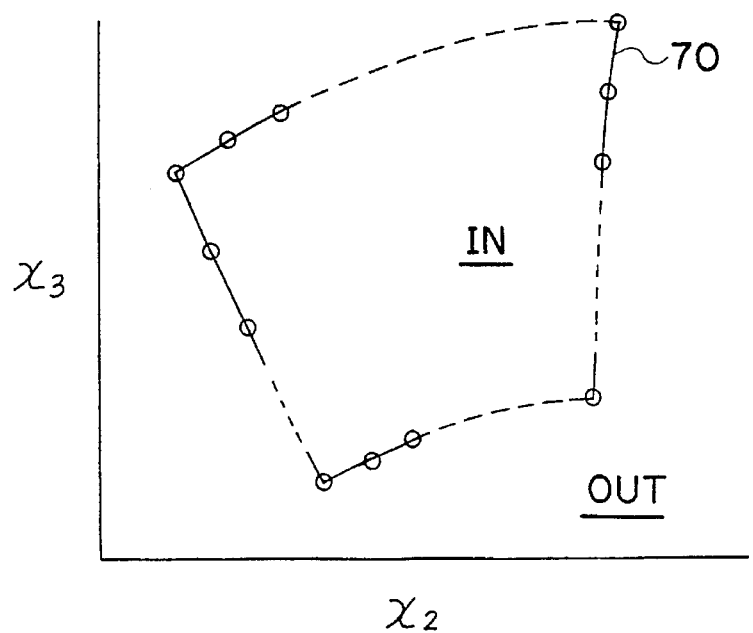
FIG. 18 is a diagram illustrating a boundary formed in accordance with the first embodiment.

In an ensuing Step 234, a boundary 70 of a convex polygonal region including a plurality of points, which serves as a contour of the group of points plotted on the $x_2$-$x_3$ coordinate plane when $x_1=x_1^*$, is determined. In a simple case where curves which correspond to a continuation of points when the value $a_3$ (=1, 2, ...) is a predetermined value do not intersect each other on the $x_2$-$x_3$ coordinate plane, it suffices to determine the boundary 70 of the convex polygonal region by simply connecting together endpoints which constitute the contour of the group of points plotted on the $x_2$-$x_3$ coordinate plane. In other words, as shown in FIG. 18, all the points when the value $a_3$ is a maximum value and a minimum value are included in the internal region of the boundary 70. Thus, the boundary 70 constitutes contour lines of the region which include all the points with respect to each value $a_3$ when the value $a_3$ is a maximum value and a minimum value.

Combinations of the values ($a_1$, $a_2$, $a_3$) corresponding to all the points included in a region IN within this boundary 70 include all sets concerning the values $a_2$, $a_3$, and the value $a_1$ becomes a real number which is determined univalently by the values $x_1$ and the values $a_2$, $a_3$. For this reason, the region IN of this boundary 70 covers all the combinations that can be assumed by the values ($a_1$, $a_2$, $a_3$).

Therefore, if the value $x_1$ is varied in the range ($0 \leq x_1 \leq 100$) in which the value $x_1$ is capable of assuming the value $x_1^*$, and the aforementioned processing is executed, it is possible to determine a boundary of the region which covers all the combinations that can be assumed by the values ($a_1$, $a_2$, $a_3$). For this region, the boundary forms a closed region in the $x_1$-$x_2$-$x_3$ space.

Figure 25:
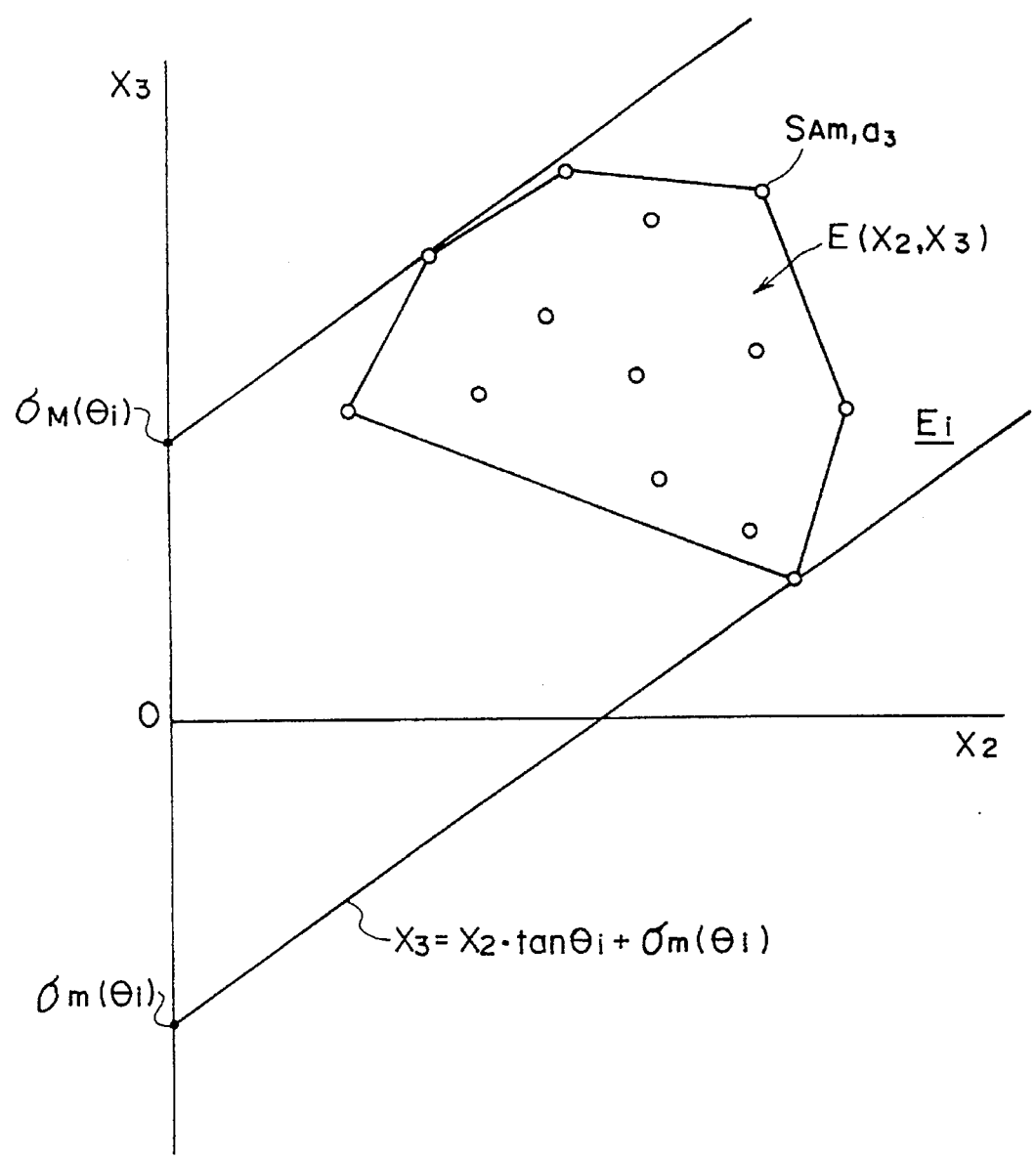
FIG. 25 is a diagram illustrating a boundary in another polygonal region in accordance with the first embodiment.

In addition, in a case where the convex polygonal region in Step 234 above is complicated and the curves with respect to the value $a_3$ (1, 2, ...) intersect each other, it is estimated that the region including points $S_{Am}$, $a_3$ (m=1, 2, ..., M; and $a_3$=1, 2, ...) becomes a complicated convex polygon, as shown in FIG. 25. In this case, it is possible to determine the boundary 70 by determining an internal region E of the convex polygon as shown below.

First, an angle of $\pi/2$ to $-\pi/2$ is divided equally into N parts by N (a natural number) which is sufficiently large, and an angle $\theta i$ (i: 1, 2, ..., N) which is incremented by each predetermined angle at the time of this equal division can be expressed by the following Formula (4):

$$\theta i = -\pi/2 + i \cdot \pi/N \quad (4)$$

A straight line having a coordinate value $\sigma$ and an inclination $\theta$ when $x_2=0$ on the $x_2$-$x_3$ coordinate plane can be expressed by Formula (5) below. The $x_3$ coordinate $\sigma$ of a point of intersection between this straight line and the coordinate axis ($x_2=0$) on the $x_2$-$x_3$ coordinate plane is defined by the following Formula (6) as a function with respect to each of the aforementioned angles $\theta i$ by using $x_2$, $x_3$ as parameters.

$$x_3 = x_2 \cdot \tan\theta + \sigma \quad (5)$$

$$\sigma(x_2, x_3, \theta i) = -x_2 \cdot \tan\theta i + x_3 \quad (6)$$

where i=1, 2, ..., N−1

When i=N, $$\sigma(x_2, x_3, \theta_N) = x_2$$

With respect to each of the angles $\theta i$, a maximum value $\sigma_M(\theta i)$ and a minimum value $\sigma_m(\theta i)$ based on the coordinate values of the point $S_{Am}$, $a_3$ concerning the angle $\theta i$ are determined by comparing the results of computation when the coordinate values ($x_2$, $x_3$) of the aforementioned point $S_{Am}$, $a_3$ are substituted by using Formula (6) above (refer to Formulae (7)).

$$\sigma_M(\theta i) = \max\{\sigma(x_2, x_3, \theta i)\}$$

$$\sigma_m(\theta i) = \min\{\sigma(x_2, x_3, \theta i)\} \quad (7)$$

Accordingly, all the aforementioned points $S_{Am}$, $a_3$ are included in the region sandwiched by straight lines defined by each angle $\theta i$ as well as the maximum value $\sigma_M(\theta i)$ and the minimum value $\sigma_m(\theta i)$ corresponding to each angle $\theta i$.

Points $E_i(x_2, x_3)$ which are included in the region sandwiched by the straight lines defined by each angle $\theta i$ as well as the maximum value $\sigma_M$ and the minimum value $\sigma_m$ corresponding to each angle $\theta i$ can be expressed by the following Formula (8):

$$E_i(x_2, x_3) = \{(x_2, x_3) | \alpha + \sigma_m \leq x_3 \leq \alpha + \sigma_M\} \quad (8)$$

Where, i=1, 2, ... N−1

$\alpha = x_2 \tan\theta i$ $\sigma_m = \sigma_m(\theta i)$ $\sigma_M = \sigma_M(\theta i)$ $E_N(x_2, x_3) = \{(x_2, x_3) | \sigma_m(\theta_N) \leq x_3 \leq \sigma_M(\theta_N)\}$ Of the points $E_i(x_2, x_3)$ which are included in the region defined by each of these angles $\theta i$, points $E(x_2, x_3)$ which are included for all the angles $\theta 1$ are all the points that are included in the convex polygonal region, so that the convex polygonal region can be defined by the following Formula (9):

$$E(x_2, x_3) = \{(x_2, x_3) | E_1 \cap E_2 \cap \ldots \cap E_N\} \quad (9)$$

where $E_i$ (i=1, 2, ..., N) is $E_i(x_2, x_3)$ of Formula (8) above.

Therefore, it is possible to determine the boundary 70 in the convex polygonal region by the straight lines that are defined by the aforementioned maximum value $\sigma_M$ and the minimum value $\sigma_m$ at each angle $\theta i$ when the convex polygonal region is formed in such a manner as to include these points $E(x_2, x_3)$.

Step 300 is a processing step for determining values ($a_1^*$, $a_2^*$, $a_3^*$) of color data corresponding to arbitrary tristimulus values ($x_1^*$, $x_2^*$, $x_3^*$) by setting the boundary found in the above as a determination region. It should be noted that, in this step, the $x_1=x_1^*$ plane in the $x_1$-$x_2$-$x_3$ space is considered.

Figure 19:
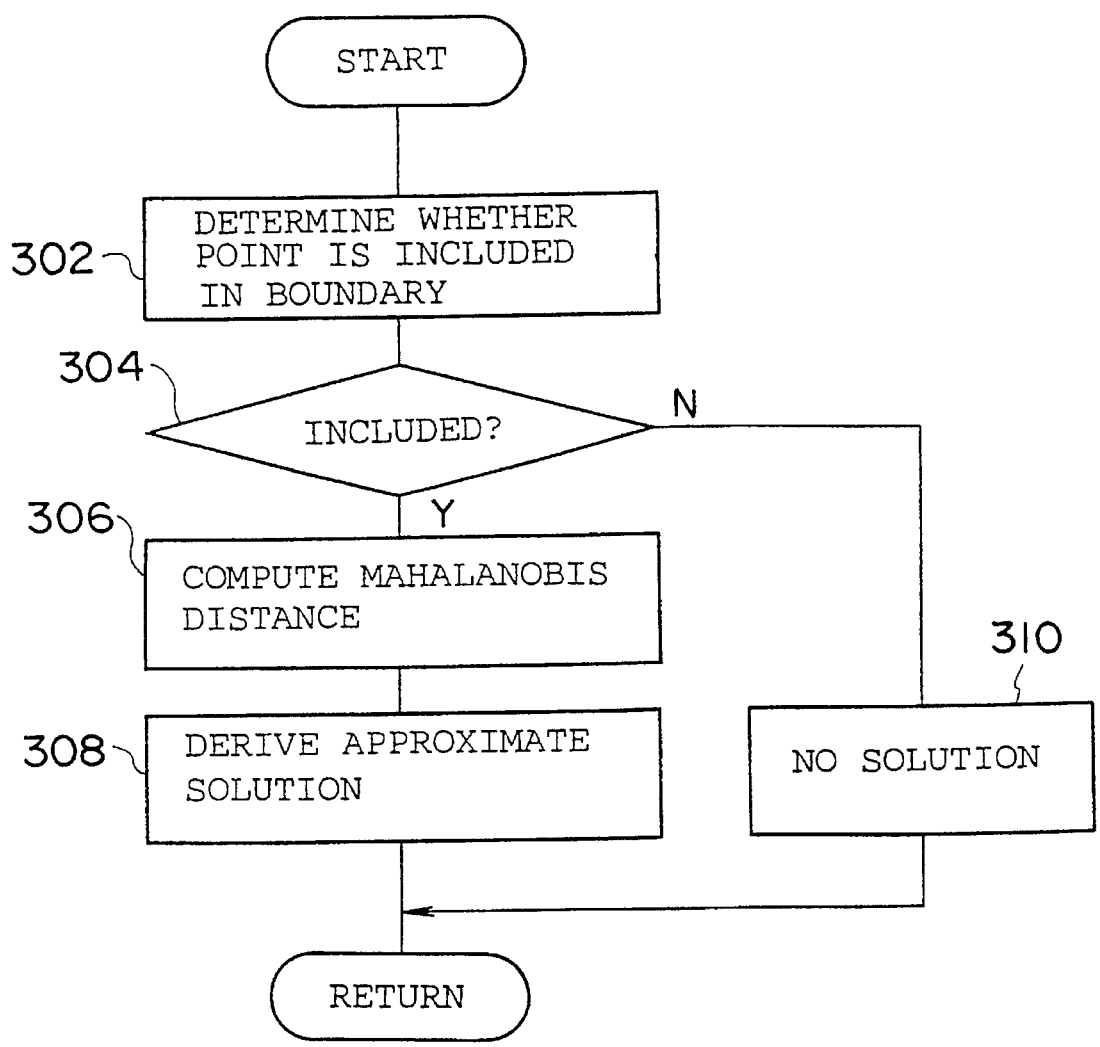
FIG. 19 is a flowchart illustrating the flow (Step 300 in FIG. 2) of color data corresponding to arbitrary tristimulus values in accordance with the first embodiment.
Figure 20:
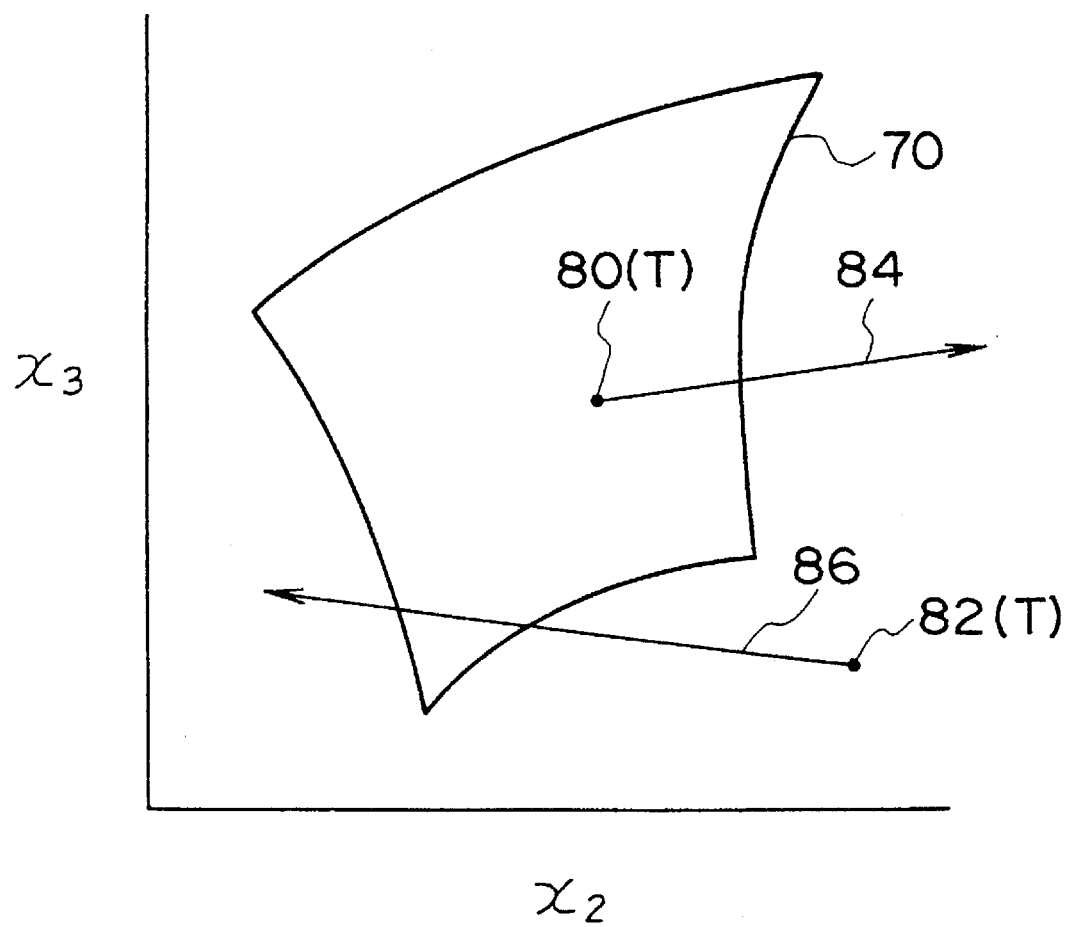
FIG. 20 is an image diagram for explaining a determination as to whether or not the point is within a boundary of arbitrary tristimulus values in accordance with the first embodiment.

First, the operation proceeds to Step 302 in FIG. 19 to determine whether or not a point T plotted on the $x_2$-$x_3$ coordinate plane by the values ($x_2^*$, $x_3^*$) is included in the aforementioned boundary 70. This determination is made as follows: A point is plotted at the position of the values ($x_2^*$, $x_3^*$) on the $x_2$-$x_3$ coordinate plane, a semi-infinite straight line is formed in a predetermined direction by setting the point T at the position of ($x_2^*$, $x_3^*$) as a starting point, and a point of intersection between this semi-infinite straight line and the boundary is determined. If there are the number of these points of intersection is an odd number, the points are present within the boundary 70, whereas if it is an even number, the points are present outside the boundary 70. For instance, as shown in FIG. 20, the number of points of intersection between a point 80 at the position of $(x_2^*, x_3^*)$ on the one hand, and a semi-infinite straight line 84 on the other, is an odd number, so that a determination is made that the point 80 is present within the boundary 70. Meanwhile, the number of points of intersection between a point 82 and a semi-infinite straight line 86 is an even number, so that a determination is made that the point 82 is present outside the boundary 70.

In an ensuing Step 304, a determination is made as to whether or not the point T is included in the boundary 70. If it is determined that the point is present within the boundary 70, in Step 306, a Mahalanobis distance Di from the point T is determined with respect to all the points included in the boundary 70 by using the following Formula (10):

$$Di=\sqrt{\{(x_2^*-x_{2i})^2+(x_3^*-x_{3i})^2\}} \qquad (10)$$

where $i=1, 2, \ldots$

In an ensuing Step 308, a minimum value of the Mahalanobis distance Di thus determined is selected, and the value $(a_1, a_2, a_3)$ of the point which is this minimum value is selected as an approximate solution of the value $(a_1^*, a_2^*, a_3^*)$ of the desired color data.

Meanwhile, if NO is the answer in the determination in Step 304, an approximate solution corresponding to the desired color data cannot be selected. Hence, in Step 310, processing is carried out to the effect that there is no solution, and this routine ends.

If minimum values of all the Mahalanobis distances Di are selected by consecutively varying the value $x_1$ in this processing, it is possible to obtain a closest approximate solution.

It should be noted that a determination may be made as to whether or not the aforementioned semi-infinite straight line passes an odd number of times the boundary serving as the closed region in the $x_1-x_2-x_3$ space, although the computation will be complicated.

In addition, although, in the above-described embodiment, a description has been given of the case where the present invention is applied to color reproduction in the color copying apparatus 18 by the subtractive mixture of color stimuli, the present invention is readily applicable to cases of color reproduction in which color data in the RGB colorimetric system on the basis of the additive mixture of color stimuli are determined so as to display a desired color on the CRT 14.

Next, a description will be given of a second embodiment. In the first embodiment, an arbitrary and desired color is specified on the basis of combinations of color data in the XYZ colorimetric system and color data in the RGB colorimetric system, which are in predetermined small numbers, to effect color reproduction. In the second embodiment, on the other hand, an arbitrary relationship is estimated from a small number of relationships with respect to a first set and a second set respectively having a large number of elements and related to each other as physical amounts, and a relevant relationship is selected from a physical amount of a desired second set.

First, preconditions in this embodiment will be described.

Values of the first set are set as values ai $(i=1, 2, \ldots, K$; natural numbers), values of the second set are set as values xj $(j=1, 2, \ldots, L$; natural numbers), and it is assumed that values xi based on combinations of K values ai are determined by a function f, as shown in the following Formula (11):

$$f_j: (a_1, a_2, \ldots, a_K) \to x_j \qquad (11)$$

where $p \leq ai \leq q$ (p, q: real numbers; $p<q$)

The function $f_j$ is unknown.

Here, e discrete values W obtained by equally dividing the interval between the real number p and the real number q by $(e-1)$ can be expressed by the following Formula (12):

$$W=\{x|x\in(p, p+A, P+2A, \ldots, p+(e-1)A)\} \qquad (12)$$

where e: natural number $$A=(q-p)/(e-1)$$

At this time, if it is assumed that the value ai is one of the discrete values W (ai∈W), and that combinations of the value xj with respect to all permutations and combinations of the value ai are known, then it follows that $e^K$ sets of correspondence are known between $(a_1, a_2, \ldots, a_K)$ and $(x_1, x_2, \ldots, x_L)$.

In this embodiment, combinations of K values ai* corresponding to combinations of L arbitrary values xj* under these preconditions are assumed.

Hereafter, the operation of this embodiment will be described. Since the main routine is similar to that of FIG. 2, a description thereof will be omitted.

Figure 21:
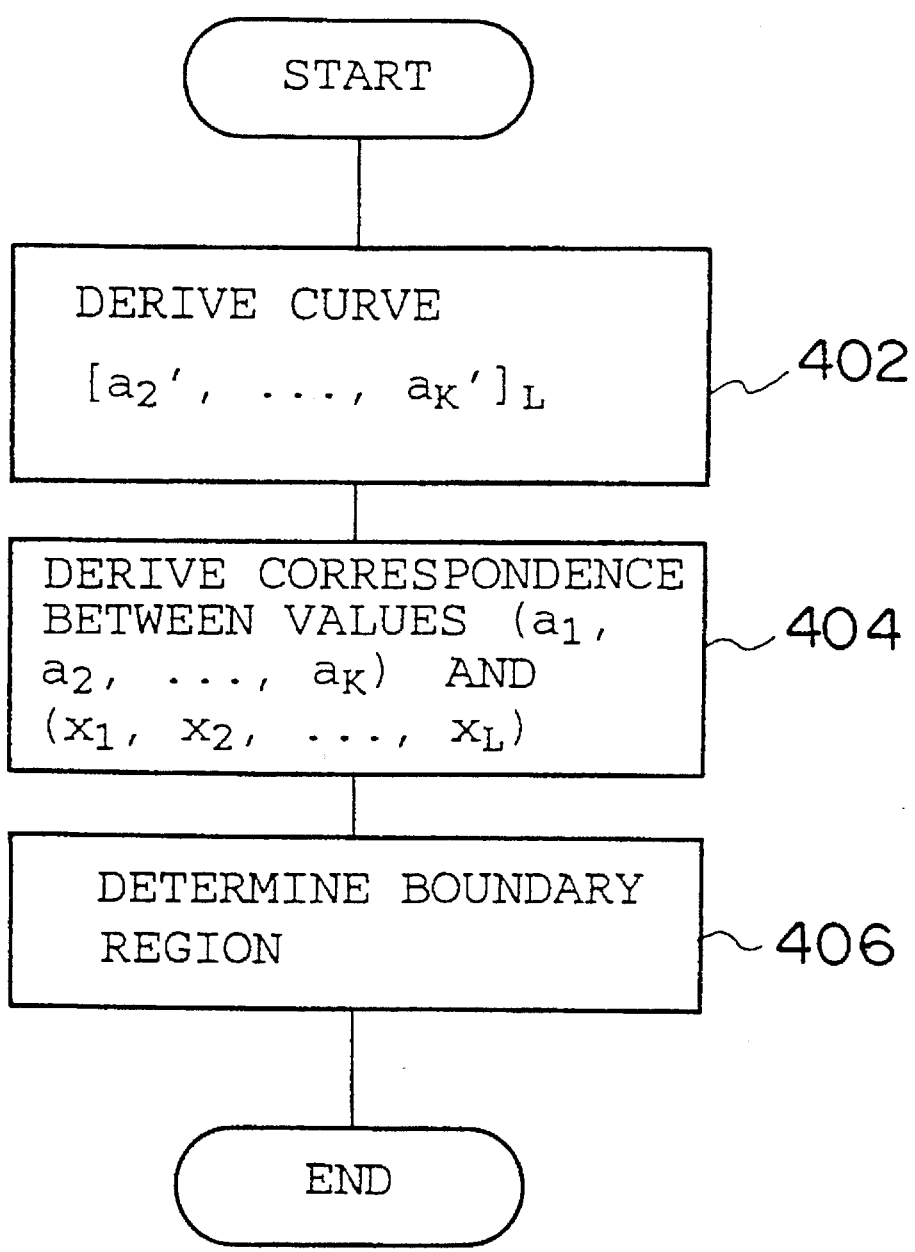
FIG. 21 is a flowchart illustrating the details of an interpolation processing routine (Step 200 in FIG. 2) in accordance with a second embodiment.

In Step 200 in FIG. 2 in this embodiment, an interpolation processing routine shown in FIG. 21 is executed.

Figure 22:
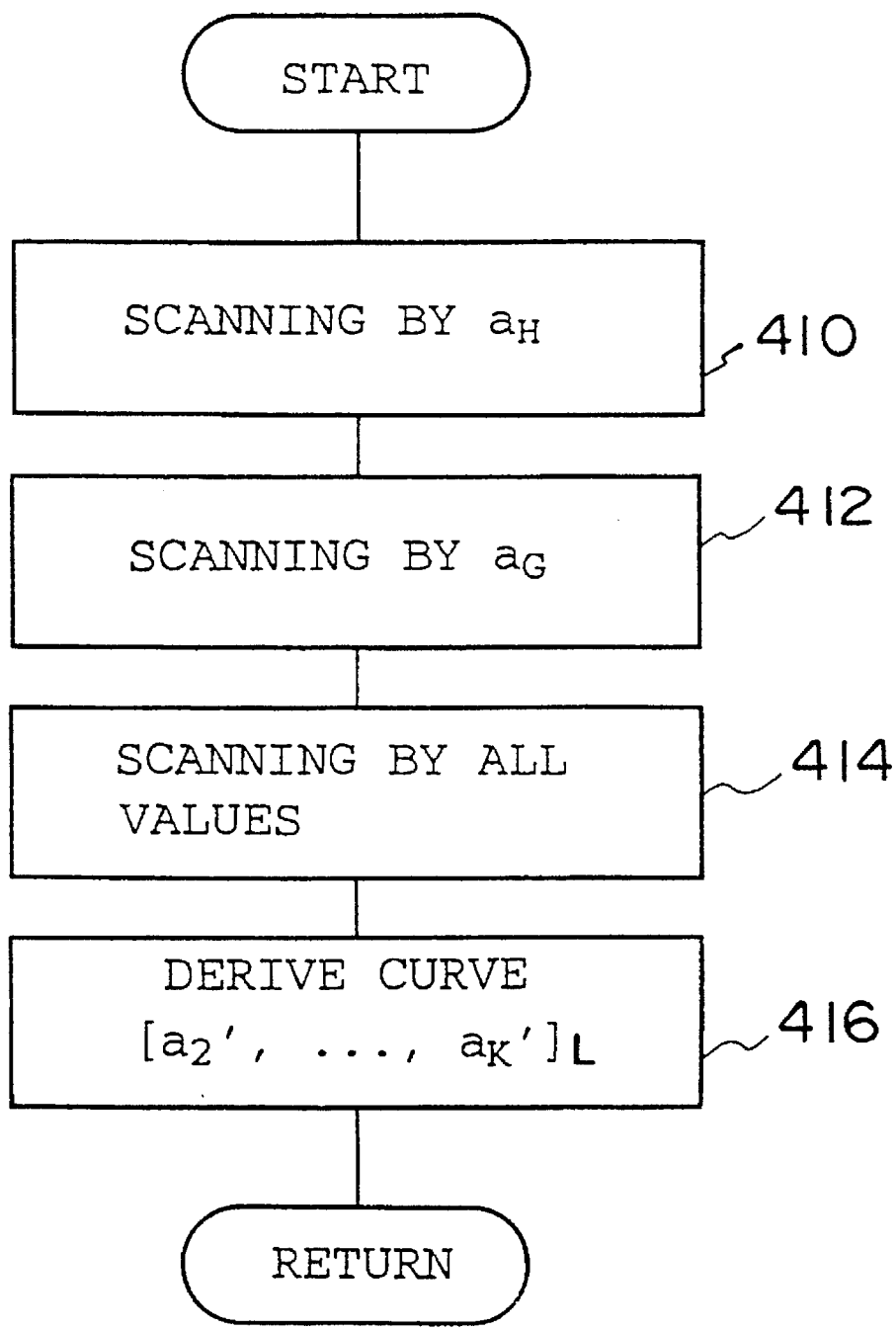
FIG. 22 is a flowchart illustrating the details of an curve-deriving processing routine (Step 402 in FIG. 21) in accordance with a second embodiment.

In Step 402 in FIG. 21, curves $[a_2', \ldots, a_K']_L$ each including arbitrary values $(a_1', a_2', \ldots, a_K')$ are determined by the computing routine shown in FIG. 22. Each of these curves $[a_1', a_2', \ldots, a_K']_L$ is determined by carrying out spline interpolation with respect to a specific number of points plotted on each $a_1-xi$ coordinate plane when the value $a_1$ is a known value. In other words, the curves are determined on the basis of points $Pa_1, a_2', a_3', \ldots, a_K'$ on the $a_1-x_1$ coordinate plane, points $Qa_1, a_2', a_3', \ldots, a_K'$ on the $a_1-x_2$ coordinate plane, and points $Ra_1, a_2', a_3', \ldots, a_K'$ on the $a_1-x_3$ coordinate plane in the same way as in the foregoing embodiment. Coordinate values of respective $x_1$ coordinates are determined by effecting scanning consecutively by the known value ai, and interpolation is carried out with respect to the points plotted on the $a_1-x_1$ coordinate plane, thereby determining arbitrary curves $[a_2', \ldots, a_K']_L$.

More particularly, in Step 410 of FIG. 22, each $x_1$ coordinate of the point P on the $a_1-x_1$ coordinate plane is determined by effecting scanning by a predetermined value $a_H'$ (any one of natural numbers satisfying $2 \leq H \leq K$). First, values other than the predetermined value $a_H'$ are set to known values, and e curves are determined in which the predetermined value $a_H'$ is consecutively increased by an increment A each up to (e-1 times)q, starting with a curve in which the predetermined value $a_H'$ is set to a predetermined value p. Each $x_1$ coordinate for the predetermined value $a_H'$ is determined from these e curves. Namely, since the $x_1$ coordinates are known as described above, by using these coordinates, coordinates of points of intersection between straight lines $a_H=a_H'$ and the e curves on the $a_H-x_1$ coordinate plane where the value $a_H'$ and the value $x_1$ perpendicularly intersect each other are set as solutions (values $x_1'$ of the $x_1$ coordinates). Then, the values other than the value $a_H'$ which have been set to known values are respectively set from the predetermined value p by the increment A each up to (e-1 times)q, and processing similar to the one described above is performed to obtain coordinate values of the $x_1$ coordinates of the respective points $Pa_1, a_2, a_3, \ldots, a_H', \ldots, a_K$. In an ensuing Step 412, by using the coordinate values of the $x_1$ coordinates found in Step 410, scanning by a value $a_G$ is carried out in the same way as described above to obtain $x_1$ coordinates of points $Pa_1, a_2,$ $a_3', \ldots, a_H', \ldots, a_G', \ldots, a_K'$. In an ensuing Step 414, the processing in Step 412 is processed by mathematical induction to obtain $x_1$ coordinates of points $Pa_1, a_2', a_3', \ldots, a_K'$.

In an ensuing Step 416, curves $[a_2', \ldots, a_K']_1$ are determined by using the coordinate values of the points thus obtained. That is, since the respective $x_1$ coordinates of the points $Pa_1, a_2', a_3', \ldots, a_K'$ are determined in Steps 410 to 414 above, points can be plotted on the $a_1$-$x_1$ coordinate planes. By interpolating with respect to these plotted points, arbitrary curves $[a_2', \ldots, a_K']_1$ are determined.

It should be noted that curves $[a_2', a_3']_2$ on the $a_1$-$x_2$ coordinate plane and curves $[a_2', a_3']_3$ on the $a_1$-$x_3$ coordinate plane can also be determined in a similar manner by changing the coordinate planes used above.

Figure 23:
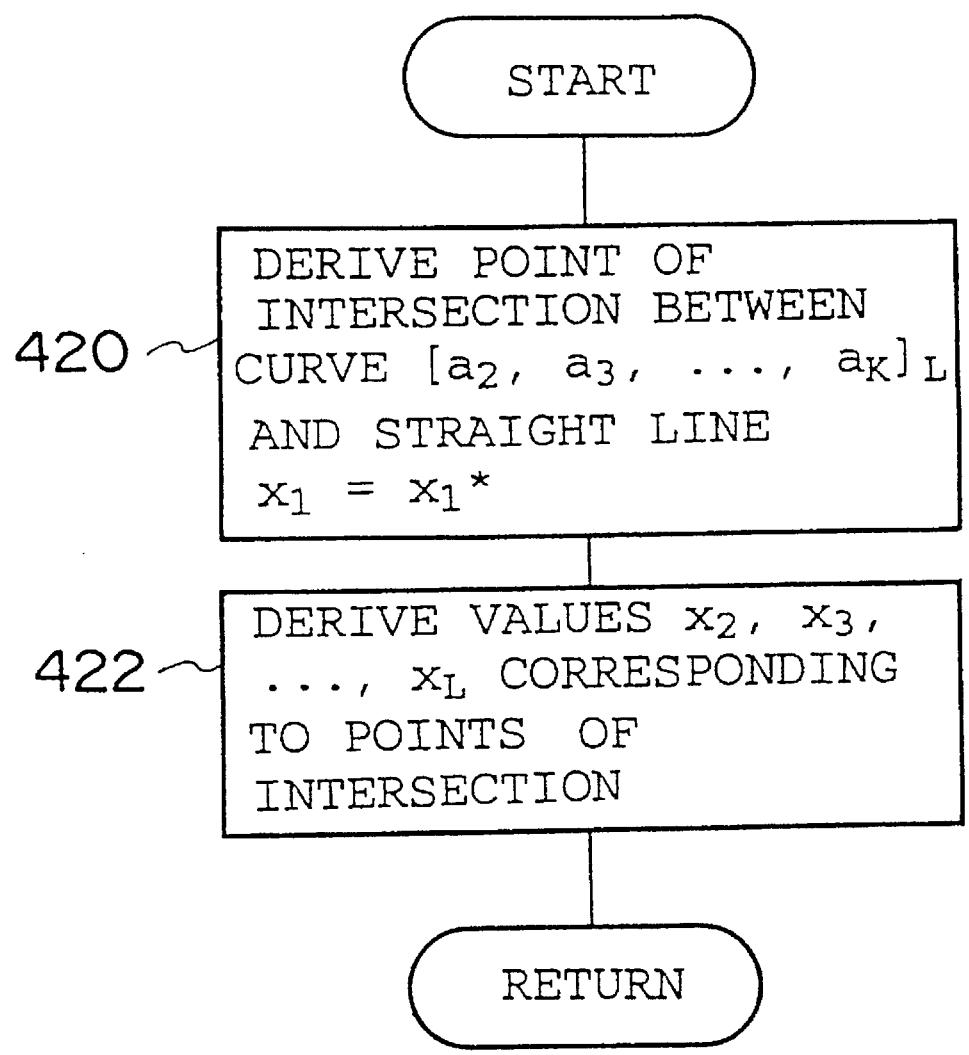
FIG. 23 is a flowchart illustrating the details of a computing routine (Step 404 in FIG. 21) in which correspondence between a first set and a second set is determined in accordance with the second embodiment.

Next, in Step 404, correspondence between the values $(a_1, a_2, \ldots, a_K)$ of the first set and the values $(x_1, x_2, \ldots, x_L)$ of the second set is determined by the computing routine shown in FIG. 23. Incidentally, to simplify the description, a description will be given by citing an example in which the value $x_1$ is a predetermined value $x_1^*$.

In Step 420 of FIG. 23, scanning is effected by a predetermined value $a_H$ (any one of natural numbers satisfying $2 \leq H \leq K$) by using the curves $[a_2', \ldots, a_K']_1$ obtained above (i.e., by varying the value $a_H$ at arbitrary intervals in the range $p \leq a_H \leq r$) to determine points of intersection between a curve $[a_2, \ldots, a_H, \ldots, a_K]_1$ and the straight line $x_1 = x_1^*$.

At this time, the coordinate value of the value $a_1$ is set as a coordinate value $U_{Hi}$ (i: 1, 2, ..., max; max is a maximum number of points of intersection), and the point of intersection is set as a point of intersection $(x_1^*, U_{Hi})$. In addition, the value $a_H$ which gives this point of intersection $(x_1^*, U_{Hi})$ is set as a value $V_H$.

In an ensuing Step 422, values $x_2$ to $x_L$ corresponding to the points of intersection found in Step 420 are determined.

First, to determine the value $x_2$, the value $x_2$ is determined by using a curve $[a_2, \ldots, a_H(V_H), \ldots, a_K]_2$ corresponding to a curve $[a_2, \ldots, a_H(V_H), \ldots, a_K]_1$ having a point of intersection. Namely, when the point of intersection on the curve $[a_2, \ldots, a_H(V_H), \ldots, a_K]1$ in which the value $a_H$ is $V_H$ is a coordinate value $U_{Hi}$ as shown in FIG. 24A, a value $x_2$ is determined at which the value $a_1$ is a coordinate value $U_{Hi}$ on the curve $[a_2, \ldots, a_H(V_H), \ldots, a_K]_2$ (corresponding to the above curve) on the $a_1$-$x_2$ coordinate plane, as shown in FIG. 15(B).

Figure 15C:
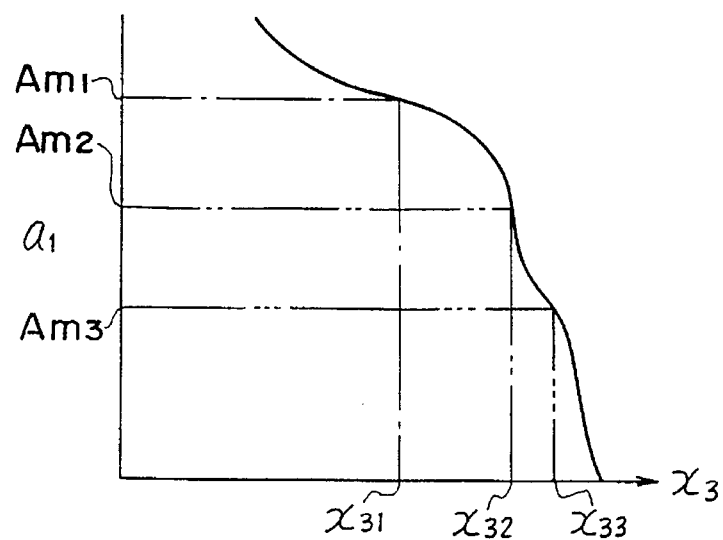

Similarly, as shown in FIG. 15C, the value $x_L$ is finally determined from a curve $[a_2, \ldots, a_H(V_H), \ldots, a_K]_L$ on the $a_1$-$x_L$ coordinate plane using the curve $[a_2, \ldots, a_H(V_H), \ldots, a_K]_L$.

In this manner, the values $x_2$ to $x_L$ which correspond to the points of intersection $((x_1^*, U_{Hi})$ at which the coordinate value $a_1$ is the coordinate value $U_{Hi}$ are determined.

Accordingly, if the above processing is executed by consecutively varying the predetermined value of the value $a_H$ which is set, it is possible to determine all the correspondences between the values $(a_1, a_2, a_3, \ldots)$ of the first set and the values $(x_1^*, x_2, x_3, \ldots)$ of the second set. It should be noted that if the above processing is executed by varying the value $x_1$ in the range that the value $x1$ can assume, it is possible to determine all the correspondences between the values $(a_1, a_2, a_3, \ldots)$ and the values $(x_1, x_2, x_3, \ldots)$.

In an ensuing Step 406, a space serving as a determination region including arbitrary values is determined from the respective values $x_2$ to $x_L$ of the points of intersection determined in the above. Namely, the values $x_2$ to $x_L$ of the points of intersection defined by $x_1 = x_1^*$ are plotted in the $x_2$-$x_i$-$x_L$ coordinate space (an $L-1$ dimensional space) as characteristic points SDi (i: $_1 \leq i \leq$ MAX; MAX is the total number of characteristic points). This coordinate space is set as a determination region used below. Incidentally, a closed region including all the points plotted in this coordinate space may be determined, and may be set as a boundary CC.

Next, Step 300 in this embodiment is a processing step for determining values $(a_1^*, a_2^*, \ldots, a_K^*)$ corresponding to arbitrary values $(x_1^*, x_2^*, \ldots, x_L^*)$ from the determination region determined in the above. First, values $(x_2^*, \ldots, x_L^*)$ are extracted from desired arbitrary values $(x_1^*, x_2^*, \ldots, x_L^*)$, and are set as desired points SSD. Then, the distance Di of each point is determined in the space serving as the aforementioned determination region by using the following Formula (13):

$$Di = |SDi - SSD| \qquad (13)$$

Next, smallest values of the distances thus determined are selected, and respective values $x_2$ to $x_L$ of the characteristic points SDi corresponding to the selected smallest values are set as solutions. Values $(a_1, a_2, \ldots)$ corresponding to these solutions are selected as approximate solutions.

It should be noted that a determination may be made as to whether or not the characteristic points plotted in the coordinate space in the same way as in the above-described embodiment are included in the aforementioned boundary CC, and that the above processing may be effected if it is determined that the points are present within the boundary CC.

This second embodiment is applicable to character recognition. In this case, a set of characteristic amounts of characters is used as the first set, while a set of characters is used as the second set. Accordingly, if characters $xj$ (j=1, 2, ..., L; natural numbers), i.e., the second set, with respect to characteristic amounts $ai$ (i=1, 2, ..., K; natural numbers) of characters in the first set are determined with respect to a predetermined number of characters, and their relation is determined from the function f of Formula (11) above, it is possible to specify corresponding (approximate) characters from combinations of the characteristic amounts $ai$ of characters in an arbitrary first set.

Thus, in the above-described embodiment, since desired data can be converted on the basis of a small number of data, and multi-intersection processing, which has conventionally been difficult to perform, is discriminated by the intersection number, a determination as to whether or not desired data is included can be easily made by determining whether the data is located inside or outside a region.

Although, in the above-described embodiment, a description has been given of an example in which curves are determined by spline interpolation, it is possible to use other interpolation methods.

Figure 26:
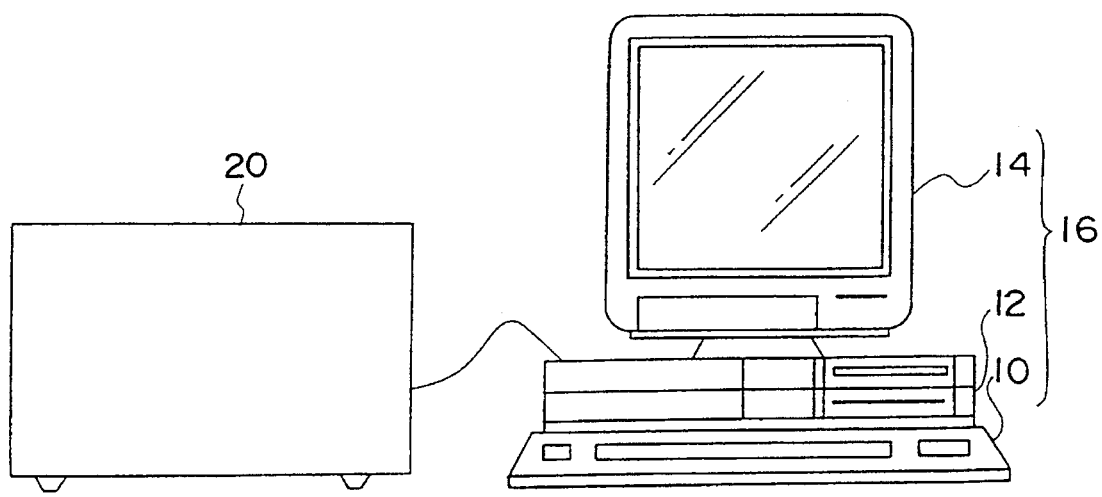
FIG. 26 a schematic diagram of a color reproducing apparatus for reproducing a coating color, including a personal computer, in accordance with a third embodiment of the present invention.

Next, a description will be given of a third embodiment. In this embodiment, the present invention is applied to a color reproducing apparatus for reproducing a coating color. In this embodiment, as shown in FIG. 26, a color-material mixing apparatus 20 having an automatic measuring device is used instead of the color copying apparatus 18. The personal computer 16 is comprised of the keyboard 10 for entering data and the like, the main unit 12 of the computer for computing and outputting relevant data for generating a desired coating color in accordance with a program stored in advance, and the CRT 14 for displaying a coating color or the like which is the result of computation by the main unit 12 of the computer. The color-material mixing apparatus 20 generates a paint by mixing a plurality of color materials after measuring the color materials such as pigments by a measuring instrument, e.g., an electronic force balance, in response to signals outputted from the personal computer 16.

Here, in this embodiment, to reproduce a coating color, physical amounts for specifying the coating color are set as follows.

As already mentioned in the description of the related art, if the spectral reflectance of the coated surface can be specified, the tristimulus values and the like of the color can be determined, with the result that its surface color can be specified. Therefore, in this embodiment, the spectral reflectance of an original or object surface is used to realize color reproduction for displaying a color image or the like and for specifying a faithful coating color on the object surface. It should be noted that values of this spectral reflectance, when measured with respect to surfaces of samples having complicated configurations, such as fibers and metallic coatings, can vary depending on the direction of light reception of the measuring instrument. In this embodiment, therefore, a spectral reflectance factor is used which is a three-dimensional reflectance obtained by varying the angle of incidence upon a sample and the light-receiving angle of a light-receiving element for receiving the light reflected by the sample.

The reflectance of a sample having a flat surface can be usually measured (photometrically measured) by a gonio-spectrophotometer 24. This measured reflectance is referred to as the spectral reflectance factor, which will be simply referred to hereafter as the reflectance R.

Figure 27:
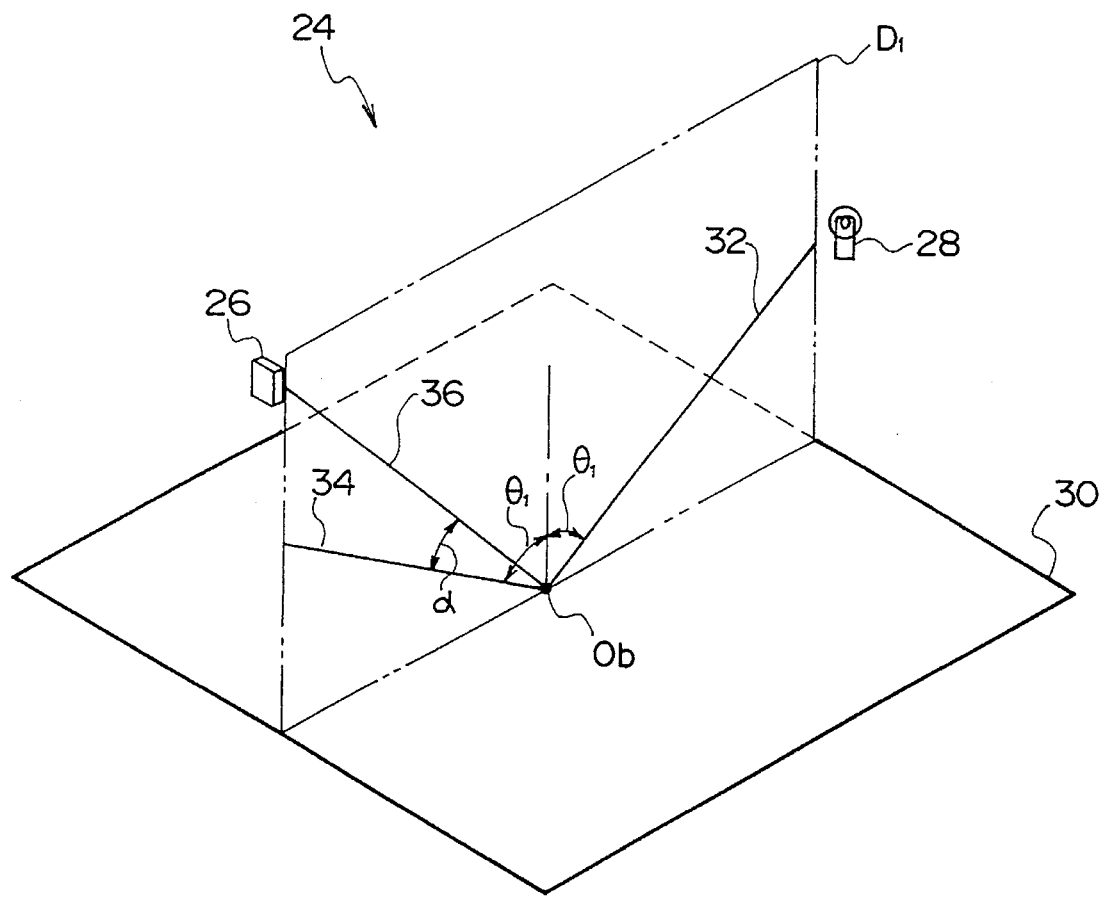
FIG. 27 is a conceptual diagram explaining a configuration of a gonio-spectrophotometer.

As shown in FIG. 27, the gonio-spectrophotometer 24 has a light source 28 and a light-receiving unit 26. In the case of the gonio-spectrophotometer 24, a plane which includes an incident optical axis 32 of the light directed from the light source 28 toward a measuring point Ob of a sample 30 and a optical axis 34 of reflection in the direction of regular reflection when the light of the incident optical axis 32 is regularly reflected at the measuring point Ob, is defined as an incident plane $D_1$. In this gonio-spectrophotometer 24, the axis connecting the light-receiving unit 26 and the measuring point Ob is set as a measuring optical axis 36. This gonio-spectrophotometer 24 has a mechanism (not shown) in which the light-receiving unit 26 is moved three-dimensionally such that the measuring optical axis 36 is included within the incident plane $D_1$.

The reflectance R is a function of an angle $\alpha$ (unit: degree; hereafter referred to as a varied angle $\alpha$) formed by the reflection optical axis 34 and the measuring optical axis, i.e., an angle $\alpha$ of the direction of regular reflection with respect to the light-receiving unit, and a wavelength $\lambda$ (unit: nm) of light, and can be expressed by the following Formula (14):

$$R(\alpha, \lambda) \tag{14}$$

where the varied angle $\alpha$ is 0° when the reflection optical axis 34 and the measuring optical axis 36 coincide with each other. In addition, the sign of the varied angle $\alpha$ which is obtained from the position of the light-receiving unit 26 rotated clockwise from the direction of regular reflection toward the light source (in the direction of arrow indicating the varied angle $\alpha$ in FIG. 27) will be set as a positive sign.

Figure 28:
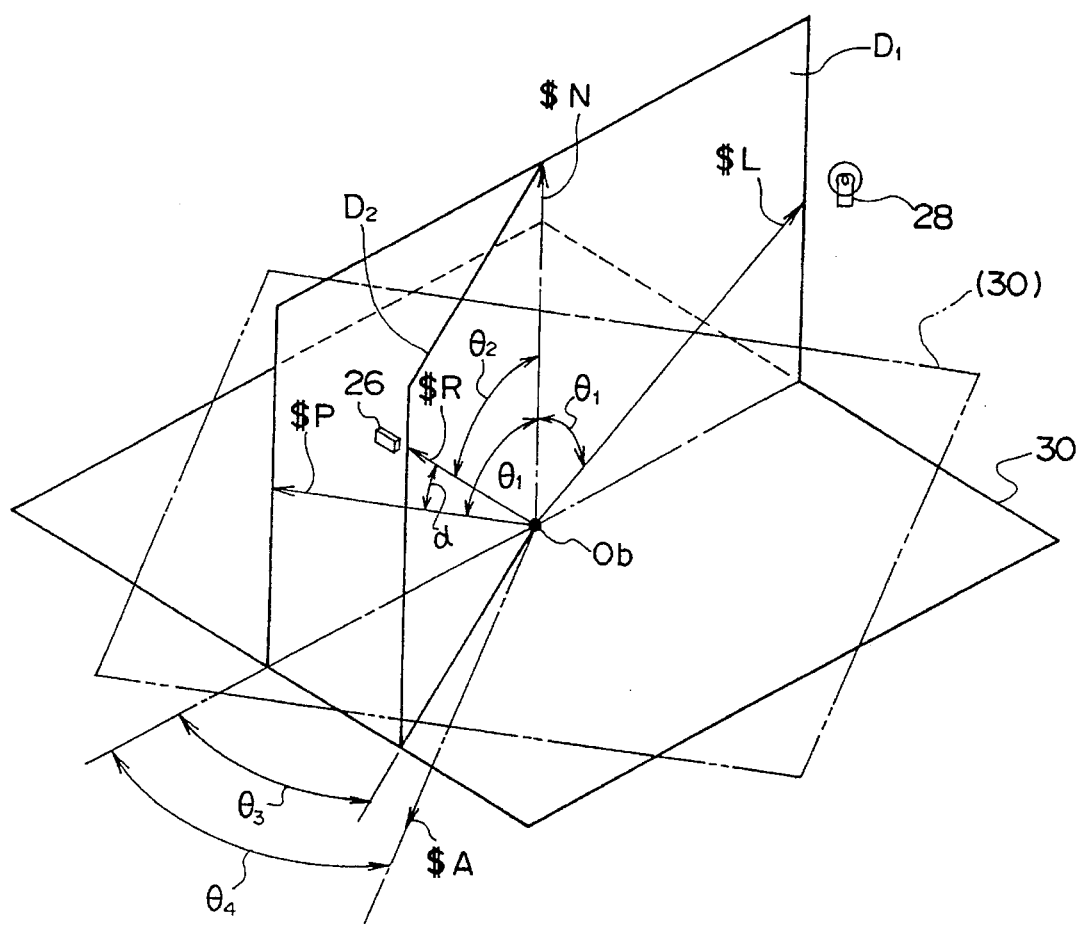
FIG. 28 is a diagram illustrating an orthogonal coordinate system for explaining a varied angle α used in the third embodiment.

As shown in FIG. 28, the varied angle $\alpha$ can be determine in a rectangular coordinate system using the incident plane and the like. In other words, a normal direction $N of the sample 30, an incident direction $L which is an azimuth between the sample 30 and the light source 28, a light-receiving direction $R in which the light is directed from the sample 30 toward the light-receiving unit 26, and a regularly reflecting direction $P in which the light is regularly reflected from the sample 30 are set. Then, a plane which includes the normal direction $N and the regularly reflecting direction $P is set as the incident plane $D_1$, while a plane which includes the normal direction $N and the light-receiving direction $R is set as a light-receiving plane $D_2$. As a result, an angle $\theta_1$ formed by the normal direction $N and the incident direction $L, an angle $\theta_2$ formed by the normal direction $N and the light-receiving direction $R, and an angle $\theta_3$ formed by the incident plane $D_1$ and the light-receiving plane $D_2$ are set. In addition, in a case where the surface of the sample 30 is directional (e.g., in the case of fabrics and brushing-finished surfaces), an angle at which the reference direction of the sample surface (coated surface) (a direction $A in FIG. 28) moves away from the incident plane $D_1$ with the measuring point Ob set as a center is set as an angle $\theta_4$. Accordingly, the reflectance R in Formula (14) above can be expressed as a general formula by the following Formula (15):

$$R(\lambda, \theta_1, \theta_2, \theta_3, \theta_4) \tag{15}$$

where $\theta_1$: incident angle of the light source (deg)

$\theta_2$: light-receiving angle (deg)

$\theta_3$: azimuth angle (deg)

$\theta_4$: rotational angle (deg)

Formula (15) above has four angular parameters denoted respectively by $\theta_1$, $\theta_2$, $\theta_3$, and $\theta_4$. It is known that the distribution of intensity of reflected light (a distribution in which the intensity of reflected light is expressed by the distance with an irradiating point set as a center) from a surface coated with a general paint always shows spherical symmetry having similar figures with the regularly reflecting direction $P as an axis, irrespective of the incident angle $\theta_1$ of the incident light.

Figure 29:
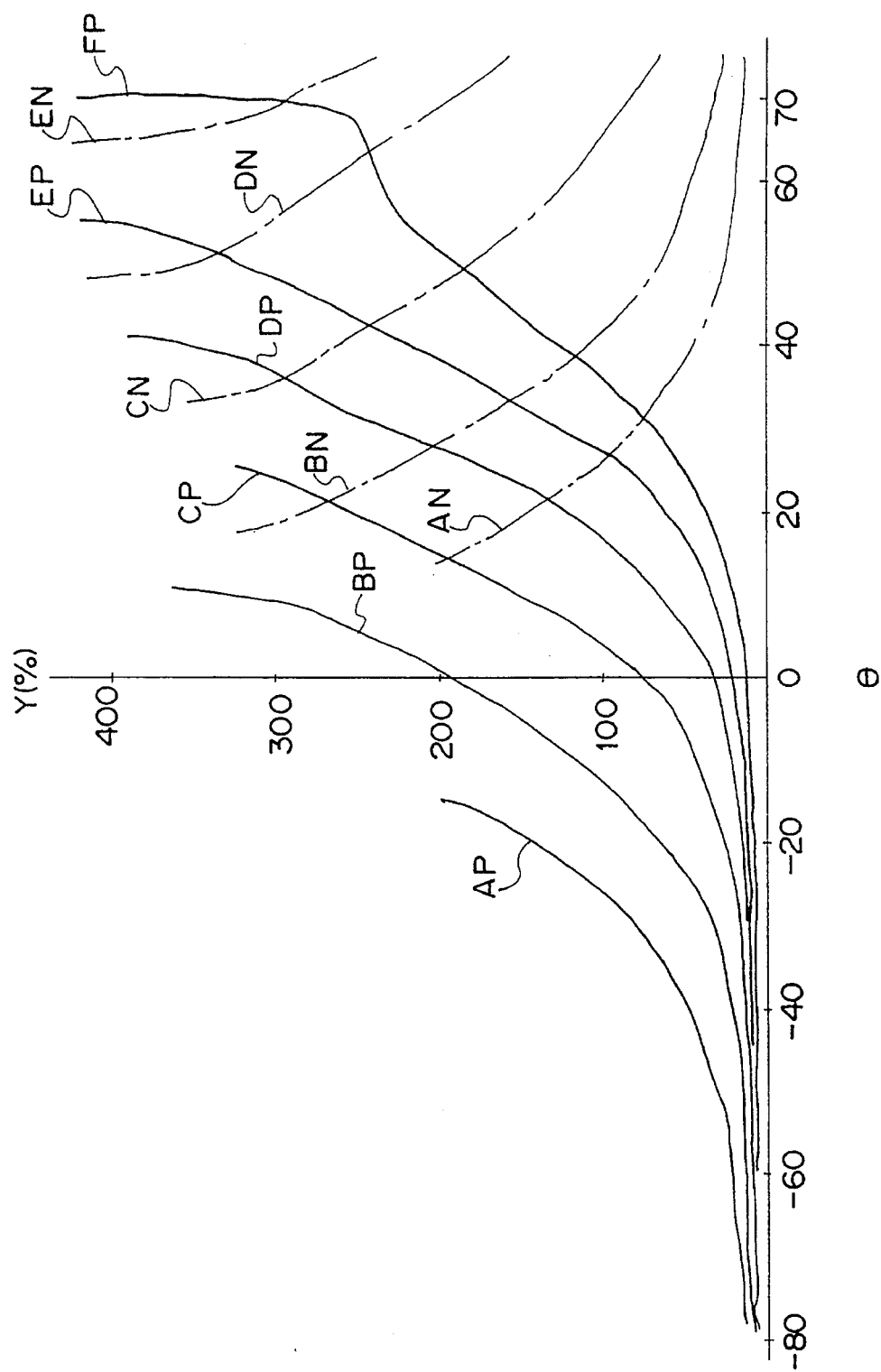
FIG. 29 is a characteristic diagram illustrating a varied-angle characteristic of a spectral reflectance factor of a coated surface.

FIG. 29 shows a varied-angle characteristic diagram of the spherical reflectance factor and illustrates the spherical symmetry of the light reflected from a surface coated with a general paint (a metallic coated surface). In the drawing, as shown in Table 1 below, the varied-angle characteristic when the varied angle $\alpha$ is varied in the positive direction when the incident angle $\theta_1$ is 0° is set as a characteristic AP, while the varied-angle characteristic when the varied angle $\alpha$ is varied in the negative direction is set as a characteristic AN. Similarly, when the incident angle $\theta_1$ is 15°, 30°, 45°, and 60°, varied-angle characteristics when the varied angle $\alpha$ is varied in the positive direction are set as characteristics BP, CP, DP, EP, and FP, while varied-angle characteristics when the varied angle $\alpha$ is varied in the negative direction are set as characteristics BN, CN, DN, and EN.

TABLE 1

| | Incident angle $\theta_1$ | | | | | |
|---|---|---|---|---|---|---|
| | 0° | 15° | 30° | 45° | 60° | 75° |
| Varied angle $\alpha$ | | | | | | |
| + direction | AP | BP | CP | DP | EP | FP |
| − direction | AN | BN | CN | DN | EN | — |

As can be appreciated from FIG. 29, the varied-angle characteristics are substantially symmetrical irrespective of the incident angle. It should be noted that, when the incident angle was 75°, a measurement error occurred due to a sheen phenomenon caused by a reference white plate, so that the listing was omitted here.

Accordingly, the reflectance of the surface coated with the paint can be expressed by the reflectance $R(\alpha, \lambda)$ as a function of the varied angle $\alpha$ between the regularly reflecting direction $P and the light-receiving direction $R, as shown in Formula (14) above. For instance, if the angular conditions other than the light-receiving angle $\theta_2$ are fixed to predetermined values ($\theta_1=60°$, $\theta_3=0°m$, and $\theta_4=0°$), and the varied angle $\alpha$ is varied in the range 0° to 90° (in this case, $\alpha=\theta_1-\theta_2$), and if the reflectance $R(\alpha, \lambda)$ is measured by the gonio-spectrophotometer, the reflectance $R(\alpha, \lambda)$ can be determined in the angular range $0°<\alpha<90°$.

Also, if the reflectance $R(\alpha, \lambda)$ is set under the angular conditions listed below, the reflectance $R(\alpha, \pi)$ can be determined in the angular range $-30°<\alpha<150°$.

Angular Conditions:

$$R(\alpha, \lambda) = R(-\alpha, \lambda) \quad (-30° < \alpha < 0°)$$
$$= R(90°, \lambda) \quad (90° < \alpha < 150°)$$

It should be noted, in the description that follows, the reflectance $R(\alpha, \lambda)$ in which the varied angle $\alpha$ is computed from the relation between the regularly reflecting direction $P and the light-receiving direction $R is used even in cases other than the aforementioned angular conditions ($\theta_1=60°$, $\theta_3=0°$, and $\theta_4=0°$).

Figure 30A:
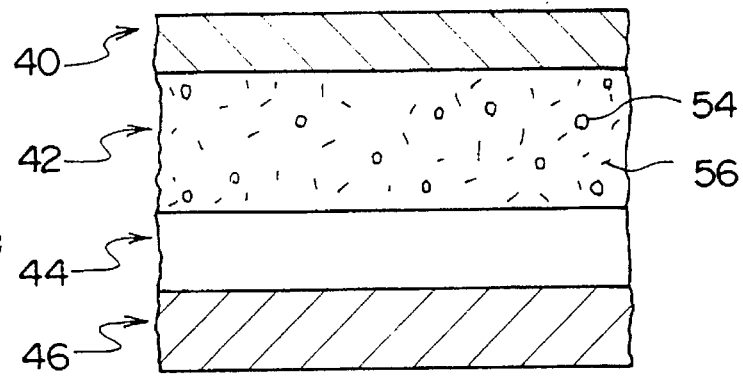
Figure 30B:
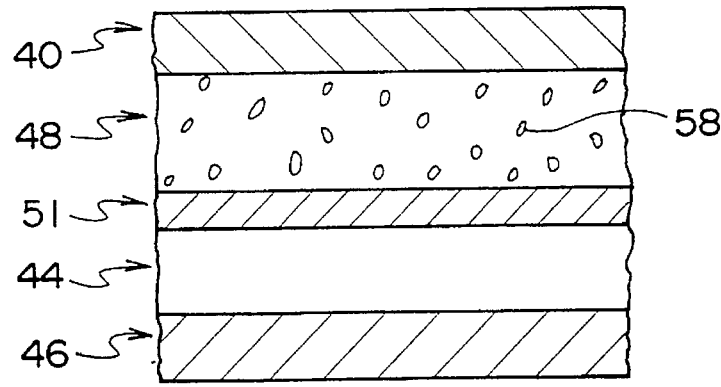
Figure 30C:
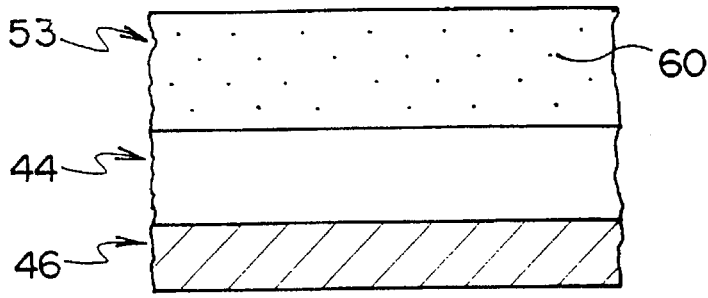

As shown in FIGS. 30A to 30C, the coated surface of a sample whose surface is coated is comprised of various substances including color pigments governing the color, bright materials such as metal pearl mica, and clear coat materials on the surfaces.

As shown in FIG. 30A, a coated surface formed by a metallic coating is comprised of a clear coat layer 40, a metallic base layer 42, an intermediate coat layer 44, and an electrodeposited layer 46. The metallic base layer 42 includes a pigment 54 and aluminum 56. As shown in FIG. 30B, a coated surface formed by a pearl mica coating is comprised of a clear coat layer 40, a mica base layer 48, a color base layer 51, an intermediate coat layer 44, and an electrodeposited layer 46. The mica base layer 48 includes a titanized mica pigment 58. As shown in FIG. 30C, a coated surface formed by a solid coating is comprised of a top coat layer 53, an intermediate coat layer 44, and an electrodeposited layer 46. The top coat layer 53 includes a coloring pigment 60.

Figure 31:
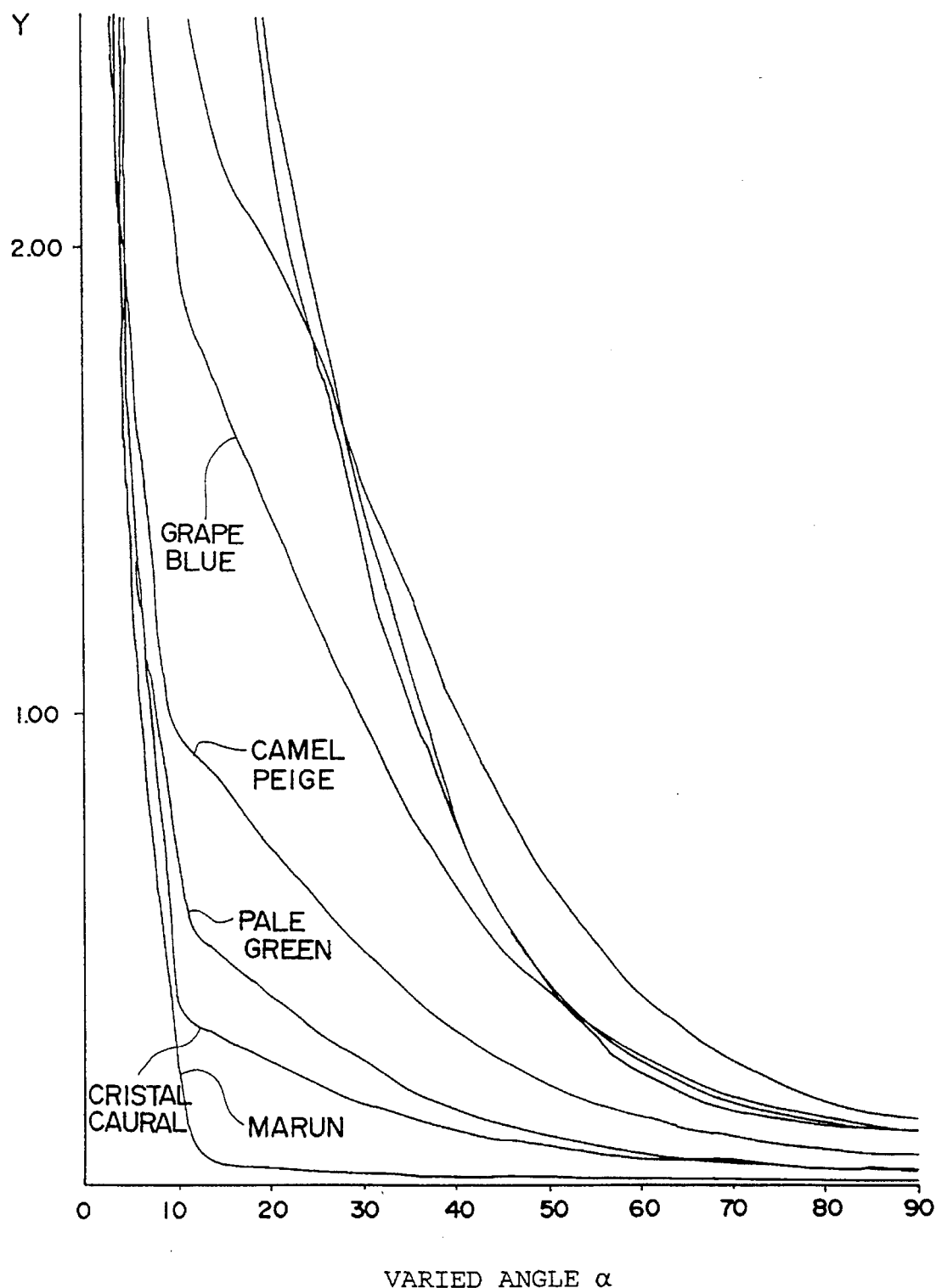
FIG. 31 is a characteristic diagram illustrating reflectance characteristics of a plurality of coating colors when the varied angle α is 45°.
Figure 32:
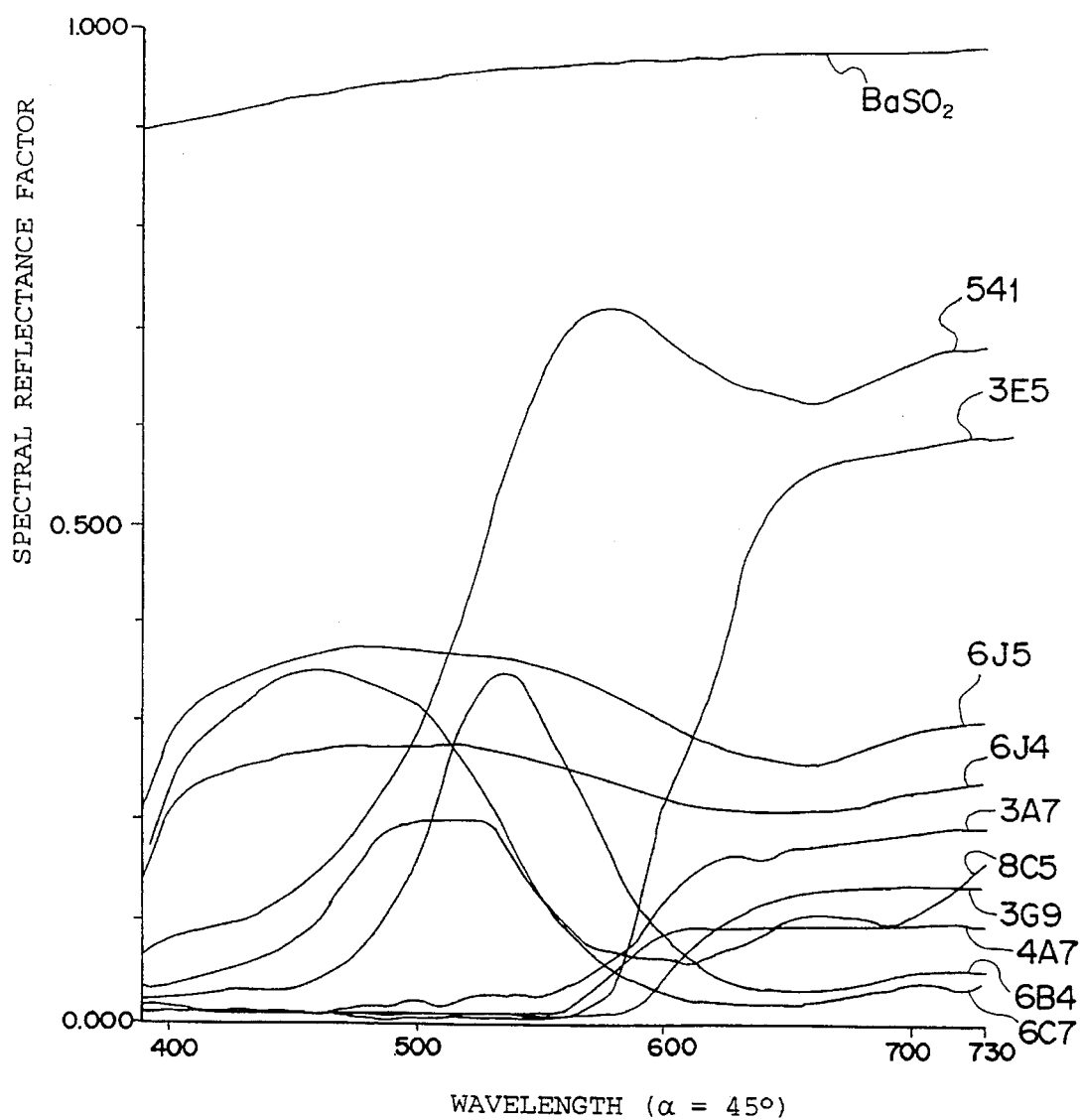
FIG. 32 is a characteristic diagram illustrating the relationship between the varied angle α and brightness Y with respect to a plurality of coating colors.

FIG. 31 shows the relationship between the varied angle $\alpha$ and brightness Y (Y is determined by Formula (38) which will be described later). As can be appreciated from the drawing, the rate of change of the reflectance R becomes slower in the order of maroon, crystal coral, camel beige, pale green, and grape blue which are used as coating colors. In addition, FIG. 32 shows the relationship of the reflectance $R(45°, \lambda)$ when the varied angle $\alpha$ is 45°. It can be seen that brightness at a predetermined wavelength varies depending on the kind of the coated surface.

Thus, the characteristic of the reflectance $R(\alpha, \lambda)$ varies due to the difference in the arrangement of the coated surface, and is, at the same time, affected by the kind and quantity of pigment and bright material. Accordingly, to specify these coated surfaces, in this embodiment, by assuming that component materials which make up the coated surface are $x_1, x_2, \ldots$ and that the size of each component material $x_i$ ($i=1, 2, \ldots$) is a quantity $q_1$ (kg), a characteristic value vector VX representing the coated surface is defined as shown in the following Formula (16):

$$VX=(x_1[q_1], x_2[q_2], \ldots) \quad (16)$$

Since the reflectance $R(\alpha, \lambda)$ of the coated surface formed by this characteristic value vector VX is related to the characteristic value vector VX, the reflectance $R(\alpha, \lambda)$ can be expressed by the following Formula (17):

$$R(\alpha, \lambda, VX) \quad (17)$$

In this embodiment, since the case in question is the reproduction of a coating color, the characteristic value vector VX shown in the following Formula (18) is considered by taking into consideration only the component materials (pigment and the like) Governing the color among the elements of the characteristic value vector VX and by assuming only e component materials related to the color:

$$VX=(x_1[q_1], x_2[q_2], \ldots, x_e[q_e]) \quad (18)$$

In this embodiment, it is basically assumed that a bright material which, although essentially achromatic, is imparted a color to the extent of substantially changing the color of the pigment, such as some special colored mica, is not used as a component material.

Although, in the above, a description has been given of the reflectance $R(\alpha, \lambda, VX)$, which is based on the continuous characteristics of the varied angle $\alpha$ and the wavelength $\lambda$ as elements related to the characteristic value vector VX, the reflectance $R(\alpha, \lambda, VX)$ can be handled approximately, as will be described below.

First, the varied angle $\alpha$ (0° to 90°) is appropriately divided such as by dividing it into [n−1] parts at equal intervals by a boundary value $\alpha_j$($j=1, 2, \ldots, n, 0°=\alpha_1<\alpha_2< \ldots <\alpha_n=90°$) or by dividing into small parts the range thereof where the change of reflectance is abrupt. It should be noted that it is preferable to provide this appropriate division at intervals of 1° to 5° in such a manner as to obtain 19 to 91 pieces of data.

Similarly, with respect to the wavelength $\lambda$ as well, the visible wavelength is considered as falling within a wavelength band of, for example, 380 (nm)$\leq\lambda$720 (nm), and this visible wavelength band is appropriately divided into [m−1] regions by means of boundary wavelengths $\lambda_k$ ($k=1, 2, \ldots, m$; 380 nm=$\lambda_1<\lambda_2\ldots<\lambda_m=720$ nm). It should be noted that it is preferable to provide this appropriate division of the wavelength band at intervals of 10 to 20 nm in such a manner as to obtain 18 to 35 pieces of data.

Here, by assuming that the reflectance where $\alpha=\alpha_j$ and $\lambda=\lambda_k$ is a unit reflectance $R_{jk}(VX)$, a unit vector $VR_j(VX)$ in units of divided angle is defined, as shown in the following Formula (19):

$$VR_j(VX)=(R_{j1}(VX), R_{j2}(VX), \ldots, R_{jm}(VX)) \quad (19)$$

It is assumed that interpolation is provided between these respective unit reflectances $R_{jk}(VX)$, and the reflectance $R(\alpha, \lambda, VX)$ can be approximated by discrete unit vectors $VR_j(VX)$, i.e., $VR_1, VR, \ldots, VR_n$.

Figure 33:
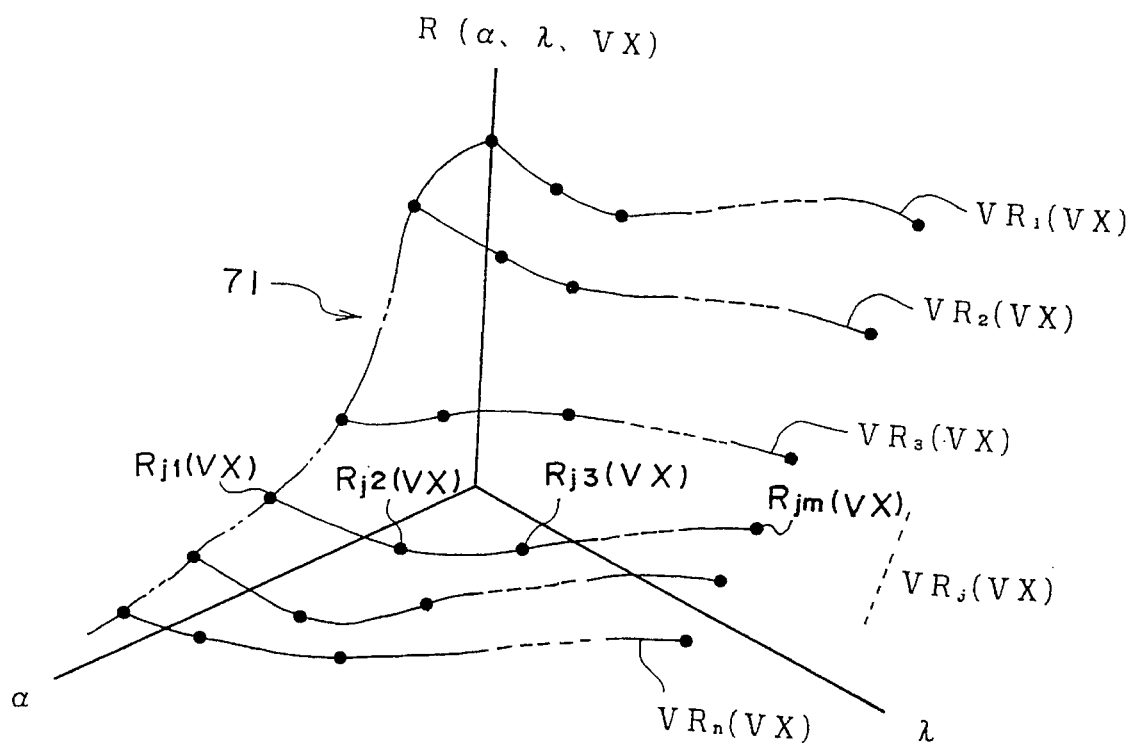
FIG. 33 is an image diagram illustrating reflectance characteristics with respect to coating colors in a three-dimensional coordinate system having reflectance, varied angle, and wavelength as axes.

Namely, as shown in FIG. 33, in a three-dimensional coordinate system having the reflectance $R(\alpha, \lambda, VX)$, the varied angle $\alpha$, and the wavelength $\lambda$ as axes, the reflectance $R(\alpha, \lambda, VX)$ becomes a continuous surface 71 such as a curved surface. The continuous surface 71 representing the reflectance $R(\alpha, \lambda, VX)$ can be determined by interpolation from the plurality of discrete points included in this continuous surface 71. Consequently, the reflectance $R(\alpha, \lambda, VX)$ can be approximated from the plurality of unit vectors $VR_j(VX)$ included in the continuous surface 71.

Accordingly, the reflectance $R(\alpha, \lambda, VX)$ with respect to the coating color can be approximated from the discrete unit vectors $VR_j(VX)$ shown in Formula (19) above. In this embodiment, the relationship between the characteristic value vector VX and the unit vector $VR_j(VX)$ which is discrete data is set as a normalized value. This normalized value can be obtained by forming an actual coated plate based on the characteristic value vector VX and by measuring the reflectance.

Next, a description will be given of the operation of this embodiment. In cases where a user desires a new reflectance (hereafter referred to as a new reflectance $R^*(\alpha, \lambda)$) on the basis of an image color assumed by a designer or the like or on the basis of an existing reflectance $R(\alpha, \lambda, VX)$, if this new reflectance $R^*(\alpha, \lambda)$ is determined, it is possible to visually confirm the color and texture of the coated surface by the use of a color graphics apparatus and the like (refer to Japanese Patent Application Laid-Open No. 1151/1989). As such, in this embodiment, a description will be given of a case where a characteristic value vector $VX^*$, which is a quantity of a paint or the like, is extimated from a desired new reflectance $R^*(\alpha, \lambda)$ on the basis of the image color assumed by the designer or the like or on the basis of an existing reflectance R.

Namely, the new reflectance $R^*(\alpha, \lambda)$ is a reflectance which is newly generated, and the kinds and quantities of pigments and bright materials for realizing the reflection characteristic of the reflectance $R^*(\alpha, \lambda)$ are unknown. Hence, to reproduce the coating color by means of the new reflectance $R^*$, it suffices to determine a characteristic value vector $VX^*$ corresponding to the new reflectance $R^*$, as shown in the following Formula (20):

$$VX^* = (x_1[q_1]^*, x_2[q_2]^*, \ldots, x_e[q_e]^*) \tag{20}$$

Figure 34:
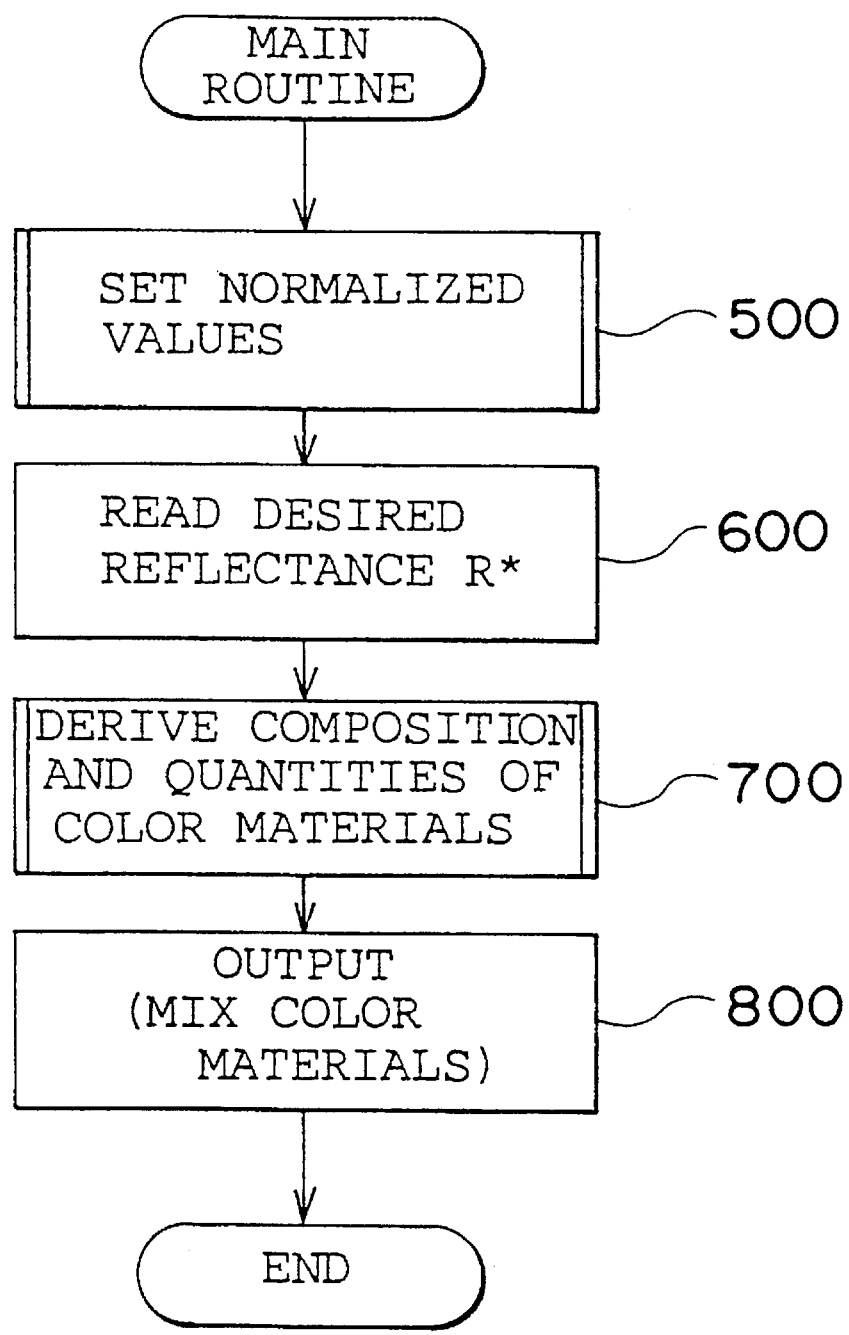
FIG. 34 is a flowchart illustrating the flow of a control main routine for reproducing a coating color in accordance with the third embodiment.

When an unillustrated power switch of the color reproducing apparatus constituted by the personal computer 16 and the like is turned on, a main routine for reproducing a coating color, shown in FIG. 34, is executed.

Figure 35:
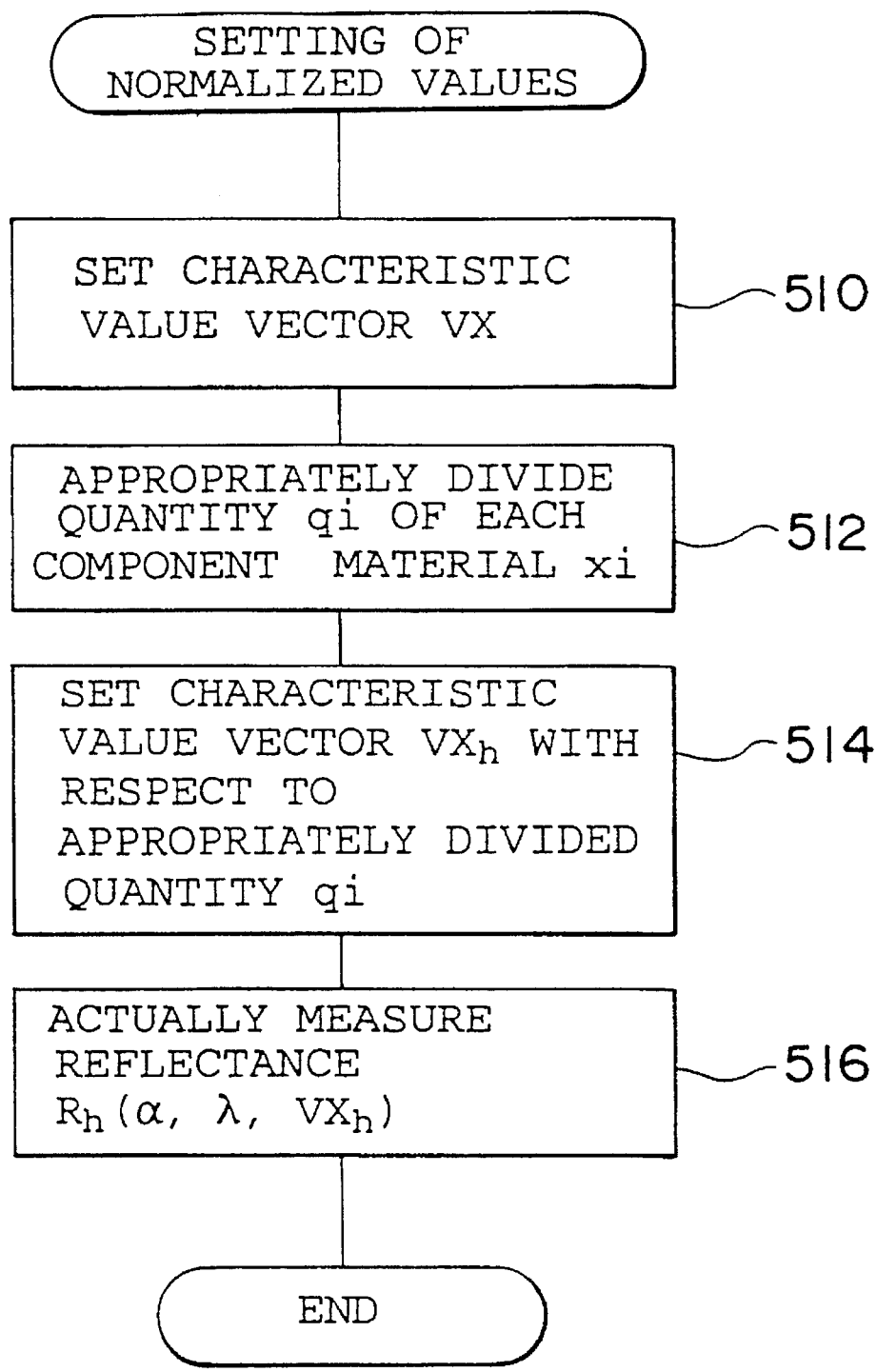
FIG. 35 is a flowchart illustrating the details of Step 500 in FIG. 34 in accordance with the third embodiment.

In Step 500, the aforementioned normalized values are set. Specifically, the operation proceeds to Step 510 shown in FIG. 35 to define the characteristic value vectors VX on the basis of the component materials $x_i$ such as color materials used in the color mixing apparatus 20. Since the characteristic value vectors $VX^*$ themselves for obtaining the new reflectance $R^*(\alpha, \lambda)$ is still unknown, in Step 510, the quantity $q_i$ of each component material $x_i$ is set by a random number or to a maximum value.

In an ensuing Step 512, the quantity $q_i$ of each component material $x_i$ of the characteristic value vector VX is appropriately divided into [P+1] parts by means of boundary values $q_{iA}$ ($1 \leq A \leq P$, $q_{i1} < q_{i2} < \ldots < q_{iP}$). As a result, each of the component quantities $q_1, q_2, \ldots, q_e$ is developed into P quantities in which the component quantity increases or decreases in stages. Therefore, the combinations of the characteristic value vectors VX based on these component quantities $q_{iP}$ become $L = P^e$ combinations, as shown in the following Formula (20-1).

$$\begin{array}{c} \begin{array}{ccccc} q_1 & q_2 & \cdots & q_i & \cdots & q_e \\ (x_1) & (x_2) & \cdots & (x_i) & \cdots & (x_e) \end{array} \\ P \text{ groups} \left\{ \begin{array}{ccccc} q_{11} & q_{21} & \cdots & q_{i1} & \cdots & q_{e1} \\ q_{12} & q_{22} & \cdots & q_{i2} & \cdots & q_{e2} \\ \cdot & \cdot & & \cdot & & \cdot \\ \cdot & \cdot & & \cdot & & \cdot \\ \cdot & \cdot & & \cdot & & \cdot \\ q_{1P} & q_{2P} & \cdots & q_{iP} & \cdots & q_{eP} \end{array} \right. \\ \underbrace{\phantom{xxxxxxxxxxxxxxxxxxxxxx}}_{L \text{ combinations}} \end{array} \tag{20-1}$$

In an ensuing Step 514, a characteristic value vector $VX_h$ (h=1, 2, ..., L) is determined for each combination of L component quantities $q_{iP}$. In other words, each characteristic value vector $VX_h$ with the component materials changed is determined by consecutively varying the quantity of each component material $x_1, x_2, \ldots, x_e$, as shown in the following Formula (20-2):

$$VX_1 = (x_1[q_{11}], x_2[q_{21}], \ldots, x_e[q_{e1}]) \tag{20-2}$$

$$VX_2 = (x_1[q_{12}], x_2[q_{21}], \ldots, x_e[q_{e1}])$$

$$VX_3 = (x_1[q_{13}], x_2[q_{21}], \ldots, x_e[q_{e1}])$$

$$\cdot \quad \cdot \quad \cdot \quad \cdot$$

$$\cdot \quad \cdot \quad \cdot \quad \cdot$$

$$\cdot \quad \cdot \quad \cdot \quad \cdot$$

$$VX_L = (x_1[q_{1P}], x_2[q_{2P}], \ldots, x_e[q_{eP}])$$

In an ensuing Step 516, a paint is generated in which color materials and the like are mixed on the basis of the quantities of the component materials of the characteristic value vectors $VX_h$ thus determined, and the reflectance $R_h(\alpha, \lambda, VX_h)$ of the coated surface of the coated plate formed by coating a plate with the generated paint is determined by actual measurement (refer to Formula (20-3) below).

$$VX_1 \rightarrow R_1(\alpha, \lambda, VX_1) \tag{20-3}$$

$$VX_2 \rightarrow R_2(\alpha, \lambda, VX_2)$$

$$\cdot \quad \cdot$$

$$\cdot \quad \cdot$$

$$\cdot \quad \cdot$$

$$VX_L \rightarrow R_L(\alpha, \lambda, VX_L)$$

It should be noted that, to determine this reflectance $R_h(\alpha, \lambda, VX_h)$ means to obtain a plurality of (nm) unit reflectances $R_{jk}$ when the varied angle $\alpha$ and the wavelength $\lambda$ are appropriately divided, as described above.

Upon completion of the processing of setting normalized values in Step 500 in the above-described manner, the operation proceeds to Step 600 in which the new reflectance $R^*(\alpha, \lambda)$ desired by the designer or the like is read. The new characteristic value vectors $VX^*$ ($x_1^*, x_2^*, \ldots, x_e^*$) corresponding to this arbitrary new reflectance $R^*(\alpha, \lambda)$, i.e., the quantities of component materials such as color materials, are computed in Step 700. In Step 700, the composition and quantities are computed from reflectances and characteristic value vectors which are in known relationships, by using a method of using an inverse estimation method based on interpolation, as explained in the previous-described embodiments.

In this case, characteristic value vectors $VX = (x_1, x_2, \ldots, x_e)$ capable of determining the quantities of e component materials are set as an input, while data on nm reflectances concerning the reflectance $R(\alpha, \lambda, VX)$ are set as an output. These nm data which are an output are set as a reflectance vector VR shown in the following Formula (21):

$$VR = (R_{11}(VX), R_{12}(VX), \ldots, R_{nm}(VX)) \tag{21}$$

If it is assumed that a transformation for obtaining an output of the reflectance vector VR from the input of the aforementioned characteristic value vector VX is a function f, the transformation can be expressed as shown in Formula (22) below. An inverse problem of the relationship expressed by this Formula (22) can be handled as shown in Formula (23) below.

$$f: VX \rightarrow VR \tag{22}$$

$$f^{-1}VR \to VX \quad (23)$$

Figure 36:
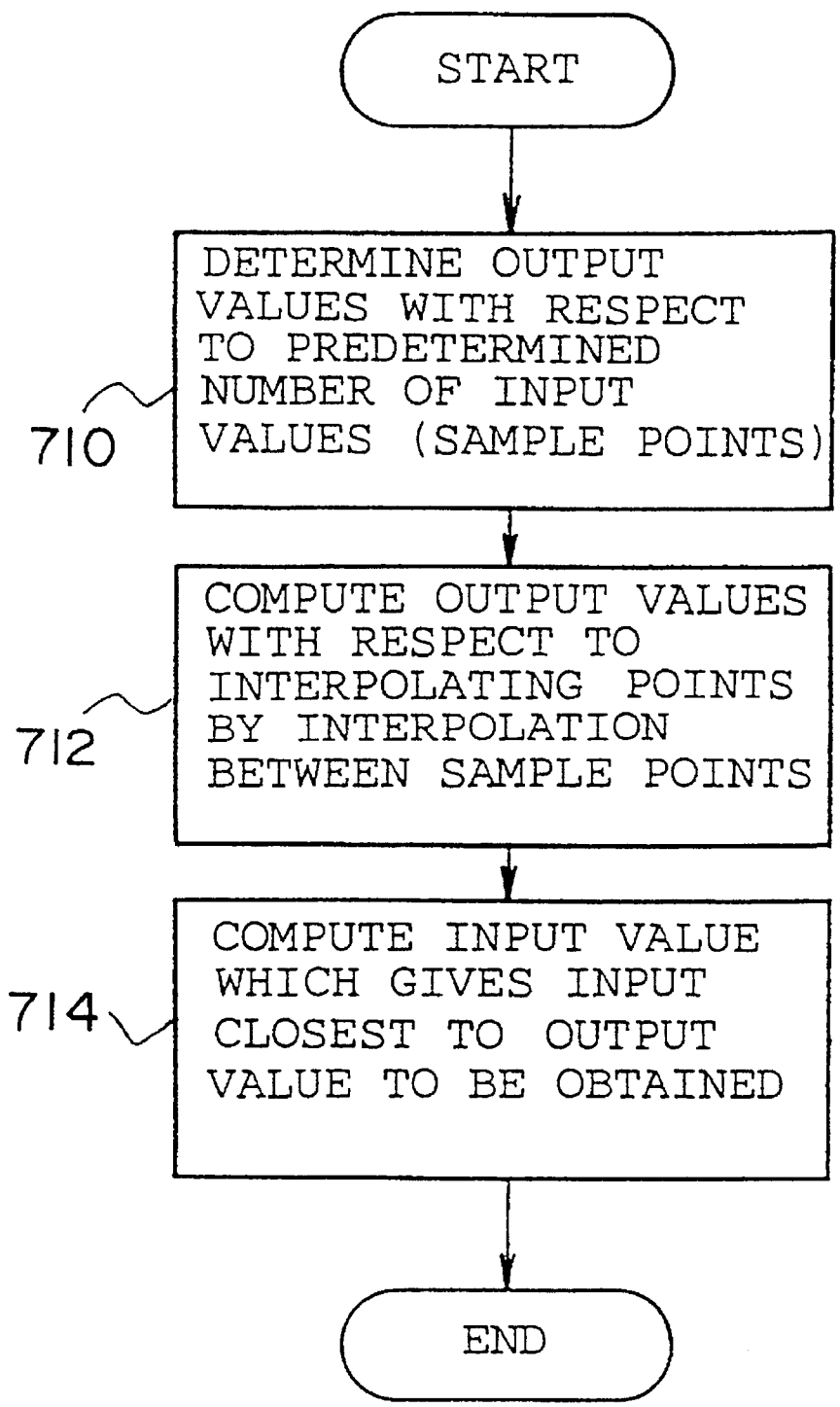
FIG. 36 is a flowchart illustrating the flow of color reproduction processing (Step 700) in accordance with the third embodiment.
Figure 37A:
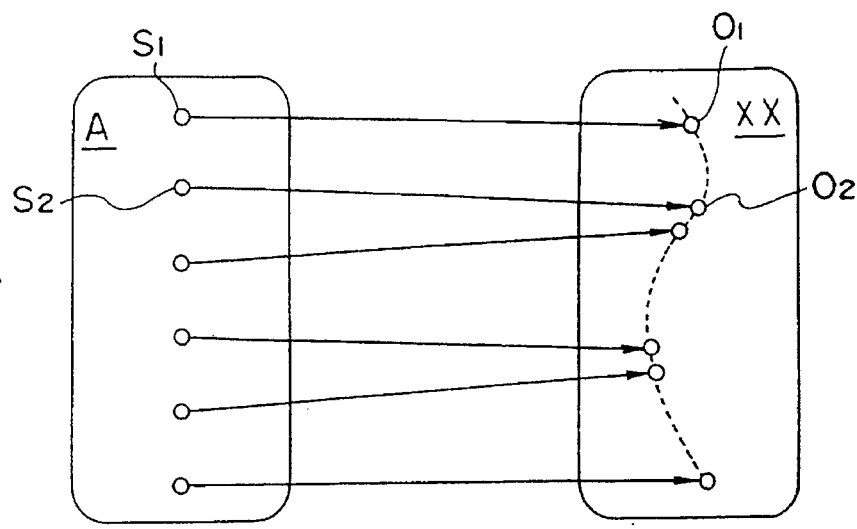
FIGS. 37A to 37C are image diagrams illustrating the flow of coating-color reproduction processing shown in FIG. 36.
Figure 37B:
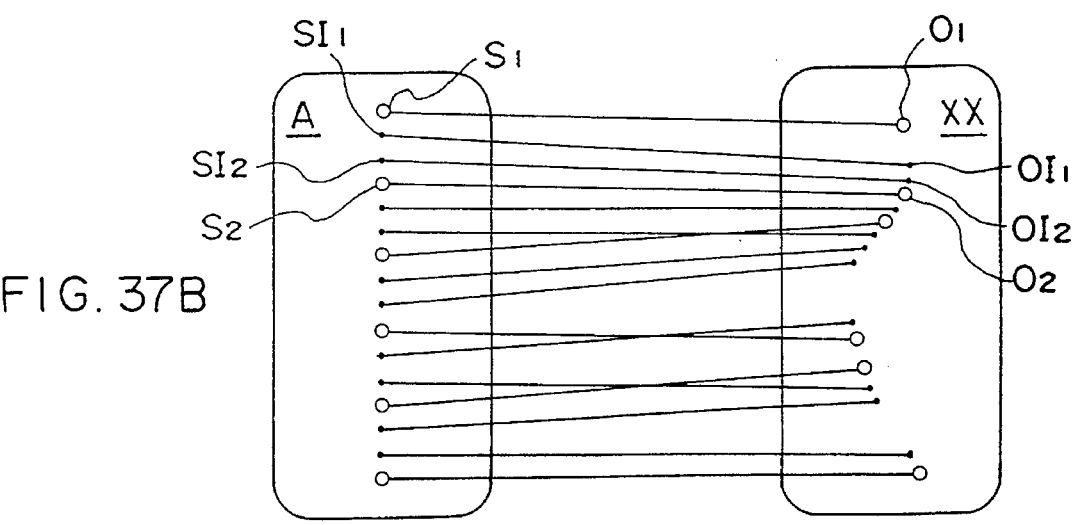
Figure 37C:
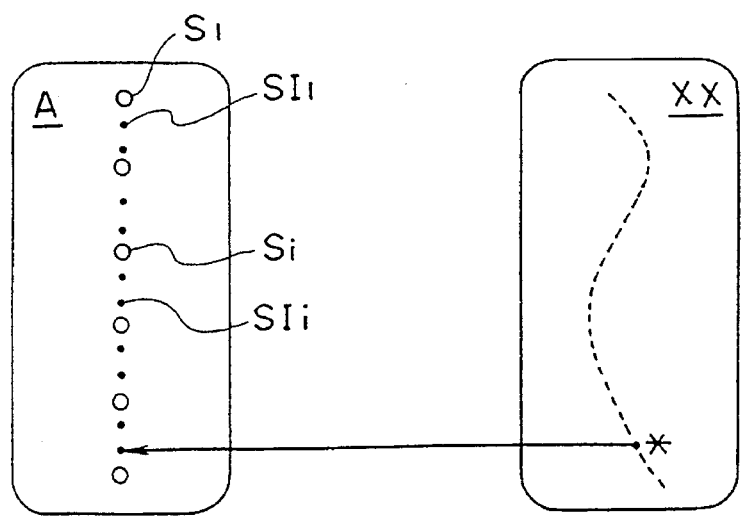

Referring to the flowchart shown in FIG. 36, a brief description will be given of the details of Step 700. In Step 710, reflectances R (output values Oi in FIGS. 37A to 37C) with respect to a plurality of (in this embodiment, $5^3$) characteristic value vectors VX (input values Si at sample points in FIGS. 37A to 37C) are determined (see FIG. 37A). Namely, this relationship is determined by measuring the reflectance of a coated plate for which the quantities of component materials are already known. In this Step 710, processing similar to that for setting normalized values in Step 500 is carried out. In Step 712, correspondence between an interpolating point SIi (i: 1, 2, . . . ) with respect to a discrete input value Si and an estimated output value OIi with respect to this interpolating point SIi is calculated by performing interpolation on the basis of the relationship of correspondence between the input value Si and the output value Oi (FIG. 37B). In an ensuing Step 714, the output value Oi or the estimated output value OIi, which is closest to an output value to be obtained and corresponding to a desired color (the output value being the data on the reflectance of the coating color to be reproduced, i.e., the data indicated by a mark * in FIG. 37C), is selected, and an input value Si or an interpolating point SIi (i.e., the characteristic value vector VX) corresponding to the selected value (Oi or OIi) is determined (see FIG. 37C).

Figure 38:
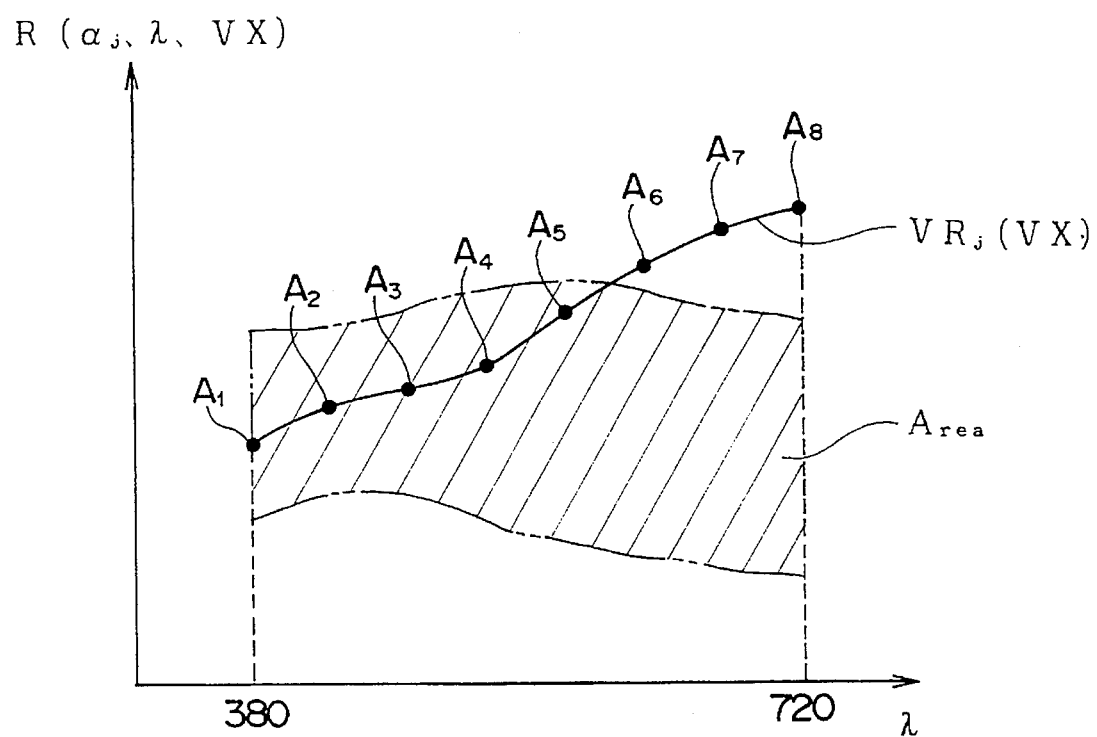
FIG. 38 is a diagram illustrating correspondence between a characteristic value vector VX and a reflectance vector VR.

What should be noted here is that, as for a reflectance vector VR* falling outside the value region of the reflection vector VR formed with respect to all the combinations of the characteristic value vector VX (VX$_1$, . . . , VX$_L$), there is no solution of the characteristic value vector VX, i.e., the reflectance vector VR* cannot be generated. The expression "falling outside the value region of the reflection vector VR" refers to cases where, as shown in FIG. 38, when n =i and m=8, the unit vector VR$_j$ (VX) falls outside the region Area that VR$_j$ (VX) can assume due to the change of VX$_1$, . . . , VX$_L$. In this case, the points A$_1$, A$_2$, A$_3$, A$_4$, and A$_5$ are included in the region Area, but the points A$_6$, A$_7$, and A$_8$ are not included in the region Area.

If the characteristic value vector VX* for obtaining the new reflectance R*($\alpha$, $\lambda$) is found in the above-described manner, and, in Step 800, signals representing the mixture $x_1[q_1]^*$, $x_2[q_2]^*$, . . . , $x_e[q_e]^*$ based on the characteristic value vectors VX* are outputted to the color-material mixing apparatus 20, and the paint is produced by the color-material mixing apparatus 20, it is possible to fabricate a coated object such as a coated plate having a desired reflectance R*($\alpha$, $\lambda$).

Next, a description will be given of a fourth embodiment. In the above-described third embodiment, a description has been given of the case where the quantities of component materials are appropriately divided for processing the setting of normalized values. However, in a case where there are a multiplicity of component materials, their combinations become enormously large, which make it impractical to follow this procedure. Accordingly, in the fourth embodiment, a description will be given of a case where normalized values are determined easily irrespective of the number of the kinds of component materials. It should be noted that since the fourth embodiment is arranged in a manner similar to that of the third embodiment, identical portions will be denoted by the same reference numerals, and a detailed description thereof will be omitted.

For example, a coating color A which already exists can be expressed by the following characteristic value vector $$VX = (x_1[q_1], x_2[q_2], \ldots, x_5[q_5])$$

where

| | | | |
|---|---|---|---|
| $x_1$: | holiito metallic, coarse (bright material) | $q_1$: | 41.19 (g) |
| $x_2$: | white metallic, fine (bright material) | $q_2$: | 4.40 (g) |
| $x_3$: | tinting black (pigment) | $q_3$: | 11.70 (g) |
| $x_4$: | blue black (pigment) | $q_4$: | 6.69 (g) |
| $x_5$: | indanthrene blue (pigment) | $q_5$: | 14.54 (g) |

Here, actual coated plates are fabricated by fixing the quantities $q_1$, $q_2$ of the component materials (bright materials) $x_1$, $x_2$ and by varying the quantities $q_3$, $q_4$, $q_5$ of the component materials $x_3$, $x_4$, $x_5$ as shown below. Next, as shown in the [State A] below, the quantities are varied by 10 g each in six stages so that the respective quantities will not exceed fixed values (e.g., 50 g). Consequently, it is possible to obtain states of $6^3$=216 coated plates. Accordingly, it is possible to obtain reflectances R($\alpha$, $\lambda$, VX) with respect to 216 characteristic value vectors VX.

[State A]

$$
\begin{aligned}
(q_3, q_4, q_5) &= (0, 0, 0) \\
&= (0, 0, 10) \\
&= (0, 0, 20) \\
&\quad \cdot \\
&\quad \cdot \\
&= (50, 50, 50)
\end{aligned}
$$

If the number (kinds) of component materials $x_i$, $x_{i+1}$, . . . , $x_p$ increases, it is necessary to fabricate a large number of coated plates for obtaining sample data (unit reflectances), which is not feasible in practical use. For instance, if nine color materials are used, and each of them is divided into six parts of 0, 10, 20, . . . , 50 (g), an enormously large number of (a total of $6^9 \cong 1.0 \times 10^7$) combinations of samples (coated plates) would have to be fabricated, so that it is unfeasible to put this procedure to practical use.

Figure 40:
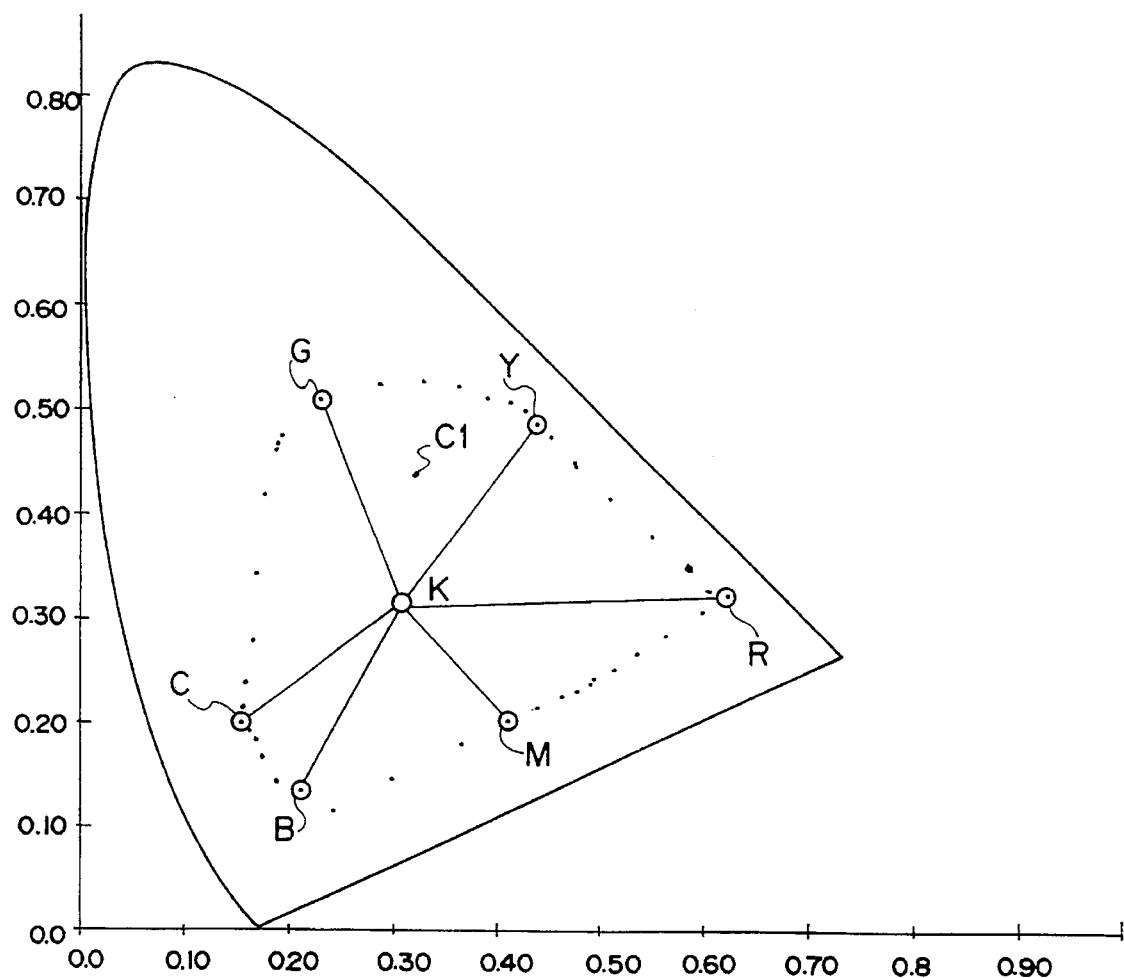
FIG. 40 is a CIE x-y chromaticity diagram including primary colors determined in accordance with the fourth embodiment.

Therefore, in this embodiment, the specification of color is simplified as described below. FIG. 40 shows CIE x-y chromaticity coordinates. Points in the drawing are outermost portions when points are plotted on the xoy chromaticity coordinates at positions corresponding to those colors that can be specified by existing color materials.

Figure 39:
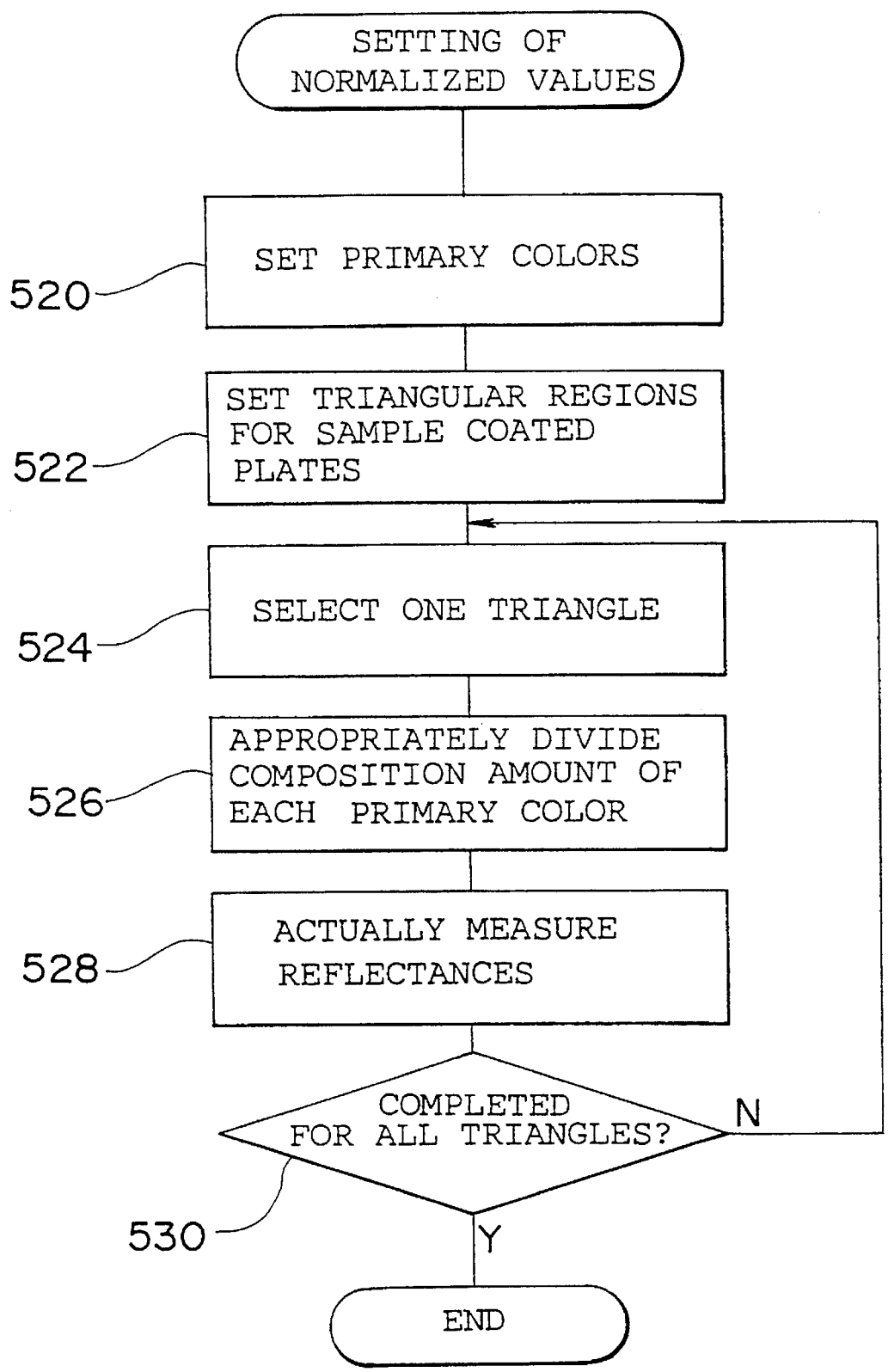
FIG. 39 is a flowchart illustrating the details of Step in FIG. 34 in accordance with a fourth embodiment.

When an unillustrated power switch of the color reproducing apparatus constituted by the personal computer 16 and the like is turned on, the main routine shown in FIG. 34 is executed. In Step 500, normalized values are set. Specifically, the operation proceeds to Step 520 shown in FIG. 39 to define the characteristic value vectors VX based on the component materials $x_i$ used in the color-material mixing apparatus 20, and to set primary colors on the basis of colors that can be specified by existing color materials on the x-y chromaticity coordinates. In this embodiment, of the outermost points of colors that can be specified by color materials, points G (green), Y (yellow), R (red), M (magenta), B (blue), and C (cyan) are set as typical points, and a point K corresponding to white is set. Colors corresponding to these points are set as the primary colors.

In an ensuing Step 522, triangular regions each formed by three points including the point K among the aforementioned primary colors are set as subject color regions so as to fabricate sample coated plates. In this case, the subject color regions include six triangles ΔKGY, ΔKYR, ΔKRM, ΔKMB, ΔKBC, and ΔKCG. An arbitrary color can be reproduced by using data (quantities) on the apexes of a triangle including a point at the position corresponding to that color. In short, it is possible to specify colors located at all the positions included in a triangle by varying the respective quantities at the three apexes of the triangle.

In an ensuing Step 524, one of the aforementioned set triangles is selected. For instance, to reproduce a coating color located at the point C1 in FIG. 40, the points K, Y ad G are used as the primary colors, and the variation of the quantities of component materials is processed within ΔKGY. In an ensuing Step 126, the quantities of component materials of the primary colors of the selected triangle are divided appropriately in, for example, six stages, as shown in [State B] below. Hence, with respect to ΔKGY in this case, $6^3=216$ combinations are assumed, and sample coated plates are fabricated, respectively. In an ensuing Step 528, the reflectances of these fabricated sample coated plates are actually measured, and the operation proceeds to Step 530.

[State B]

$(K, G, Y)$ = $(0, 0, 0)$
= $(0, 0, 10)$
= $(0, 0, 20)$
.
.
.
= $(50, 50, 50)$ (Note: Here, it is assumed that the quantities of bright materials are fixed.)

In an ensuing Step 530, a determination is made as to whether or not the above-described processing has been completed for all the triangular regions set in Step 522 above, and processing is executed until processing is completed for all the triangles. By so doing, it is possible to fabricate in a small number the sample coated plates for color reproduction with respect to all the color regions that can be specified by the color materials, and normalized values can be easily set irrespective of the number of kinds of the component materials used.

Next, a description will be given of a fifth embodiment. In the above-described third and fourth embodiments, unknown characteristic value vectors VX* are determined by a method in which an inverse estimation method based on interpolation is used. In the fifth embodiment, a solution for the inverse problem ($f^{-1}$), shown in Formula (23) above, in which an unknown characteristic value vector VX* is determined from a reflectance vector VR, i.e., the estimation of the characteristic value vector VX* with respect to the reflectance R*(α, λ) ($R_{11}$*, $R_{12}$*, ..., $R_{nm}$*) is obtained by using a known neutral network method. In other words, a neural network, which has neurons corresponding to the number of reflectances R* as an input layer for inputting the reflectances R* and has neurons corresponding to the number of the characteristic value vector VX* as an output layer for outputting quantities of component materials, and in which the neurons are interconnected by synapses, is learned by a learning process which will be described below, so as to obtain a system for determining known characteristic value vectors VX* from desired reflectances R*.

With respect to the neural network method (hereafter referred to as the NNW method) in the fifth embodiment, a description will be given of three kinds of examples for estimating characteristic value vectors VX* with respect to reflectances R*(α, λ) by expanding the structure of the neural network to continuous N layers. It should be noted that, since the fifth embodiment is arranged in a manner similar to those of the third and fourth embodiments, identical portions will be denoted by the same reference numerals, and a detailed description thereof will be omitted. In addition, since first, second and third NNW methods have substantially similar arrangements, different portions will be described in order. Furthermore, although a description will be given of the neural network method based on learning assisted by a teacher, it is possible to adopt one based on learning not assisted by a teacher.

Figure 41:
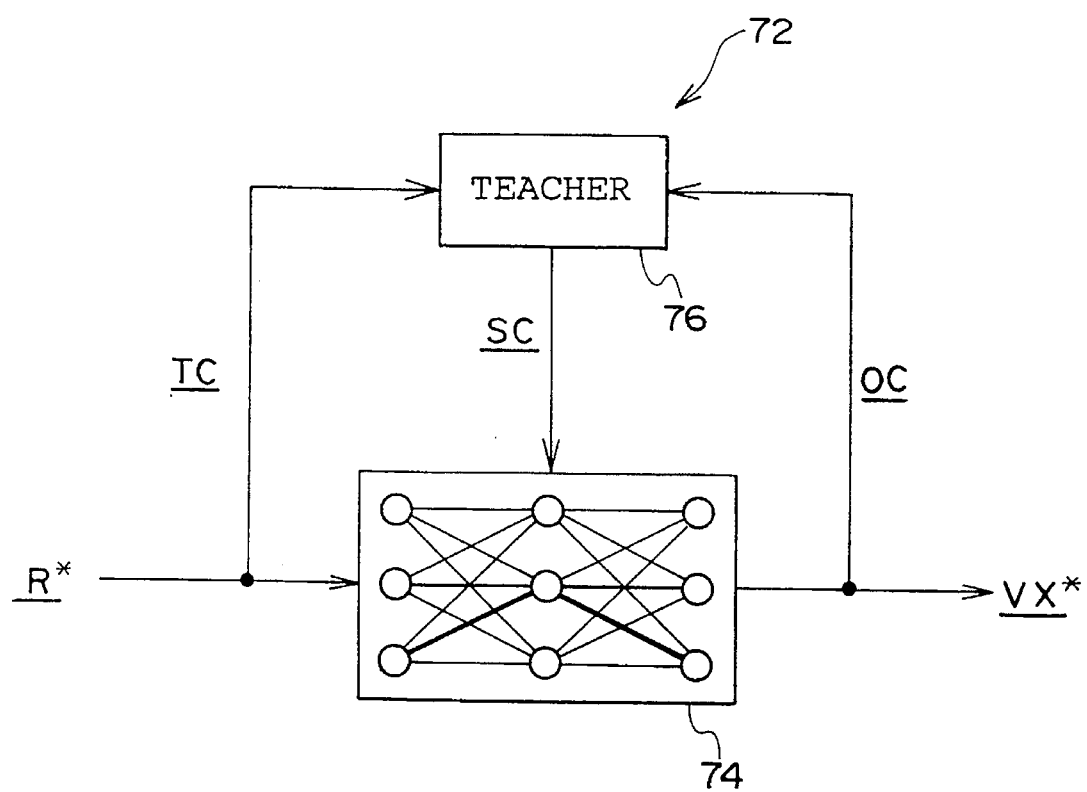
FIG. 41 is a schematic diagram of a neural network apparatus in accordance with the fourth embodiment.

As shown in FIG. 41, the personal computer 16 has a neural network apparatus 72. The neural network apparatus 72 is comprised of a network 74 and a teacher unit 76. Reflectances R* are inputted to the network 74, which, in turn, outputs estimated characteristic value vectors VX*. A teacher signal TC corresponding to an input reflectance R* and an output signal OC corresponding to an output characteristic value vector VX* are inputted to the teacher unit 76, which, in turn, outputs to the network 74 a correction signal SC obtained from the difference between these inputted signals and the like.

Figure 42:
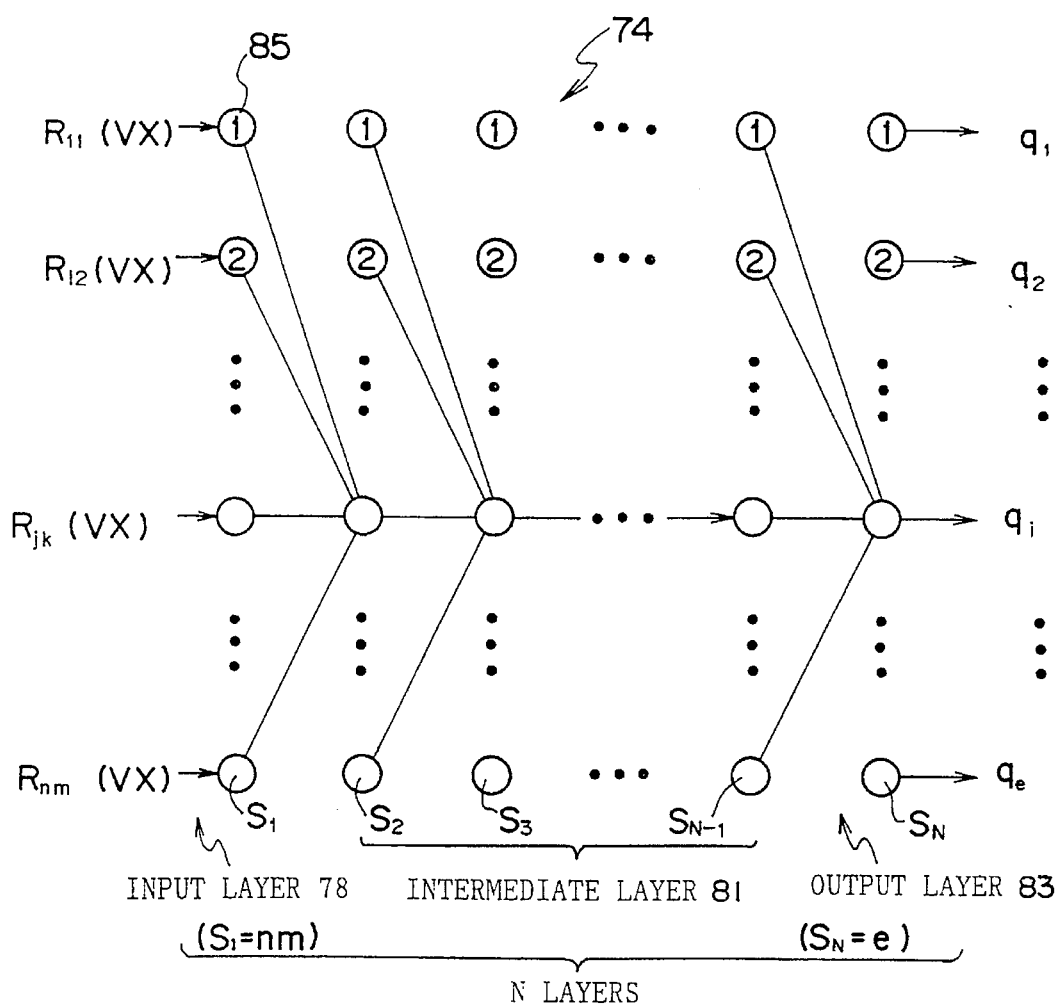
FIG. 42 is an image diagram illustrating a configuration of the network of the network apparatus.

As shown in FIG. 42, in terms of its configuration, the network 74 used in this embodiment is assumed to be of a feed forward (FF) type in which each layer accepts an input only from an immediately preceding layer. The network 74 is comprised of N layers, and neurons 85 (hereafter referred to as units 85) in a number (in this embodiment, nm) corresponding to that of reflectance vectors VR which are input signals are present in an input layer 78. First to nm-th units 85, which are present in the input layer 78, are respectively connected in parallel with all the units 85 which are present in a first layer of an intermediate layer 81, which is an ensuing layer. This intermediate layer 81 has N–2 layers, and the units 85 that are present in each of these layers are respectively connected in parallel with all the units 85 in an ensuing layer. In addition, an output layer 83 continues from a final layer of the intermediate layer 81, and all the units 85 that are present in the final layer of the intermediate layer 81 are connected in parallel with the respective units 85 of the output layer 83. The units 85 in a number (in this embodiment, e) corresponding to that of component materials, i.e., characteristic value vectors, which are output signals, are present in this output layer 83. It should be noted that, with respect to the following units 85, the order of final units 85 which are present in the input layer 78, the intermediate layer 81, and the output layer 83 is denoted as $S_Z$ ($1 \leq Z \leq N$)-th. That is, the final unit of the input layer 78 is $S_1$ (=nm)-th, while the final unit of the output layer 83 is $S_N$ (=e)-th. In addition, the aforementioned connection may be disconnected during learning which will be described later.

Figure 43:
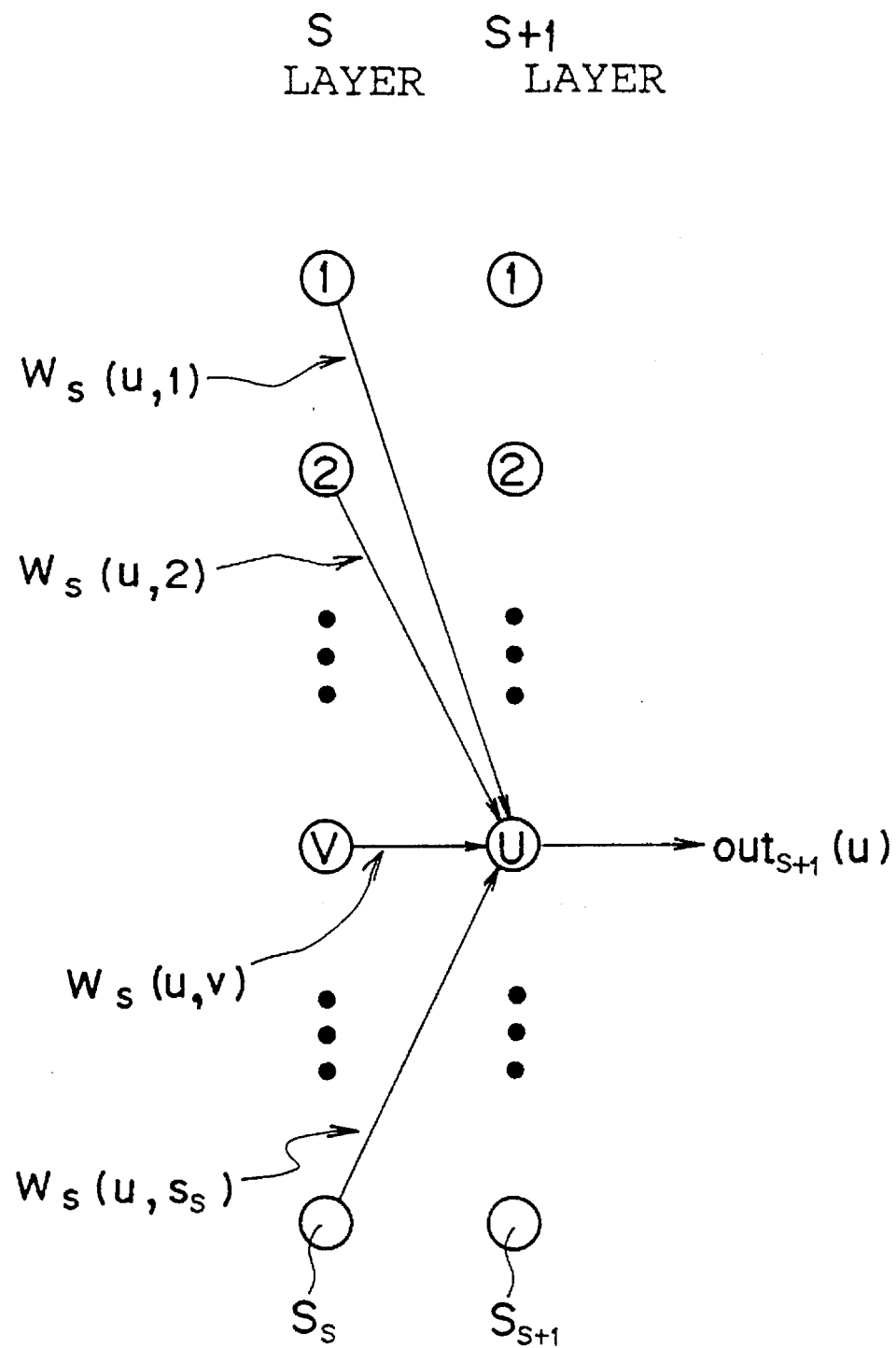
FIG. 43 is an image diagram illustrating adjacent layers in the network.

As shown in FIG. 43, referring to an S layer ($1 \leq S \leq N-1$) and an [S+1] layer, which are adjacent to each other in the network 74, outputs from all the units of the S layer are inputted to a u-th unit of the [S+1] layer. Accordingly, an input $in_{S+1}(u)$ to th u-th unit 85 of the [S+1] layer is shown by the following Formula (24):

$$in_{S+1}(u) = \sum_{v=1}^{S_s} \{w_s(u, v) \cdot out_s(v)\} + t_{S+1}(u) \quad (24)$$

where $w_s$ (u, V): coefficient of coupling between a v-th unit in the S layer and th u-th unit in the [S+1] layer $t_{S+1}$ (U): offset value In addition, an output value $out_{S+1}$ (u) of the u-th unit in the [S+1] layer can be determined by the following Formula (25):

$$out_{S+1}(u) = sigmoid(\mu_0, in_{S+1}(u)) \quad (25)$$

where sigmoid() is a sigmoid function shown in the following Formula (26):

$$sigmoid(\mu_0, X) = \frac{1}{1 + e^{-\frac{2X}{\mu_0}}} \quad (26)$$

where $\mu_0$: constant

Accordingly, the output of the v-th unit of the S layer can be similarly stated as follows:

$$out_S(v) = sigmoid(\mu_0, in_S(v))$$

Next, an error $\delta_S$ (S=1, 2, ..., N) of each unit in the respective layers in the above-described network 74 is defined as described below.

First, an error $\delta_{Nv}$ (v=1, 2, ..., $S_N$) of the v-th unit in the N-th layer which is the output layer 82 is expressed by the following Formula (27):

$$\delta_{Nv} = \left[ \frac{2}{\mu_0} \{T_v - out_N(v)\} \right] \cdot out_N(v)\{1 - out_N(v)\} \quad (27)$$

where

Tv: teacher signal TC corresponding to the v-th unit

Next, an error $\delta_{Su}$ (u=1, 2, ..., $S_z$) of the u-th unit in the S-th layer is expressed by the following Formula (28):

$$\delta_{Su} = \left[ \frac{2}{\mu_0} \left\{ \sum_{v=1}^{S_z} \{\delta_{(S+1)v} \cdot w_{S+1}(u, v)\} \right\} \cdot out_S(u)\{1 - out_S(u)\} \right] \quad (28)$$

where $\delta_{(S+1)v}$: error of the v-th unit in the [S+1] layer

By using the above formula, correction values of the coupling coefficient and the offset value in Formula (24) can be expressed by the following Formulae (29):

$$\Delta W_S(u, v) = \alpha_S \cdot \delta_{(S+1)v} \cdot out_S(v)$$

$$\Delta t_{S+1}(u) = \beta_S \cdot \delta_{(S+1)v} \quad (29)$$

where $\alpha_S$, $\beta_S$: constants

As an example of a leaning method using the above-described neural network, a back propagation method (hereafter referred to as the BP method) is known. The BP method is a method whereby the network 74 is converged, i.e., the system is stabilized, by allowing correction values $\Delta W_S$ (u, v) and $\Delta t_{S+1}$ (u) of the coupling coefficient and the offset value shown in Formulae (29) above to converge.

In the BP method, in the same way as in a known delta rule, there are cases where a minimum value of the error is not determined. To overcome this problem, a moment method and a correction moment method are known, and also known as another method is a constant variation method in which an initial value of the correction value is set to a large value, and the correction value is reduced as the error becomes smaller.

In addition, as methods of correcting the coupling coefficient in the BP method, the following methods are known: a consecutive correction method in which the coupling coefficient is corrected with respect to one input, and a batch correction method in which correction amounts are accumulated and correction is effected en bloc after completion of all inputs.

Figure 44:
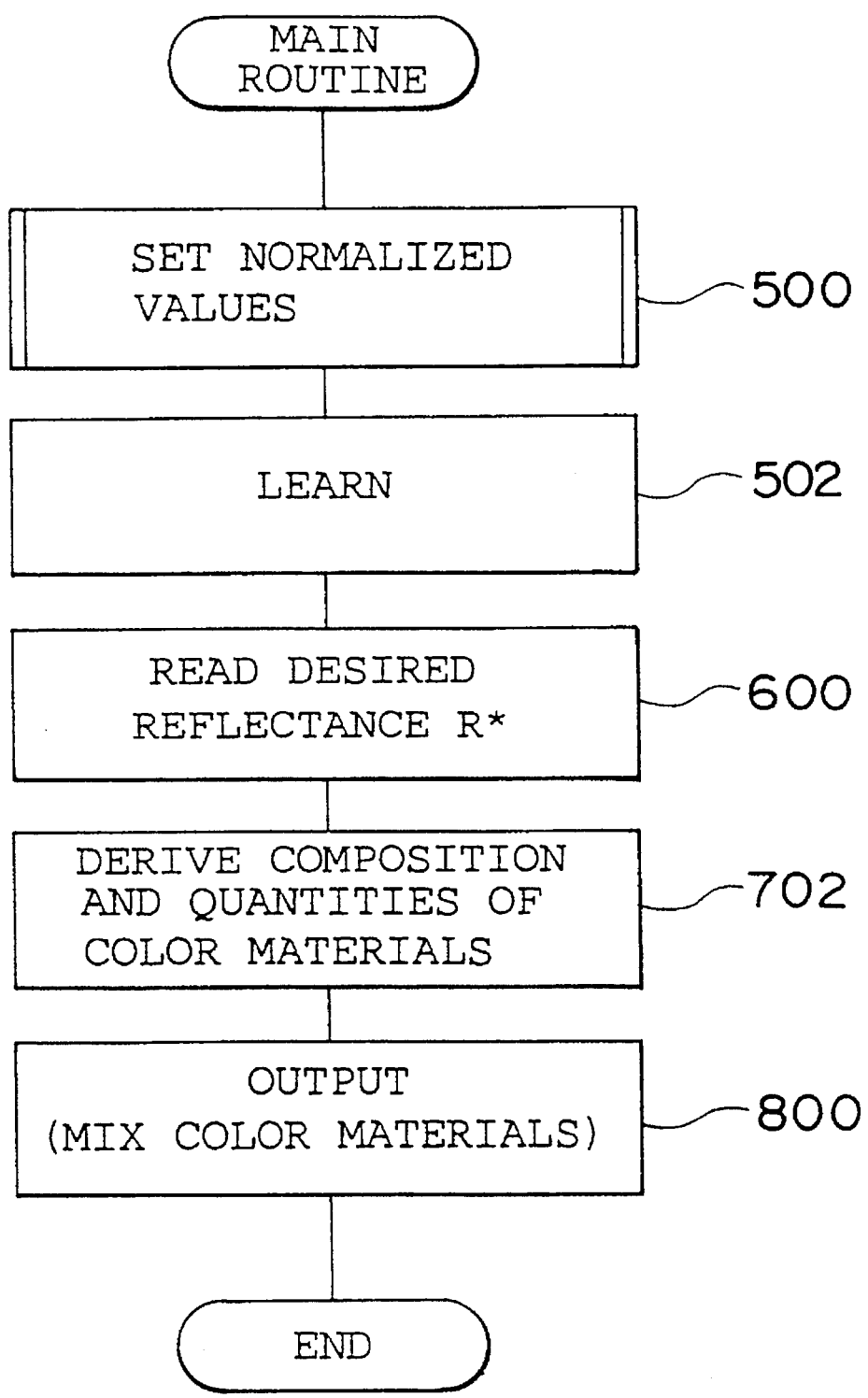
FIG. 44 is a flowchart illustrating the flow of a control main routine for reproducing a coating color in accordance with a fifth embodiment.

Next, a description will be given of the operation of this embodiment using a first NNW method. When an unillustrated power switch of the color reproducing apparatus constituted by the personal computer 16 and the like is turned on, a main routine for reproducing a coating color, shown in FIG. 44, is executed. In Step 500, the aforementioned normalized values are set. Accordingly, $L=p^e$ combinations of the characteristic value vector VX and the reflectance $R(\alpha, \lambda, VX)$ are obtained, as shown in Formula (20-2) above.

With respect to reflectances R of combinations ($5^3=125$ sets) of tristimulus values of five kinds each, which become dispersed coordinate values on the x-y chromaticity coordinates, learning is conducted by using known relationships between reflectance vectors VR and characteristic value vectors VX, as described below.

In an ensuing Step 502, the learning of the network 74 is carried out. Namely, the following nm pieces of data on reflectance with respect to the characteristic value vector VX are given as an input of the network 74:

$$R_{11}(VX), R_{12}(VX), \ldots, R_{nm}(VX):VR$$

At the same time, the following e elements (quantities) of the characteristic value vector VX for obtaining the reflectance vector VR are outputted to the teacher unit 76 as teacher signals:

$$x_1[q_1], x_2[q_2], \ldots, x_e[q_e]$$

The teacher unit 76 outputs the correction signal SC while monitoring the characteristic value vector VX and the output of the network as described below. Such processing is carried out with respect to L sets by using the above-described BP method to learn the network 74. This learning process is repeated until a mean square error $\epsilon$, shown in Formula (30) below, between the characteristic value vector VX, which is a targeted value, and the output value (a characteristic value vector consisting of the quantity of a component material) of the network converges or becomes sufficiently small. The coupling coefficient $w_S$ (u, v) and the offset $t_{S+1}$ (u) at this time are determined.

$$\epsilon = \frac{1}{L} \cdot \Sigma |VX - VX'|^2 \quad (30)$$

When the process of learning the network 74 is thus completed, the operation proceeds to Step 600 to read a new reflectance R* ($\alpha, \lambda$) desired by the designer or the like. In an ensuing Step 702, an output $x_1[q_1]^*, x_2[q_2]^*, \ldots, x_e[q_e]^*$ of the network 74 with respect to desired reflectance data $R_{11}^*, R_{12}^*, \ldots, R_{nm}^*$ is obtained by using the aforementioned coupling coefficient and offset value. If the characteristic value vector VX* for obtaining the new reflectance R* ($\alpha, \lambda$) is found in the above-described manner, and, in Step 800, signals representing the mixture $x_1[q_1]^*, x_2[q_2]^*, \ldots, x_e[q_e]^*$ based on the characteristic value vectors VX* are outputted to the color-material mixing apparatus 20, and the paint is produced by the color-material mixing apparatus 20, it is possible to fabricate a coated object such as a coated plate having a desired reflectance R*($\alpha, \lambda$).

Next, a description will be given of a second NNW method in accordance with the fifth embodiment. In the above-described first NNW method, although it is effective with respect to linear problems in which the convergence of solutions is readily obtained, there are cases where solutions do not converge in complicated problems such as nonlinear problems. This second NNW method is effective with respect to complicated problems such as nonlinear problems.

In the second NNW method, the characteristic value vector VX constituting the known reflectance R is set as an input to the network 74, and the reflectance vector VR corresponding to the known reflectance R is set as the teacher signal TC. The network 74 is converged (the system is stabilized) by using known relationships of L sets in the same way as described above. Consequently, it is possible to form the network 74 which outputs the reflectance VR when the characteristic value vector VX is given. This converged network 74 corresponds to the function f for solving a problem corresponding to Formula (22) above. Accordingly, in the second NNW method, to obtain the characteristic value vector VX* corresponding to a desired reflectance R*, an inverse function $f^{-1}$ for obtaining a solution of an inverse problem corresponding to Formula (23) is determined, as will be described below.

It should be noted that, in the second NNW method, a network 74 in which the numbers of units in the respective layers are identical is used because a square matrix (details will be described later) is used. In this embodiment, a description will be given by citing an example in which the number of units of each layer is p (order is p). With respect to inputs and outputs to and from the network 74, there are cases where the number of elements of the characteristic value vector VX, i.e., an input, and the number of reflectance vectors VR, i.e., an output, do not agree. In that case, correspondence can be provided as a very small value whose resultant error will not affect in the process of propagation to a next layer is inputted as an input signal to the units of the input layer 78 whose number has exceeded the number of elements of the characteristic value vector VX inputted.

First, a v-th unit in the S layer and a u-th unit in the [S+1] layer will be considered (see FIG. 43). If it is assumed that an input of the u-th unit in the [S+1] layer is $in_{S+1}(u)$, and that an output thereof is $out_{S+1}(u)$, inputs from all the units of the S layer are provided to the u-th unit in the [S+1] layer, so that the relation between the input and output in the u-th unit in the [S+1] layer can be expressed by Formula (31) below.

It should be noted that, in this embodiment, the order $S_z$ of all final units in the respective layers is p, and $1 \leq v \leq p$, $1 \leq u \leq p$. Furthermore, since only one input signal corresponding to each unit is inputted to the input layer 78, it is assumed that $in_1(v) = out_1(v)$.

$$in_{S+1}(u) = \sum_{v=1}^{P} \{w_S(u, v) \cdot out_S(v)\} + t_{S+1}(u) \quad (31)$$

If this Formula (31) is developed, we have $in_{S+1}(1) = w_S(1, 1) \cdot out_S(1) + \ldots + w_S(1, p) \cdot out_S(p) + t_{S+1}(1)$ $in_{S+1}(2) = w_S(2, 1) \cdot out_S(1) + \ldots + w_S(2, p) \cdot out_S(p) + t_{S+1}(2)$ $in_{S+1}(3) = w_S(3, 1) \cdot out_S(1) + \ldots + w_S(3, p) \cdot out_S(p) + t_{S+1}(3)$

. . . . . .

$in_{S+1}(p) = w_S(p, 1) \cdot out_S(1) + \ldots + w_S(p, p) \cdot out_S(p) + t_{S+1}(p)$ Here, a matrix $IN_{S+1}$ and a matrix $OUT_S$ are set as follows:

$IN_{S+1} = [in_{S+1}(1), in_{S+1}(2), \ldots, in_{S+1}(P)]$ $OUT_S = [out_S(1), out_S(2), \ldots, out_S(P)]$ $T_{S+1} = [t_{S+1}(1), t_{S+1}(2), \ldots, t_{S+1}(P)]$ and if a square matrix $A_S$ in which the coupling coefficient $w_S(u, v)$ is set as an element is defined, Formula (31) above can be expressed by the following Formula (32):

$$IN_{S+1} = A_S \cdot OUT_S + T_{S+1} \quad (32)$$

where, $$A_S = \begin{bmatrix} w_S(1,1) & w_S(1,1) & \ldots & w_S(1,p) \\ w_S(2,1) & w_S(2,2) & \ldots & w_S(2,p) \\ \cdot & \cdot & & \cdot \\ \cdot & \cdot & & \cdot \\ \cdot & \cdot & & \cdot \\ w_S(p,1) & w_S(p,2) & \ldots & w_S(p,p) \end{bmatrix}.$$

By using a sigmoid function with respect to this matrix $OUT_S$ in the same manner as in Formula (25) above, Formula (33) below is defined. Accordingly, an inverse function of the sigmoid function expressed by the following Formula (33) is transformed into Formula (34), so that the relation between the input and output in the [S+1] layer can be expressed by Formula (35) below.

$$OUT_S = \text{sigmoid}(\mu_0, IN_S) \quad (33)$$
$$= g(IN_S)$$

$$g^{-1}(X) = -\frac{\mu_0}{2} \ln\left(\frac{1}{x} - 1\right) \quad (34)$$

$$IN_{S+1} = g^{-1}(OUT_{S+1}) \quad (35)$$

where, $g^{-1}(OUT_{S+1})$ is defined as follows:

$$\begin{bmatrix} (OUT_1) \\ (OUT_2) \\ (OUT_3) \\ \cdot \\ \cdot \\ (OUT_P) \end{bmatrix} \overset{\text{def.}}{=} g \left( \begin{bmatrix} g(OUT_1) \\ g(OUT_2) \\ g(OUT_3) \\ \cdot \\ \cdot \\ g(OUT_P) \end{bmatrix} \right)$$

Then, the following Formulae (36) can be derived by using Formulae (32) and (35) above:

$$OUT_1 = IN_1,$$
$$OUT_S = A_S^{-1} \cdot IN_{S+1}$$
$$= A_S^{-1} \cdot g^{-1}(OUT_{S+1} - T_{S+1})$$
$$OUT_1 = A_1^{-1} \cdot g^{-1}(OUT_2) \quad (36)$$
$$= A_1^{-1} g^{-1}(A_2^{-1} g^{-1}(\ldots A_{N-1}^{-1}(g^{-1}(OUT_N) - T_N) \ldots))$$

where S=1, 2, . . . , N–1

As can be appreciated from Formulae (36) above, if an output signal from an output layer is obtained, it is possible to obtain an input signal to an input layer. Hence, Formulae (36) corresponds to the inverse function $f^{-1}$, which can be expressed by the following Formula (37):

$$f^{-1}(OUT_N) = A_1^{-1} g^{-1}(A_2^{-1} g^{-1}(\ldots A_{N-1}^{-1}(g^{-1}(OUT_N) - T_N) \ldots)) \quad (37)$$

Since the inverse function $f^{-1}$ can be determined in this way, it is possible to perform calculation for obtaining a characteristic value vector VX* corresponding to a desired reflectance R* by using the coupling coefficient of the converged network 74.

Next, a description will be given of the operation of this embodiment using the second NNW method. When a main routine for reproducing a coated color is executed (see FIG. 44), normalized values are set (Step 500), and processing for leaning the network 74 is conducted (Step 502). In the processing for learning the network 74 by the second NNW method, a learning processing routine shown in FIG. 67 is executed.

Figure 67:
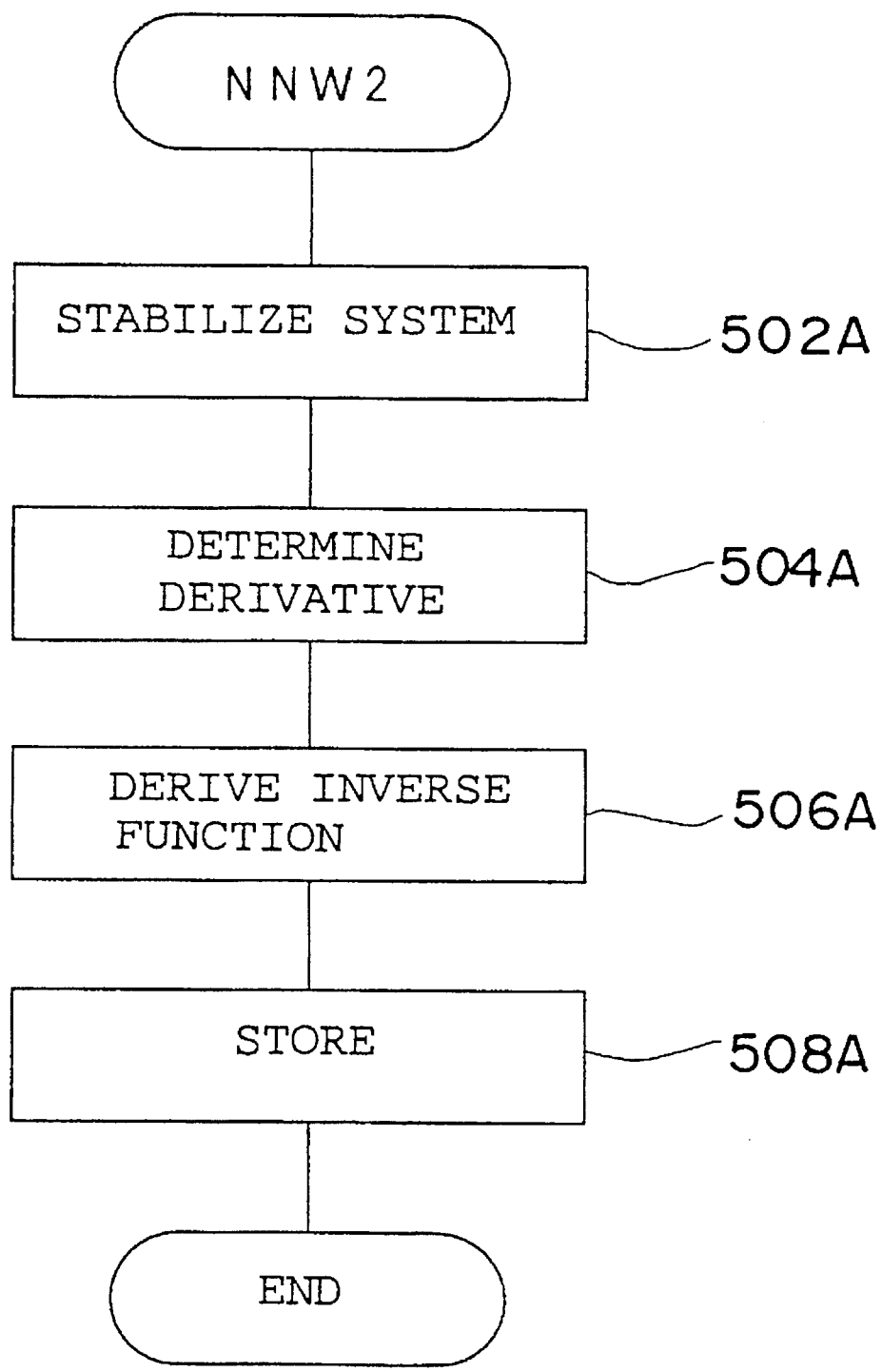
FIG. 67 is a flowchart illustrating the flow (Step 502 in FIG. 44) of a second NNW method in accordance with the fifth embodiment.

In Step 502A in FIG. 67, convergence processing of the network 74 (stabilization of the system) is carried out by using normalized values, as described above. In an ensuing Step 504A, a derivative is determined by using the coupling coefficient of the stabilized system. Namely, the square matrix $A_s$ and a function g are determined. In an ensuing Step 506A, a square inverse matrix $A_S^{-1}$ and an inverse function $g^{-1}$ are derived from the square matrix $A_S$ and the function g thus determined. In an ensuing Step 508A, the square inverse matrix $A_S^{-1}$ and the inverse function $g^{-1}$ thus determined are stored.

When the process of learning the network 74 is completed in this manner, the operation proceeds to Step 600 in FIG. 44 to read a new reflectance $R^*(\alpha, \lambda)$ desired by the designer or the like. In an ensuing Step 702, an output $x_1[q_1]^*$, $x_2[q_2]^*, \ldots, x_e[q_e]^*$ of the network 74 with respect to the desired reflectance data $R_{11}^*, R_{12}^*, \ldots, R_{nm}^*$ is obtained by using the square inverse matrix $A_S^{-1}$ and the inverse function $g^{-1}$ stored. If the characteristic value vector $VX^*$ for obtaining the new reflectance $R^*(\alpha, \lambda)$ is found in the above-described manner, and signals representing the mixture $x_1[q_1]^*, x_2[q_2]^*, \ldots, x_e[q_e]^*$ based on the characteristic value vectors $VX^*$ are outputted to the color-material mixing apparatus 20 (Step 800), and the paint is produced by the color-material mixing apparatus 20, it is possible to fabricate a coated object such as a coated plate having a desired reflectance $R^*(\alpha, \lambda)$.

Next, a description will be given of a third NNW method in accordance with the fifth embodiment. In the third NNW method, in the same way as in the second NNW method, the characteristic value vector VX constituting the known reflectance R is set as an input to the network 74, and the reflectance vector VR corresponding to the known reflectance R is set as the teacher signal TC. The network 74 is converged (the system is stabilized) by using known relationships of L sets in the same way as described above. Consequently, it is possible to form the network 74 which outputs the reflectance VR when the characteristic value vector VX is given.

Next, a description will be given of the operation of this embodiment using the third NNW method. When a main routine for reproducing a coated color is executed (see FIG. 44), normalized values are set (Step 500), and processing for leaning the network 74 is conducted (Step 502). In the processing for learning the network 74 by the third NNW method, a learning processing routine shown in FIG. 68 is executed.

Figure 68:
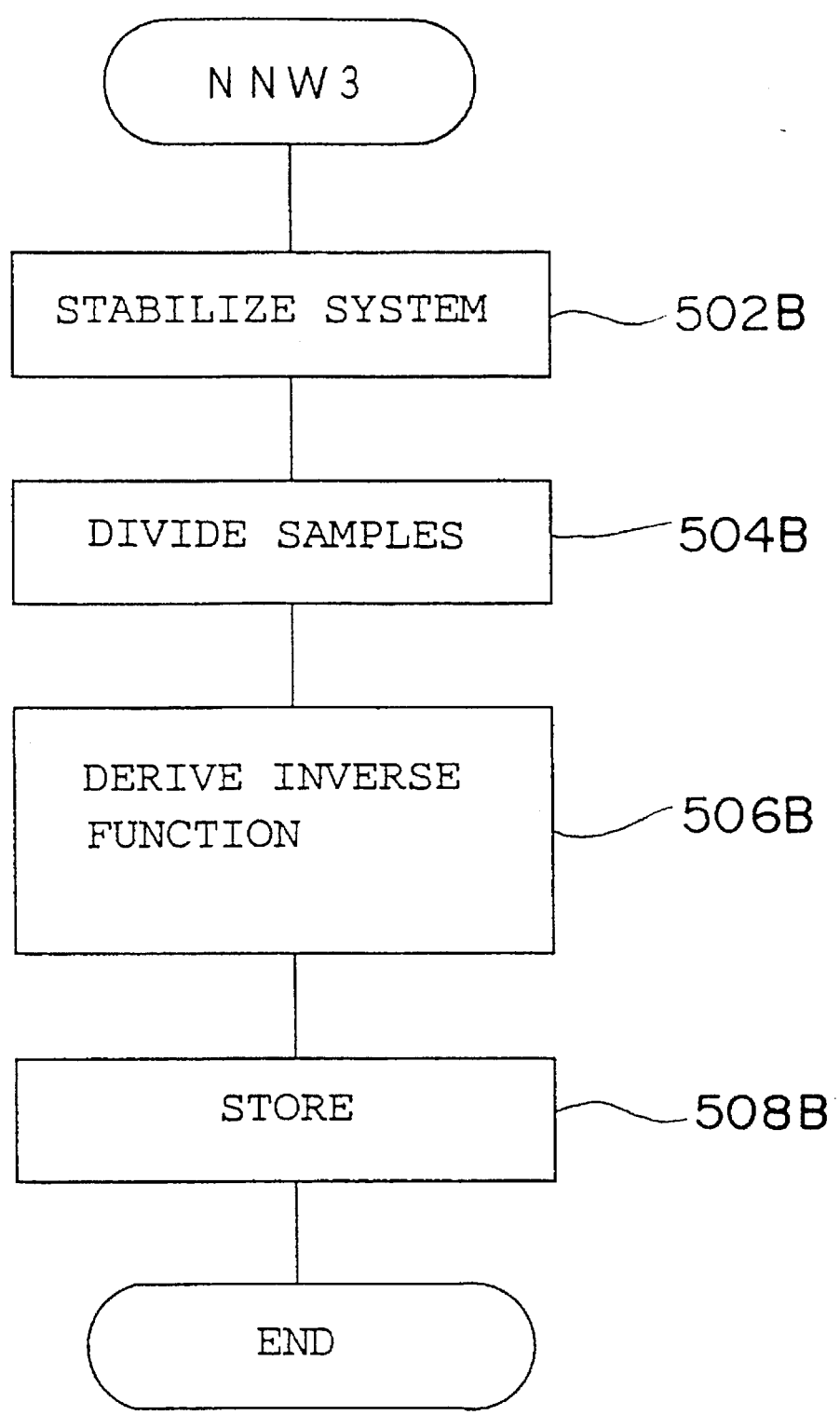
FIG. 68 is a flowchart illustrating the flow (Step 502 in FIG. 44) of a third NNW method in accordance with the fifth embodiment.

In Step 502B in FIG. 68, convergence processing of the network 74 (stabilization of the system) is carried out by using normalized values (samples), as described above. In an ensuing Step 504B, as for the samples used in Step 502 above, the respective quantities of component materials are divided by a predetermined number of boundary values with respect to intervals where the values of the characteristic value vector VX are close, so as to set a predetermined number of interpolation characteristic value vectors VVX at equal intervals. In an ensuing Step 506B, interpolation reflectance vectors VVR, which are an output, are determined by using as an input the interpolation characteristic value vectors VVX set in Step 504B by using the aforementioned stabilized system. In an ensuing Step 508B, the correspondence between the characteristic value vectors VX and the reflectance vectors VR, which was used in the stabilization of the system, as well as the correspondence between the interpolation characteristic value vectors VVX and the interpolation reflectance vectors VVR, which was determined in Step 506B are scored.

When the process of learning the network 74 is thus completed, the operation proceeds to Step 600 in FIG. 44 to read a new reflectance $R^*(\alpha, \lambda)$ desired by the designer or the like. In an ensuing Step 702, a reflectance vector VR or an interpolation reflectance vector VVR, which coincides with or is closest to the reflectance data $R_{11}^*, R_{12}^*, \ldots, R_{nm}^*$ corresponding to the few reflectance $R^*(\alpha, \lambda)$ thus read, is selected. The characteristic value vector VX or the interpolation characteristic value vector VVX corresponding to the selected vector is set as an output $x_1[q_1]^*, x_2[q_2]^*, \ldots, x_e[q_e]^*$. If the characteristic value vector $VX^*$ for obtaining the new reflectance $R^*(\alpha, \lambda)$ is found in the above-described manner, and signals representing the mixture $x_1[q_1]^*, x_2[q_2]^*, \ldots, x_e[q_e]^*$ based on the characteristic value vectors $VX^*$ are outputted to the color-material mixing apparatus 20 (Step 800), and the paint is produced by the color-material mixing apparatus 20, it is possible to fabricate a coated object such as a coated plate having a desired reflectance $R^*(\alpha, \lambda)$.

Through the above-described third and fifth embodiments, two methods have been shown for obtaining an unknown characteristic value vector $VX^*$. The first method in accordance with the third embodiment makes it possible to obtain high-precision solutions, but the amount of prior calculation is large. The second method in accordance with the fifth embodiment affords lower accuracy as compared to the first method, but the amount of calculation is small, and high speed processing is possible. As such, it suffices if the two methods are selectively used depending on applications.

Next, a description will be given of a sixth embodiment. In the above-described embodiments, after the reflectance $R(\alpha, \lambda)$ is set, a characteristic value vector VX for realizing the same is determined. Incidentally, designers in general are unfamiliar with numerical reflectances when seen from the standpoint of the designers, and in terms of the operating efficiency it is not appropriate for the reflectances per se to be set as objects of control. In this embodiment, therefore, a coating color is reproduced on the basis of the sense of the user such as the designer (hereafter referred to as the design sense). Since the sixth embodiment is arranged in a manner similar to those of the above-described embodiments, identical portions will be denoted by the same reference numerals, and a detailed description thereof will be omitted.

In addition, in this embodiment, a description will be given of a case where a coating color is selected on the basis of the Munsell color system and the CIE chromaticity coordinates which, when used ordinarily, are easy for color designers and personnel of paint manufacturers to understand.

Reflectances $R(\alpha, \lambda, VX_1), R(\alpha, \lambda, VX_2), \ldots, R(\alpha, \lambda, VX_L)$ are determined with respect to the above-described characteristic value vectors $VX_1, VX_2, \ldots, VX_L$. If these reflectances R are determined, the tristimulus values (X, Y, Z) and chromaticity (x, y) can be calculated from Formulae (38) and (39) below.

$$\begin{pmatrix} X \\ Y \\ Z \end{pmatrix} = \frac{1}{k} \int R(\alpha, \lambda, VX) \cdot I(\lambda) \begin{pmatrix} \bar{x}(\lambda) \\ \bar{y}(\lambda) \\ \bar{z}(\lambda) \end{pmatrix} d\lambda \quad (38)$$

where $k = 100 \cdot \int \{I(\lambda) \bar{y}(\lambda) d\lambda\},$ $\bar{x}(\lambda)$, $\bar{y}(\lambda)$, $\bar{z}(\lambda)$: CIE color matching function, $\lambda$: wavelength This Y shows the brightness of the light $I(\lambda)$, and the color can be specified by plotting points on a chromaticity diagram of an orthogonal coordinate system in which values of x and y obtained from the following Formulae (39) are set as chromaticity coordinates, and x is plotted as the abscissa and y as the ordinate in a conventionally known manner (all the colors are included within a slanted bell shape:

$$x=X/(X+Y+Z)$$

$$y=Y/(X+Y+Z) \quad (39)$$

In addition, since correspondences can be obtained between the chromaticity coordinates (x, y) and the Munsell color system through a table of JIS Z 8721 (Specification of Colors According to their Three Attributes) and the like, if the chromaticity coordinates (x, y) and the brightness Y are determined, it is possible to determine the three attributes of color in the Munsell system, i.e., hue (H), brightness (V), and chroma (C), corresponding thereto.

Figure 46:
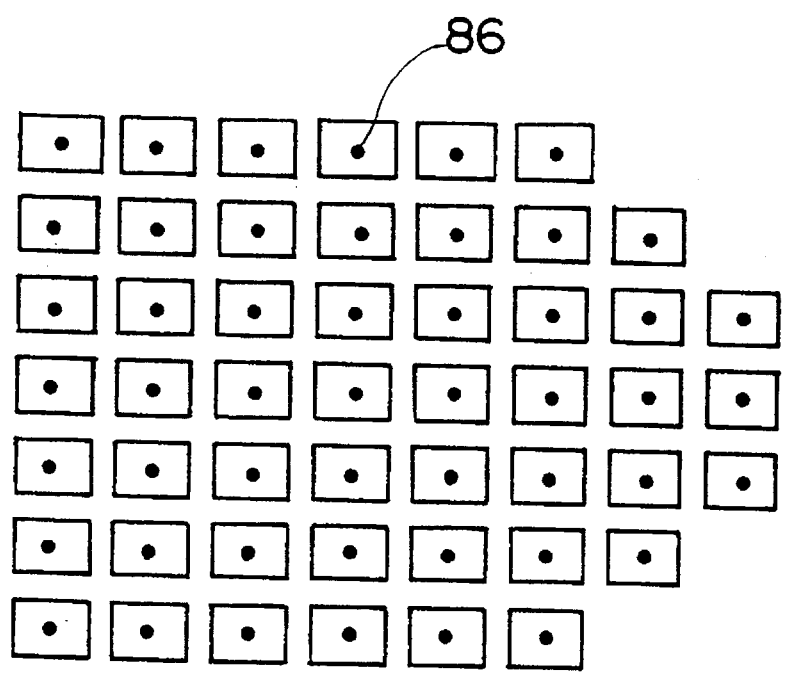
FIG. 46 is a diagram illustrating the Munsell color system.
Figure 47:
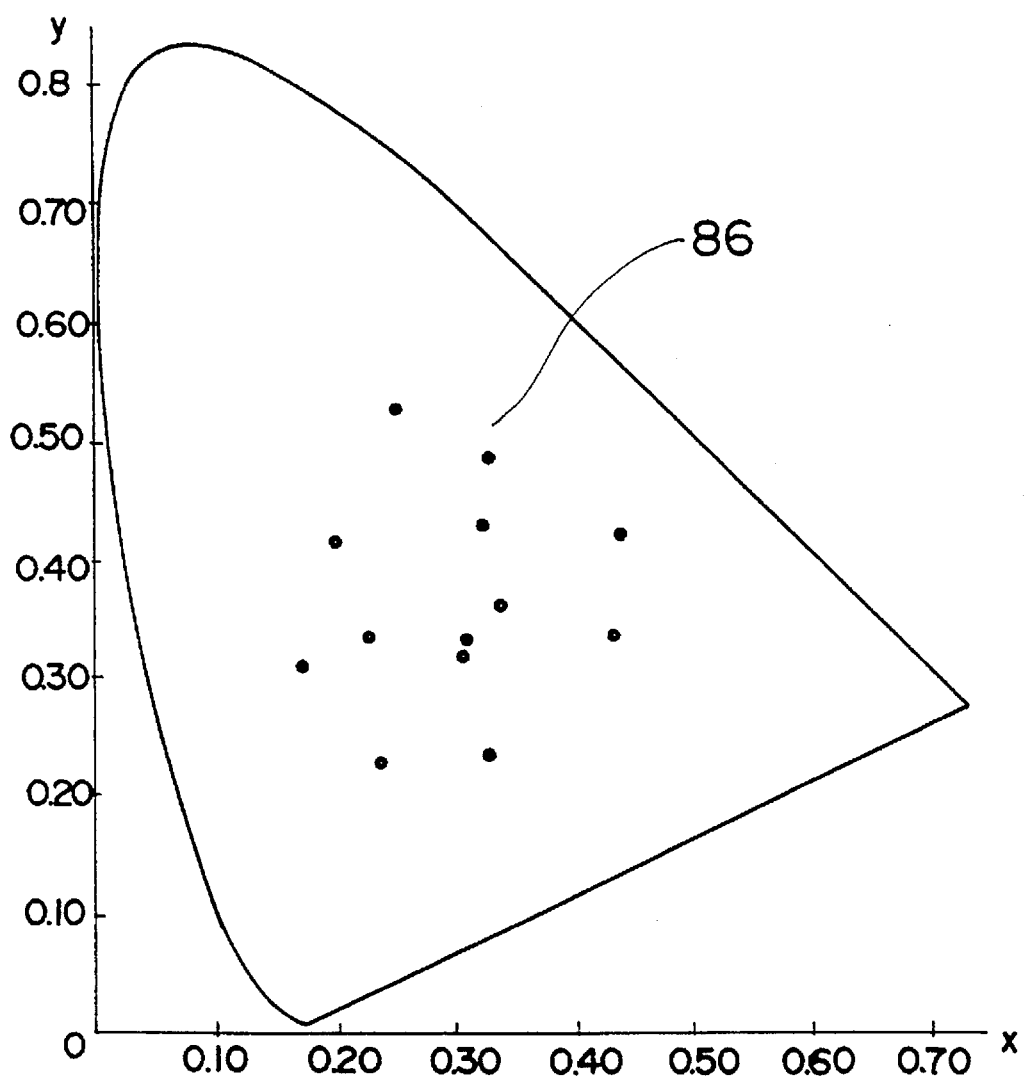
FIG. 47 is a diagram illustrating the CIE chromaticity coordinates.
Figure 48:
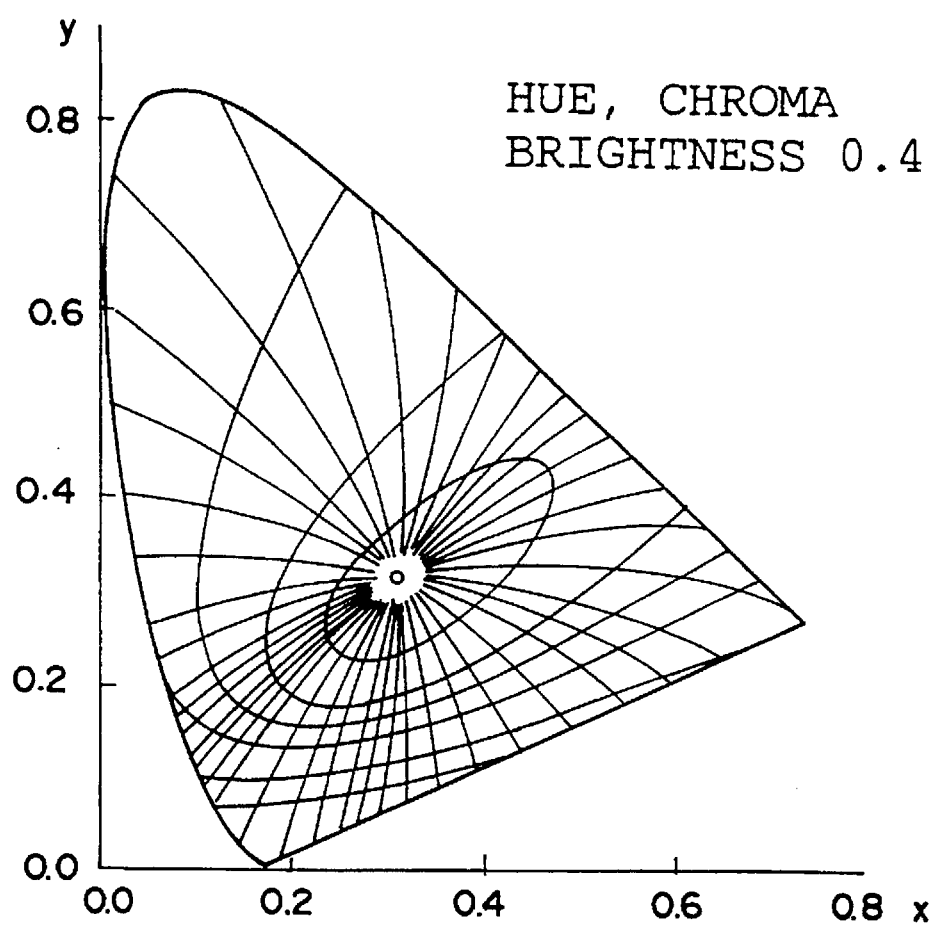
FIG. 48 is a diagram illustrating correspondence between the Munsell color system and the CIE chromaticity coordinates.

Accordingly, if the data on the sample coated plates obtained in the above-described embodiments are plotted at corresponding positions in the diagram of the Munsell color system shown in FIG. 46 or on the CIE chromaticity coordinates shown in FIG. 47, then all the plotted points have information on the reflectance $R(\alpha, \lambda)$. Incidentally, it is possible to use a diagram in which the Munsell color system and the CIE chromaticity coordinate system are made to correspond to each other, as shown in FIG. 48.

Figure 45:
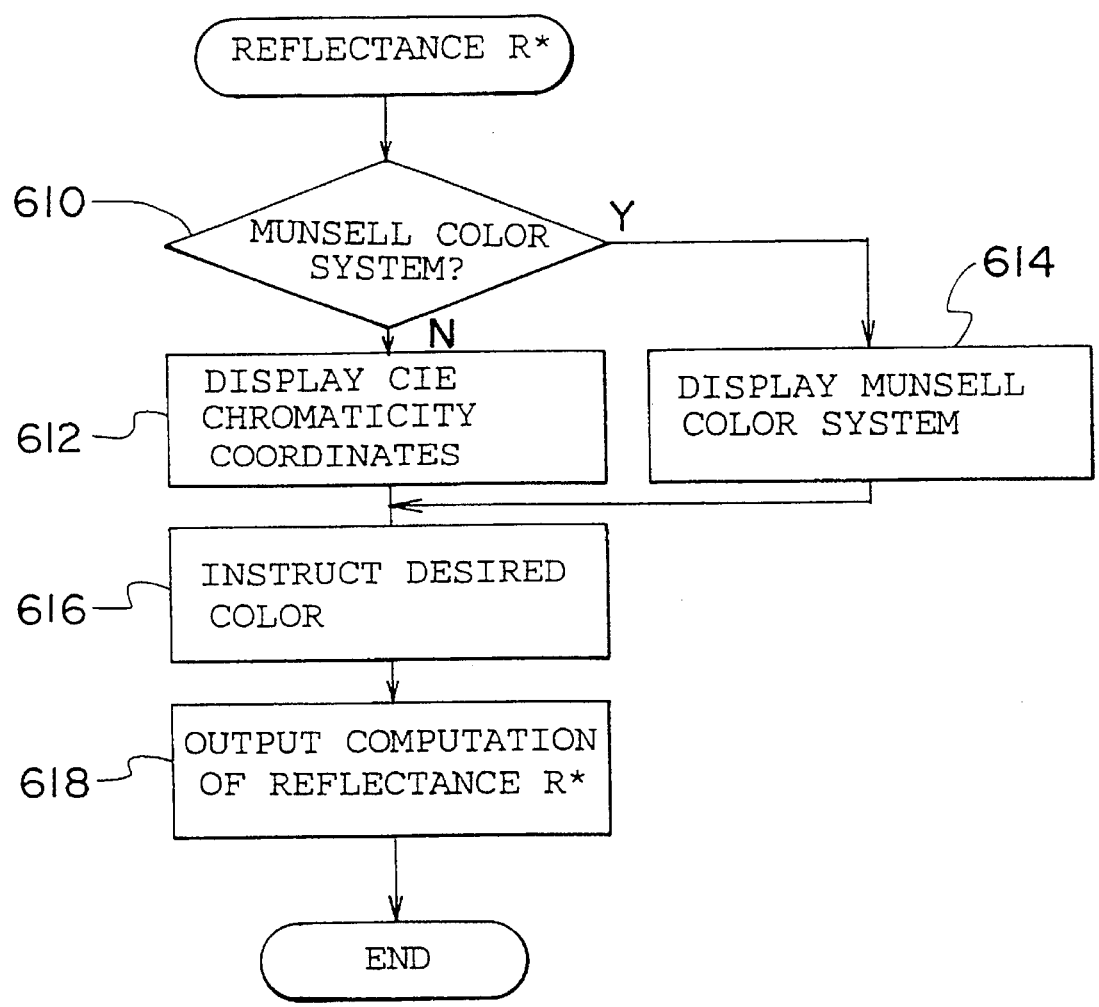
FIG. 45 is a flowchart illustrating the flow of a coating-color selection routine in accordance with a sixth embodiment.

Next, a description will be given of the operation of this embodiment. When the operation proceeds to Step 600 in the aforementioned flowchart, a coating-color selection routine shown in FIG. 45 is executed. In Step 610 in FIG. 45, a command signal instructed via the keyboard 10 is discriminated so as to determine whether or not the colorimetric system instructed by the designer concerning the coating color is the Munsell color system. If YES is the answer in the determination, in Step 614, data on the Munsell color system stored in advance are read, and the diagram of the Munsell color system is displayed on the CRT 14, and the operation proceeds to Step 616. Meanwhile, if NO is the answer in the determination, in Step 612, data on the CIE XYZ colorimetric system stored in advance are read, and x-y chromaticity coordinates of the CIE XYZ colorimetric system are displayed.

In Step 616, a desired coating color is instructed by the designer or the like by selecting a point 86 plotted on the diagram of the Munsell color system or the CIE chromaticity coordinates. In an ensuing Step 618, the reflectance $R^*(\alpha, \lambda)$ is determined on the basis of the plotted point 86 thus selected, and this reflectance $R^*(\alpha, \lambda)$ is outputted. Accordingly, the characteristic value vector VX corresponding to this reflectance $R^*(\alpha, \lambda)$ is determined, and the desired coating color can be obtained from the characteristic value vector VX.

In addition, in the case where the designer selects the plotted point 86, and when a point between a plotted point and a plotted point is selected, it is possible to determine a characteristic value vector corresponding to the selected plotted point through interpolation or the like. Specifically, it suffices if, after $R(\alpha, \lambda, VX)$ with respect to small changes of the characteristic value vector VX is determined from the relation shown in Formula (20-3) above, the chromaticity (x, y) is calculated from Formulae (38) and (39), and the point is plotted on the diagram of the Munsell color system or the CIE chromaticity coordinates (see FIG. 24).

Figure 49:
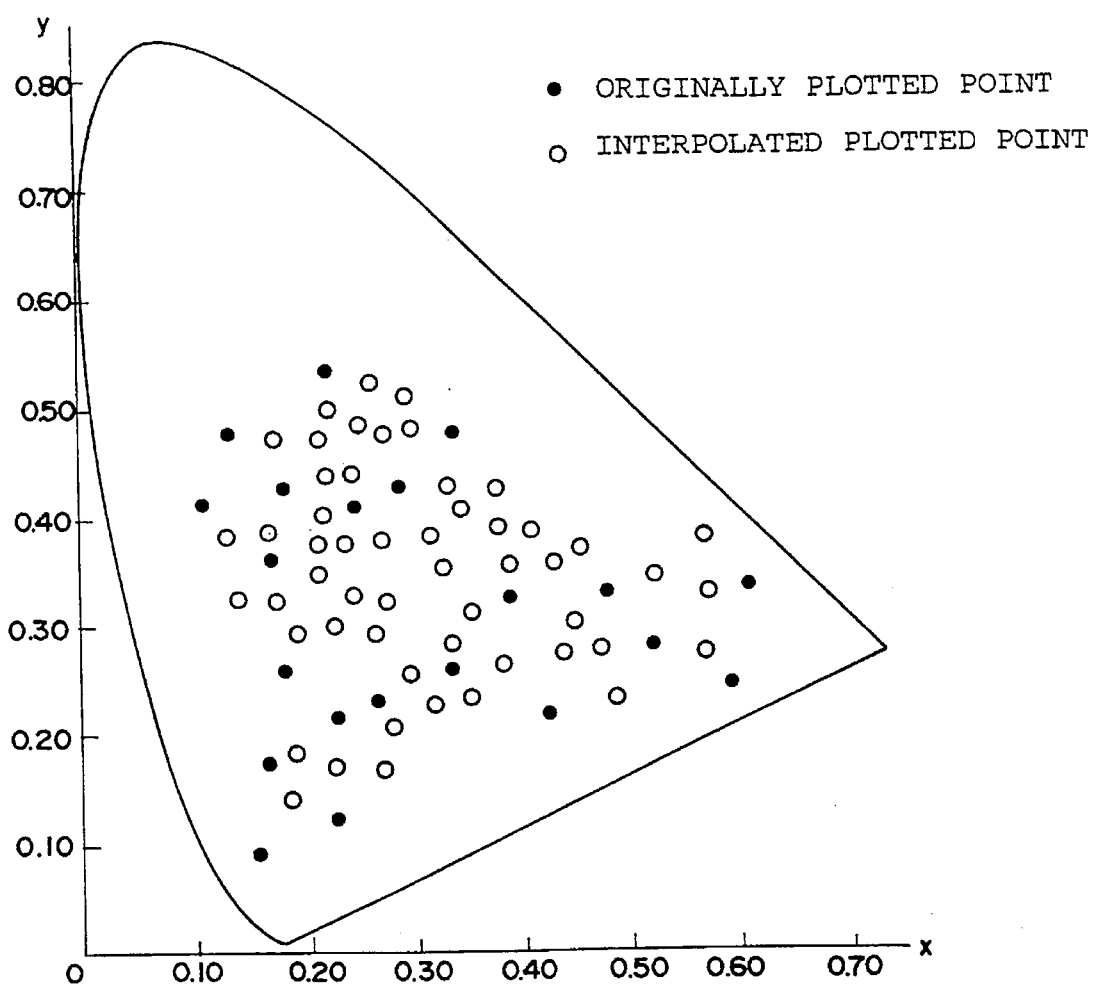
FIG. 49 is a diagram for explaining that points other than plotted points are obtained by interpolation.

Next, a description will be given of a seventh embodiment. In the seventh embodiment, a coating color instructed vaguely by the designer or the like through the use of a verbal expression such as "provide a reddish tinge" is reproduced appropriately. It should be noted that since the seventh embodiment is arranged in a manner similar to those of the above-described embodiments, identical portions will be denoted by the same reference numerals, and a detailed description thereof will be omitted. Additionally, in this embodiment, it is assumed that a plurality of plotted points 86, which are selectable from the CIE chromaticity coordinates, have been determined in Step 216 in the sixth embodiment (see FIG. 49).

Figure 50:
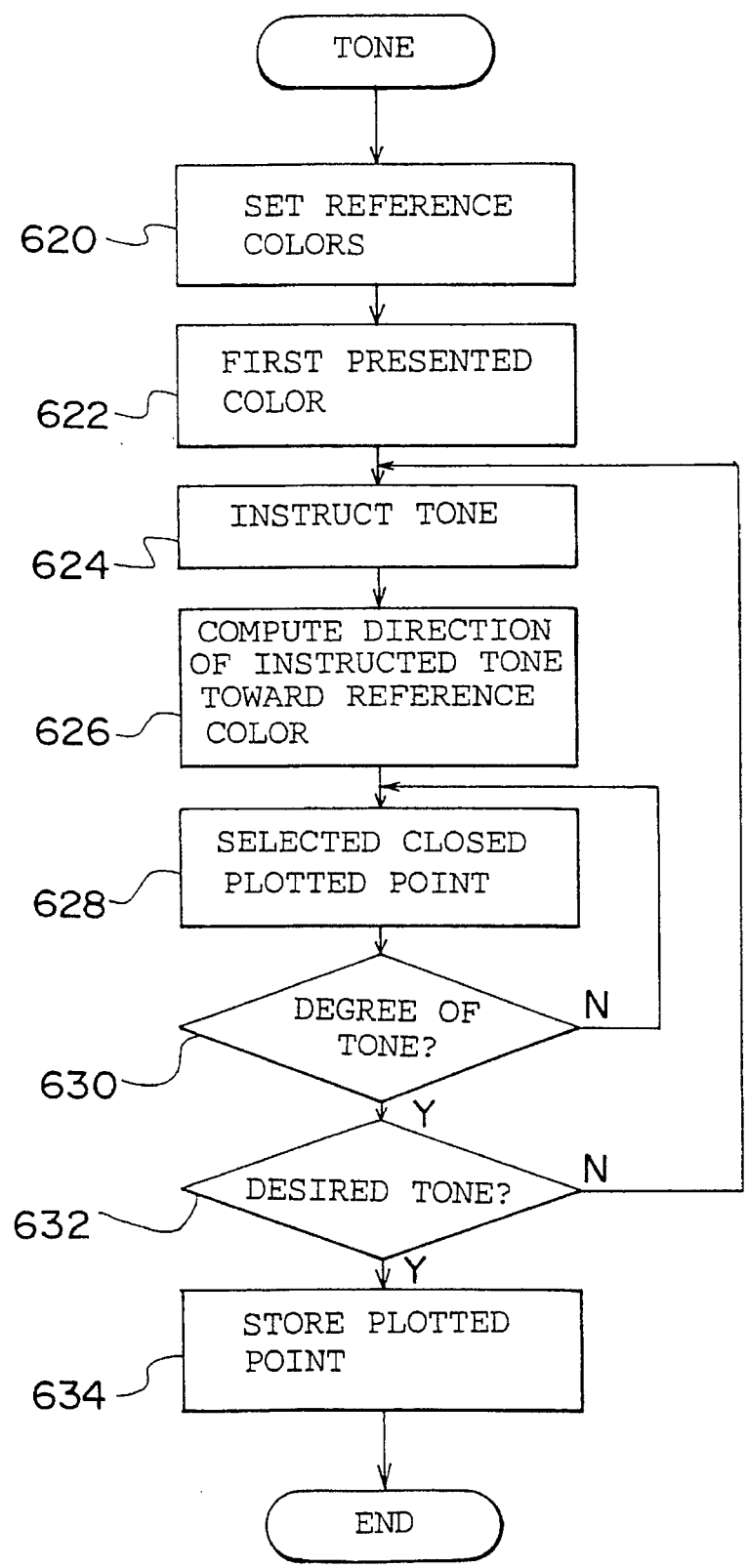
FIG. 50 is a flowchart illustrating the flow of a process in which a tone is imparted to a coating color as instructed, in accordance with a seventh embodiment.

A description will be given of the operation of this embodiment. When a plotted point 86 on the CIE chromaticity coordinates, which is estimated by the designer or the like as being a desired coating color, is selected in Step 616 in FIG. 45, the operation proceeds to Step 620 in FIG. 50. A description will be given by assuming that this plotted point 86 selected by the designer or the like is a plotted point $\#P(x_p, y_p)$ on the x-y chromaticity coordinates.

Figure 53:
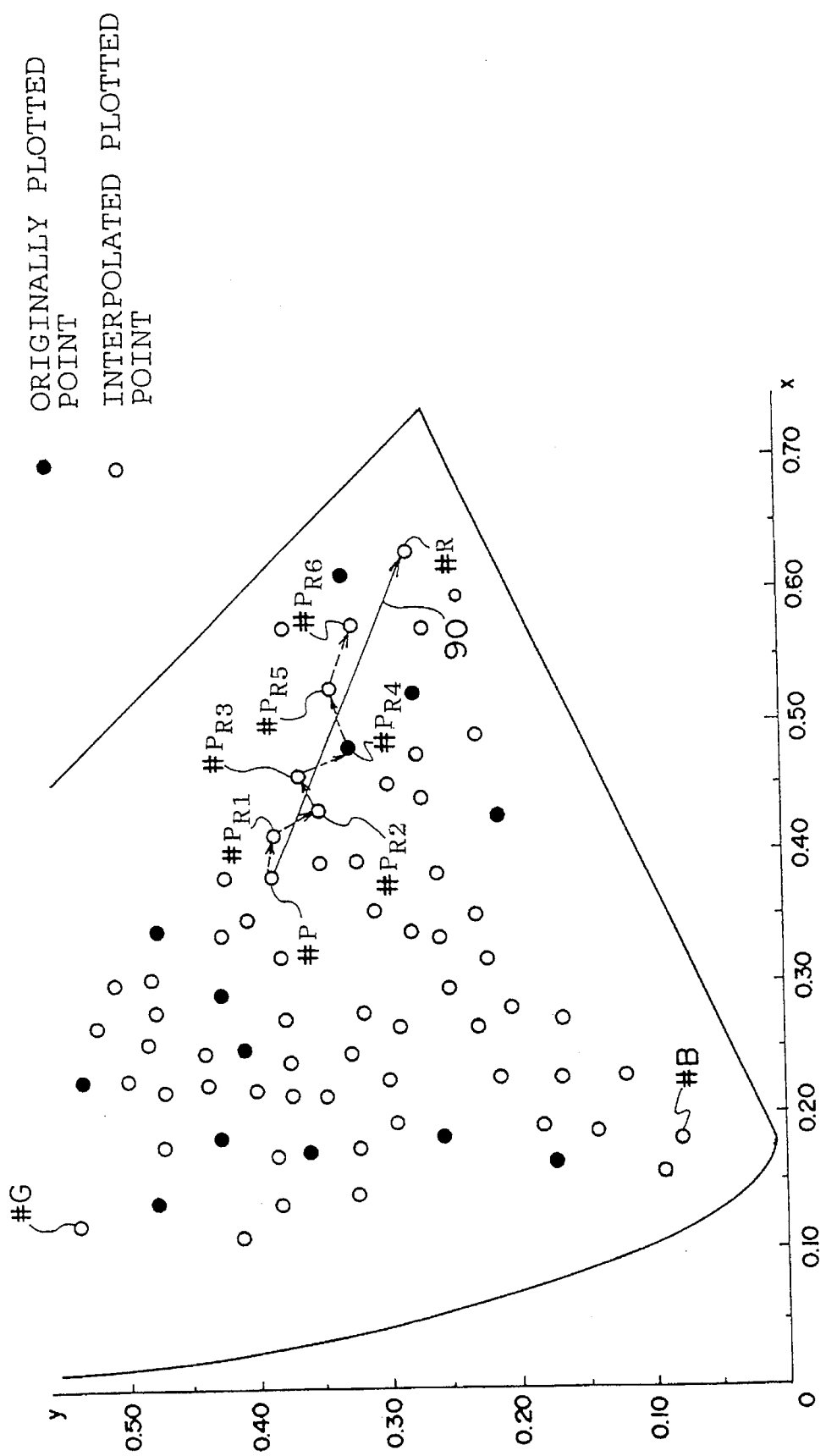
FIG. 53 is a diagram (chromaticity coordinate diagram) illustrating a process for imparting a tone to an instructed coating color.

In Step 620, a number of principal reference colors which allow the designer or the like to instruct tones are set on the x-y chromaticity coordinates. In this embodiment, as shown in FIG. 53, a plotted point #R specifying red, a plotted point #B specifying blue, and a plotted point #G specifying green, which are used as the so-called three primary colors, are set as the reference colors.

Figure 51:
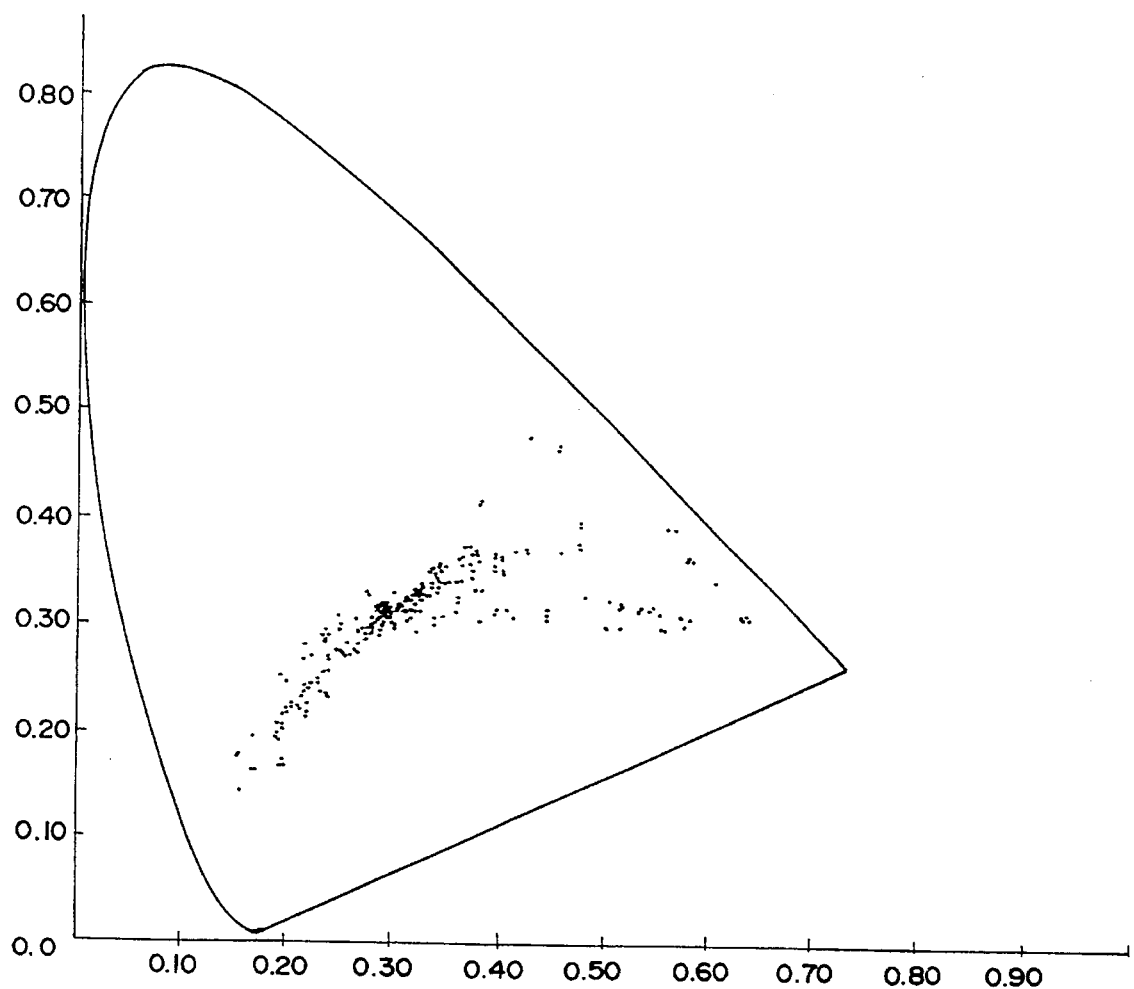
FIG. 51 is a distribution diagram of coating colors in which a plurality of actual coating colors are plotted on the chromaticity coordinate plane.

FIG. 51 shows color characteristics of main coating colors for an outer panel which are used in coating for vehicles. Each point in the drawing represents chromaticity of each coating color. Accordingly, since a rough area of regions of the colors to be controlled can be estimated, as for the predetermined reference colors mentioned above, it suffices if outermost plotted points are selected in such a way as to include this rough area.

Figure 52:
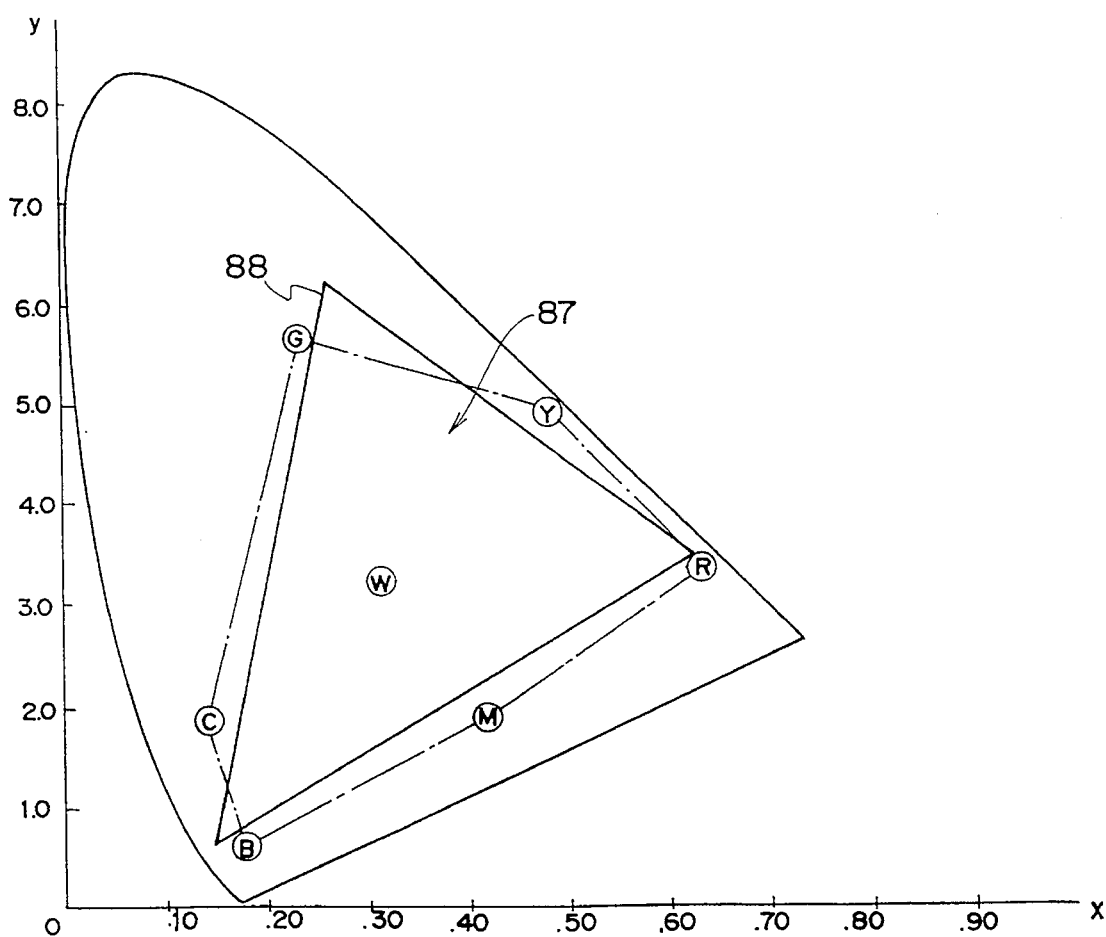
FIG. 52 is a diagram illustrating areas of color which can be formed on the chromaticity coordinate plane on a monitor and in a paint.

FIG. 52 shows a color area 87 which can be reproduced in color printing. This color area 87 is an area surrounded by reference colors R, G, B, C, M, Y, and BK. These reference colors are plotted as colors based on tristimulus values shown in Table 2 below. The colors shown in this Table 2 may be stored in advance as the reference colors. Generally speaking, the CRT 14 has a slightly larger monitor gamut (the range of color reproduction) 88 than the color area 87. This being the case, however, considering the fact that control results are outputted and evaluated not only on the CRT but also in the form of color hard copies, it is desirable to consider the color area within this range.

TABLE 2

|  | x | y | z |
|---|---|---|---|
| G (green) | 0.1790 | 0.4874 | 15.63 |
| Y (yellow) | 0.4323 | 0.4995 | 74.03 |
| R (red) | 0.6203 | 0.3395 | 14.78 |
| M (magenta) | 0.4808 | 0.2382 | 16.09 |
| B (blue) | 0.2281 | 0.1239 | 2.97 |
| C (cyan) | 0.1550 | 0.1977 | 18.92 |
| W (white) | 0.3135 | 0.3204 | 85.57 |
| BK (black) | 0.3410 | 0.2872 | 2.51 |

In an ensuing Step 622, the plotted point $\#P(x_p, y_p)$ selected by the designer or the like is read as a first presented color. In an ensuing Step 624, the instruction of a tone for causing the tone to be reflected on the plotted point #P is read. As for the instruction of the tone, a command corresponding to the designer's verbal expression, such as "provide a reddish tinge," to the coated color at the plotted point #P is entered through the keyboard 10.

The phrase "provide a reddish tinge" may be interpreted such that, in terms of the coordinate values on the x-y chromaticity coordinates with respect to the coating color, chromaticity changes from the plotted point #P toward the plotted point #R of the reference color (red). Accordingly, in an ensuing Step 626, a segment 90 connecting the plotted point #P and the plotted point #R is determined. At the same time, the plotted points located in the vicinity of the segment 90 are consecutively read as tendency points $\#P_{R1}$, $\#P_{R2}$, ..., starting with the plotted point #P, and the operation proceeds to Step 628. In Step 628, of these tendency points thus read, a tendency point which is closest to the presently instructed point (plotted point #P in this case) and is present in the direction of the tone (in the direction toward the plotted point #R) is selected. In an ensuing Step 630, a determination is made by an instruction by the designer or the like as to whether or not the degree of the tone is desired, and if the degree of the tone is at the desired coordinate position, the operation proceeds to Step 632.

Accordingly, the plotted points located in the vicinity of this segment 90 are repeatedly selected until the tone is reflected consecutively from the plotted point #P to the plotted point #R. As a result, in the case of "provide a reddish tinge," for instance, the plotted points are traced in the order of $\#P \to \#P_{R1} \to \#P_{R2}, \ldots$ as shown in FIG. 53, and the plotted point #P increases its reddish tinge in that order.

In an ensuing Step 632, a determination is made as to whether or not the provision of the desired tone has been completed for all the relevant colors. In other words, a determination is made as to whether or not the above processing has been completed with respect to the other colors such as blue and green. In this case, there are instances where a single-color tone is provided as in the above-described case, and instances where a tone is provided with respect to a plurality of colors. When a tone is provided to the plurality of colors, it suffices if the segment 90 is determined in Step 626 by assuming that the plotted point at the time when the tone of a predetermined color was determined is the presented color.

When the reflection of the tone is completed with respect to the plotted point #P concerning the initial presented color (original color), in Step 634, the chromaticity coordinate values of the determined plotted point are stored, and this routine ends.

Accordingly, as the reflectance $R^*(\alpha, \lambda)$ determined on the basis of the selected plotted point 86 is outputted (Step 618 in FIG. 45), the characteristic value vector VX corresponding to this reflectance $R^*(\alpha, \lambda)$ is determined, so that a coating color on which a desired tone is reflected can be obtained from the characteristic value vector VX. Therefore, it is possible to generate a desired coating color in a method easily understandable manner in tune with the sense of the designer.

Here, when coated surfaces are expressed, there are cases where a material texture is used in conjunction with the coating color. There are many phrases which express the types of material of the coated surfaces, and are typically classified into four types as shown in [States of Material] below. These states of material are important factors in determining the qualities of the coated surfaces.

[States of Material]

(1) Basic material texture: a mica texture, a metallic texture, and a solid texture (2) Diffuse reflection: a flip-flop texture (a term expressing the difference between a light place and a dark place)

(3) Mirror reflection: a glossy texture and a lustrous texture (4) Others: a texture of depth and a transparent texture Accordingly, in the embodiments that follow, a coating color which is affected by the type of material on the basis of the design sense is reproduced. Since these embodiments are arranged in a manner similar to those of the above-described embodiments, identical portions will be denoted by the same reference numerals, and a detailed description thereof will be omitted.

In an eighth embodiment, a coating color which is affected by the basic material texture that is expressed sensuously as the mica texture, the metallic texture, and the solid texture is reproduced. In this embodiment, a metallic material $x_{met}$ and a mica material $x_{mic}$ are further added to the characteristic value vector $VX=(x_1, x_2, \ldots, x_e)$ for determining a coating color used in the above-described embodiments, and a new characteristic value vector VeX shown in the following Formula (40) is defined.

$$VeX=(x_1[q_1], x_2[q_2], \ldots, x_e[q_e], x_{met}[q_{met}], x_{mic}[q_{mic}]) \quad (40)$$

In this embodiment, a coating color affected by the basic material texture is reproduced, and, to simplify the description, it is assumed that the component materials and quantities thereof for reproducing the coating color itself have already been determined, and the composition and the like of a desired coated surface are calculated which can be formed by varying a quantity $q_{met}$ of the metallic material $x_{met}$ and a quantity $q_{mic}$ of the mica material $x_{mic}$ in a state in which the quantities $q_i$ of the component materials $x_1, x_2, \ldots, x_e$ determining the coating color are fixed.

When an unillustrated power switch of the color reproducing apparatus is turned on, and the main routine (see FIG. 34) for reproducing a coating color is executed, normalized values are set (Step 500). Specifically, the operation proceeds to Step 540 shown in FIG. 54 to determine the characteristic value vector VeX to which the metallic material $x_{met}$ and the mica material $x_{mic}$ are added, by using the characteristic value vector VX based on the component materials $x_i$ such as color materials used in the color-material mixing apparatus 20.

In an ensuing Step 542, in the same way as in the first embodiment, the metallic quantity $q_{met}$ is appropriately divided into [P+1] parts by a boundary value $q_{metB}$ ($1 \leq B \leq P$) and the quantity of mica $q_{mic}$ by a boundary value $q_{micC}$ ($1 \leq C \leq P$). As a result, the metallic material $x_{met}$ and the mica material $x_{mic}$ are developed into P quantities in which their quantities increase or decrease in stages.

It should be noted that a setting is provided such that the sum of the metallic quantity $q_{met}$ and the quantity of mica $q_{mic}$ becomes a fixed quantity as shown in the following Formula (41):

$$q_{metB}+q_{micC}=\rho \text{ (constant)} \quad (41)$$

$$\rho=q_{met1}>q_{met2}>\ldots>q_{metp}=0$$

Accordingly, the number of combinations of the characteristic value vectors VeX due to these quantities $q_{metB}$ and $q_{micC}$ becomes $P^2$.

In an ensuing Step 544, each of the $P^2$ characteristic value vectors $VeX_h$ ($h=1, 2, \ldots, P^2$) is determined. Namely, each characteristic value vector $VeX_h$ at a time when the respective quantities of the metallic material $x_{met}$ and the mica material $x_{mic}$ are consecutively varied is determined.

In an ensuing Step 546, a paint is produced which is obtained by mixing the color materials and the like on the basis of the quantities of the components materials of the characteristic value vectors $VeX_h$ determined. The reflectance $R_h(\alpha, \lambda, VeX_h)$ of the coated surface of a plate coated with the produced paint is determined by actual measurement. Accordingly, $P^2$ samples can be generated as shown in Table 3 below.

TABLE 3

| No. | Metallic Material | Mica Material | Reflectance | Material Texture |
|---|---|---|---|---|
| 1 | $\rho = q_{met1}$ | $q_{mic1} = 0$ | $R_1(\alpha, \lambda, VeX_1)$ | metallic |
| 2 | $q_{met2}$ | $q_{mic2}$ | $R_2(\alpha, \lambda, VeX_2)$ | ⇕ |
| . | . | . | . | |
| . | . | . | . | |
| . | . | . | . | |
| $P^2$ | $0 = q_{metp}$ | $q_{micp} = \rho$ | $R_{p2}(\alpha, \lambda, VeX_{p2})$ | mica |

Table 3 above shows that a higher-ranking mixture (the smaller the number) gives a stronger metallic texture, and a lower-ranking mixture (the larger the number) gives a stronger mica texture.

Furthermore, as already described in the third embodiment, if more detailed relations of correspondence are determined by interpolation on the basis of the relations of the aforementioned $P^2$ samples, it is possible to select a more detailed metallic texture and mica texture.

When the processing of setting normalized values is thus completed, the new reflectance $R^*(\alpha, \lambda)$ desired by the designer or the like is read (Step 600 in FIG. 34), and a new characteristic value vector VeX* $(x_1^*, x_2^*, \ldots, x_e^*, x_{met}, x_{mic})$ with respect to the new reflectance $R^*(\alpha, \lambda)$, i.e., the quantities of component materials such as metallic material and mica, are calculated (Step 700 in FIG. 34). Consequently, signals representing the characteristic value vector VX* (mixture) are outputted to the color-material mixing apparatus 20 (Step 800 in FIG. 34), and the paint is produced by the color-material mixing apparatus 20, thereby making it possible to fabricate a coated object such as a coated plate having a desired reflectance $R^*(\alpha, \lambda)$.

A description will be given of the division of the quantities of the specific metallic material $x_{met}$ and mica material $x_{mic}$ by using the component materials of the already existing coating color A used in the fourth embodiment. It should be noted that when the quantities of metallic material $x_{met}$, the mica material $x_{mic}$, and all the component materials determining the color are set as a quantity $q = q_1 + q_2 + \ldots + q_e$, the quantity q is fixed. This quantity q becomes 32.93 g, as shown below.

$q = 11.70 + 6.69 + 14.54 = 32.93$ (g)
(tinting black) (blue black) (indanthrene blue)

Meanwhile, the quantities $q_{met}, q_{mic}$ are divided appropriately. Here, they are varied in the order of 0, 10, ..., 50 (g), respectively. As a result, a total of $6^2 = 36$ samples can be produced, as shown in [State C] below.

[State C]

$(q_{met}, q_{mic})$ = (0, 0),
= (0, 10),
= (0, 20),
.
.
.
= (50, 50),

Although, in the above, a coating color based on the basic material texture is reproduced by allowing the metallic texture and the mica texture to be reflected, it is also possible to reproduce a coating color which is affected by the basic material texture which sensuously expresses the mica texture, metallic texture, and solid texture. Namely, the solid texture is included in the above-described material texture.

Figure 55:
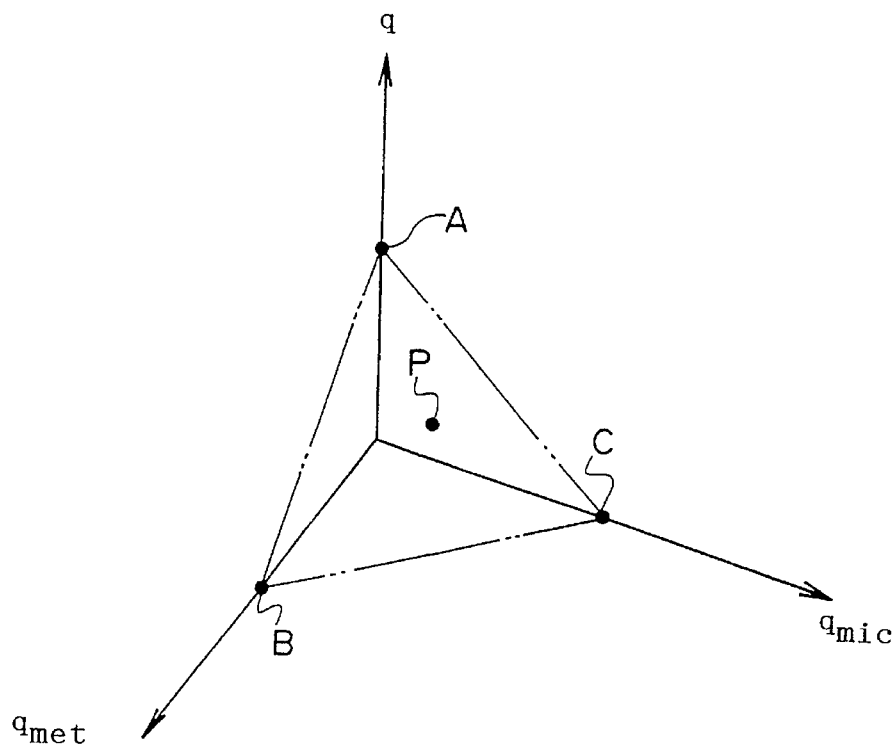
FIG. 55 is an image diagram illustrating a three-dimensional space of a coordinate system having as axes quantities of component materials governing a coating color, a quantity of metallic material, and a quantity of mica material.

In this case, as shown in FIG. 55, it suffices if the case is considered in a three-dimensional space of a coordinate system in which the quantity q of all the component materials determining the coating color, the metallic quantity $q_{met}$, and the mica quantity $q_{mic}$ are set as axes.

Next, the following formulae are used instead of Formula (41) above.

$$q = q_1 + q_2 + \ldots + q_e$$

$$q + q_{metB} + q_{micC} = \rho \text{ (constant)}$$

$$q \geq 0, q_{metB} \geq 0, q_{micC} \geq 0$$

Figure 56:
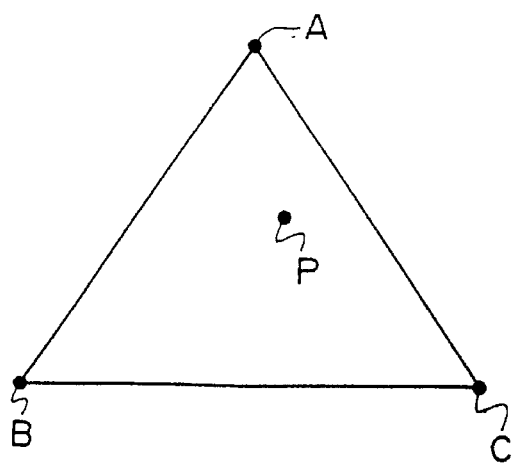
FIG. 56 is a diagram illustrating a region where each quantity is variable.

Since the quantities q, $q_{met}$, and $q_{mic}$ correspond to the solid texture, metallic texture, and mica texture, respectively, as shown in FIG. 55, if a point P(x, y, z) on a triangle (see FIG. 56) having a point A($\rho$, 0, 0), a point B(0, $\rho$, 0), and a point C(0, 0, $\rho$) as apexes is moved, it is possible to control the solid texture, the metallic texture, and the mica texture while allowing them to be interrelated to each other. In this case, it suffices if this triangle is divided appropriately, the points are present in such a manner as to be dispersed at appropriate positions on the triangle, and samples concerning the respective points are produced.

It should be noted that, although, in the eighth embodiment, samples are produced in the processing of setting normalized values, the metallic quantity $q_{met}$ and the mica quantity $q_{mic}$ may be determined after the respective quantities of the component materials determining the coating color are determined. In this case, it suffices if the aforementioned triangle (see FIG. 56) is displayed on the CRT 14 to allow desired positional coordinates to be inputted.

Next, a description will be given of a ninth embodiment. In the ninth embodiment, a coating color which is affected by diffuse reflection which is sensuously expressed as flip-flop texture is reproduced. This flip-flop texture is sometimes expressed as the modulation of light and darkness, and is conceivably dependent mainly upon the varied-angle characteristic (a change in the reflectance or brightness Y due to the varied angle). Accordingly, in this embodiment, the characteristic value vector VeX which includes the metallic material $x_{met}$ and the mica material $x_{mic}$, which are bright materials, are used (see Formula (40)).

Figure 57:
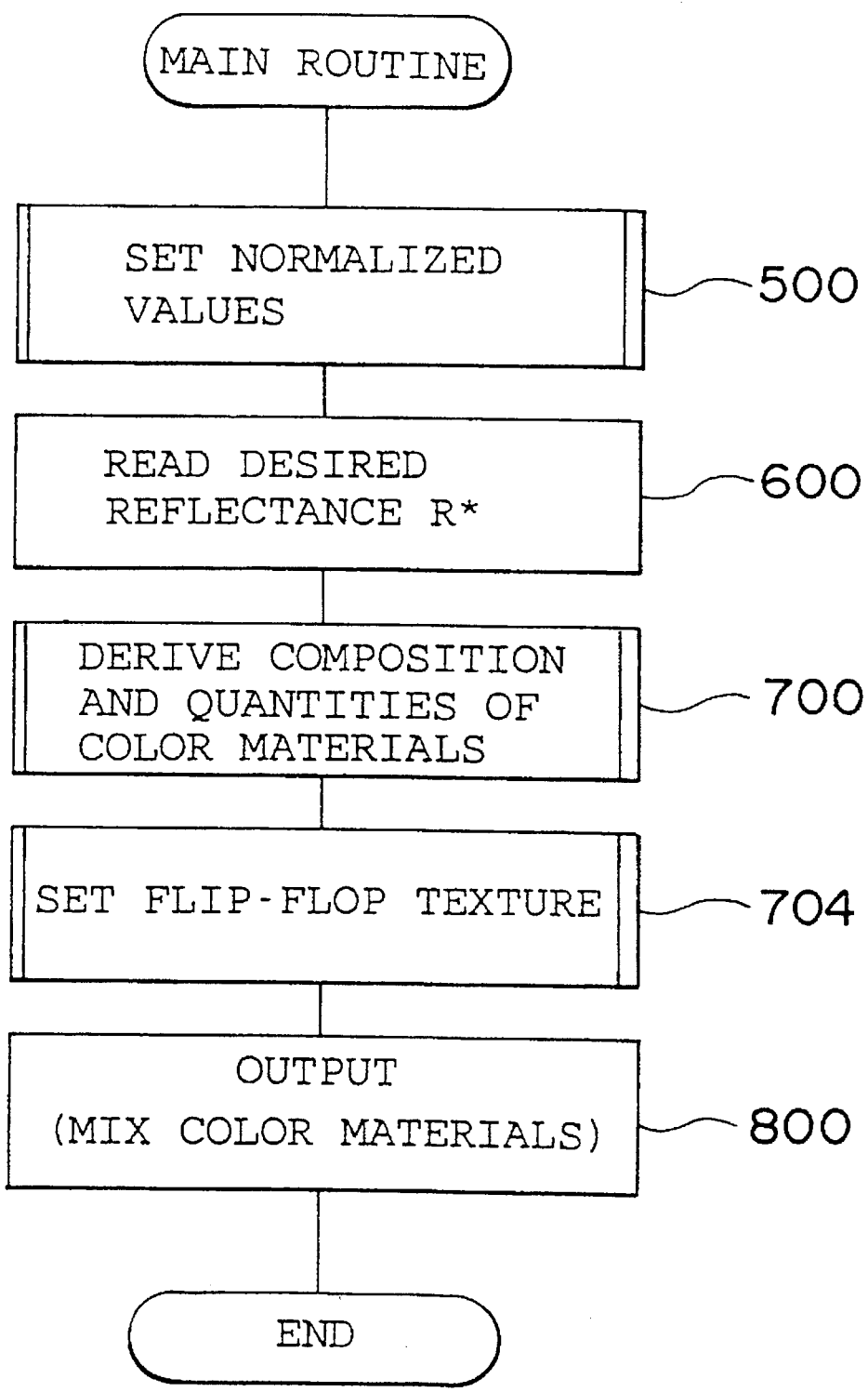
FIG. 57 is a flowchart illustrating a main routine for obtaining a coating color having a flip-flop texture in accordance with a ninth embodiment.

Next, a description will be given of the operation of this embodiment. When an unillustrated power switch of the color reproducing apparatus is turned on, a main routine (see FIG. 57) for reproducing a coating color is executed, and normalized values are set (Step 500). Then, a new reflectance $R^*(\alpha, \lambda)$ desired by the designer or the like is read (Step 600), and a new characteristic value vector VX* (quantities of the component materials) corresponding to this new reflectance $R^*(\alpha, \lambda)$ is computed (Step 700). In an ensuing Step 704, the characteristic value vector VeX on which the flip-flop texture is reflected is determined, and a signal representing this characteristic value vector VeX is outputted to the color-material mixing apparatus 20 (Step 800). The paint is produced at a mixing ratio based on the characteristic value vectors by the color-material mixing apparatus 20, so that it is possible to fabricate a coated object such as a coated plate having a desired reflectance (coated color) on which the flip-flop texture has been reflected.

Figure 58:
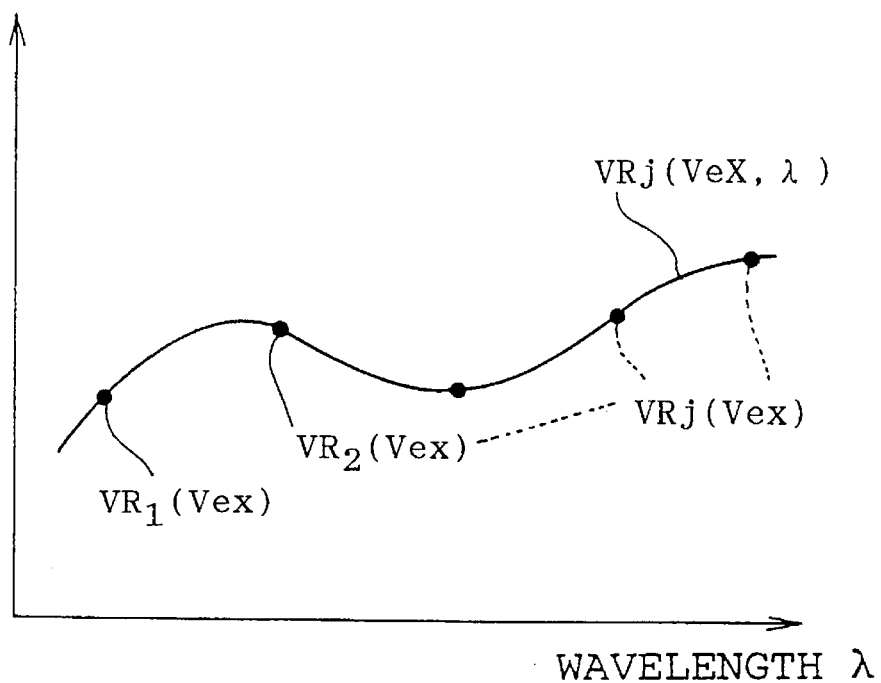
FIG. 58 is a diagram concerning a reflectance and illustrates a process for obtaining the reflectance.
Figure 60:
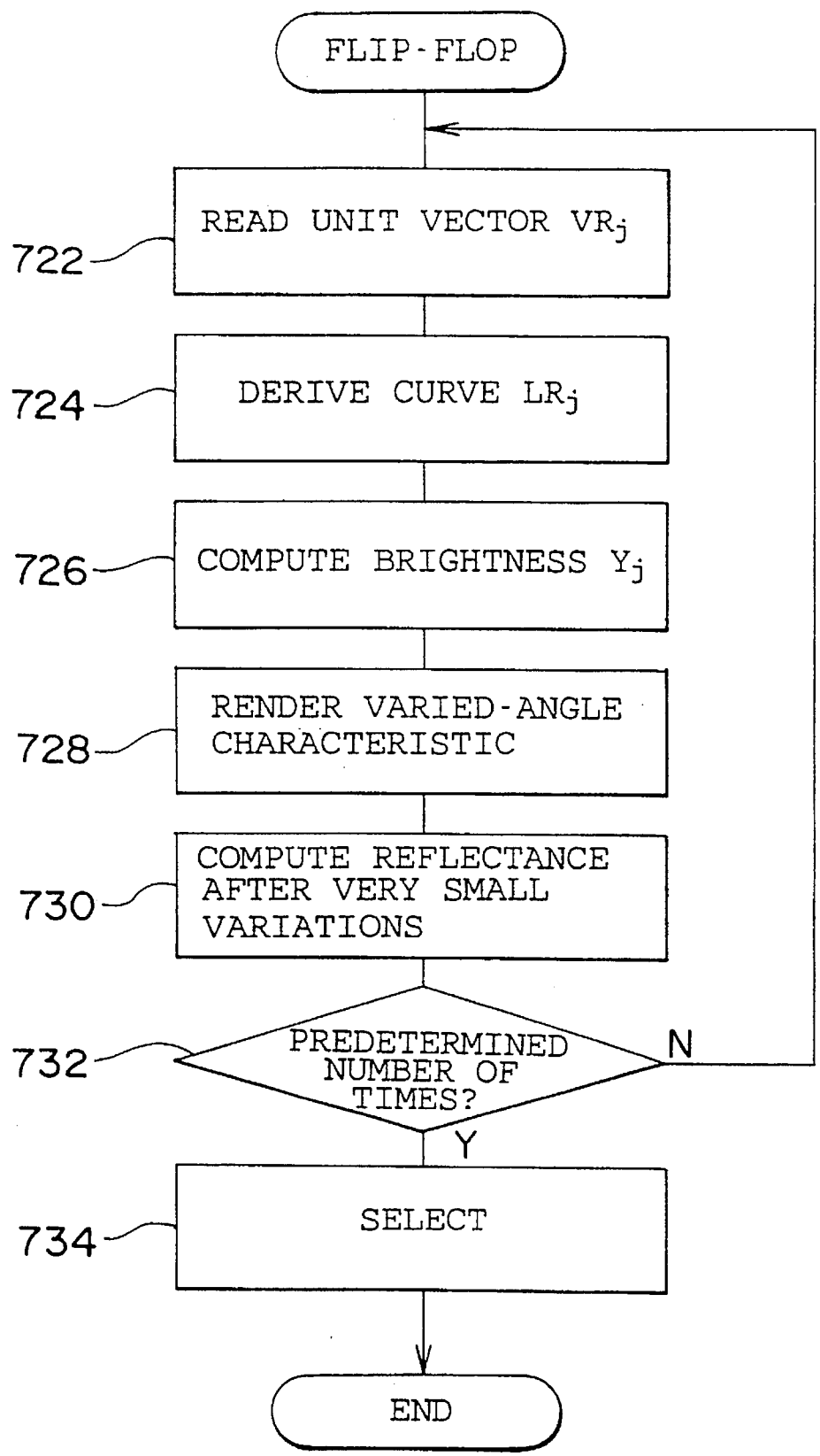
FIG. 60 is a flowchart illustrating the flow of processing for obtaining a coating color having a flip-flop texture in accordance with the ninth embodiment.

In Step 704 above, the flip-flop processing routine shown in FIG. 60 is executed. The reflectance $R(\alpha, \lambda)$ of the coated surface is approximated from discrete points with respect to wavelengths based on unit vectors $VR_1(VEX)$, $VR_2(VEX)$, ..., $VR_n(VeX)$. Accordingly, in Step 722 in FIG. 60, the unit vectors $VR_j$ are read. In an ensuing Step 724, a curve $LR_1(VEX, \lambda), LR_2(VeX_1, \lambda), \ldots, LR_n(VeX, \lambda)$ in which the discrete points of these unit vectors $VR_j$ are connected by interpolation, as shown in FIG. 58, is determined. If the characteristic of a predetermined wavelength band is thus determined, the brightness $Y_j$ is determined from Formula (42) below, so that the brightness for each varied angle $\alpha$ is determined.

$$Y_j = \frac{1}{k} \int_\lambda LR_j(\alpha, \lambda, VeX) \cdot I(\lambda) \cdot \bar{y}(\lambda) \, d\lambda \qquad (42)$$

where $k = 100 \cdot \int \{I(\lambda) \bar{y}(\lambda) d\lambda\}$, $\bar{y}(\lambda)$: CIE color mating function $I(\lambda)$: spectral distribution of the light source In an ensuing Step 728, the varied-angle characteristic obtained from the brightness $Y_j$ determined in Step 726 is rendered on the CRT 14. Namely, since the brightness $Y_j$ represents brightness for each varied angle, if points plotted on the coordinate plane with the varied angle $\alpha$ as the abscissa and the brightness $Y_j$ as the ordinate are connected by a free curve by means of interpolation, it is possible to render the brightness in the direction of the varied angle, i.e., the varied-angle characteristic.

Figure 59:
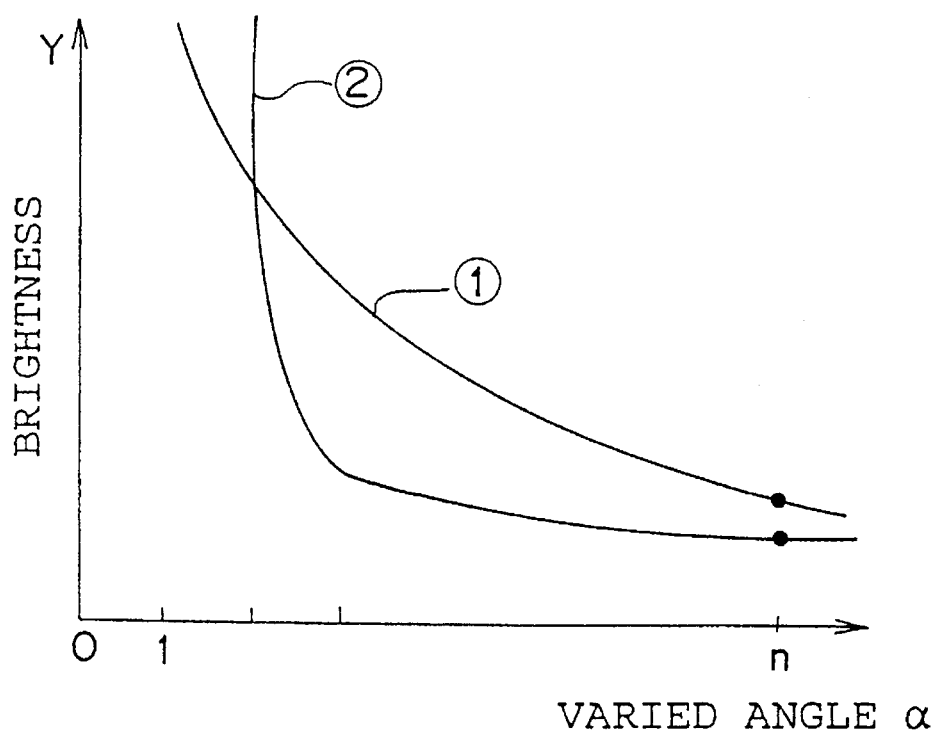
FIG. 59 is a diagram illustrating varied-angle characteristics.

FIG. 59 shows characteristic curves ① and ② of different varied-angle characteristics. As can be appreciated from the drawing, the characteristic curve ③ shows a marked difference between light and darkness as compared to the characteristic curve ①, and therefore gives a more pronounced flip-flop texture.

In an ensuing Step 730, the reflectance $R(\alpha, \lambda)$, in which the quantities of predetermined or appropriate component materials among the component materials of the characteristic value vectors $VeX$ are varied by small amounts, is determined. In an ensuing Step 732, a determination is made as to whether or not the above processing has been completed a predetermined number of times (e.g., five times), and the above processing is executed repeatedly. Consequently, a plurality of varied-angle characteristics are rendered. In an ensuing Step 734, the user such as the designer selects a characteristic curve having a desired degree of flip-flop texture by referring to the rendered characteristic curves, and this routine ends. Accordingly, since the characteristic value vector $VeX$ corresponding to this characteristic curve is determined easily, it is possible to fabricate a coating color exhibiting desired flip-flop texture on the basis of the characteristic value vector $VeX$.

As described above, it is not easy to estimate virtual flip-flop texture even with the varied-angle characteristic curve rendered on the CRT 14 for obtaining a coating color having a desired flip-flop texture. Therefore, if the coating color having the selected degree of flip-flop texture is displayed as a shaded figure of a semicylindrical shape after the selection of the varied-angle characteristic curve, and if judgment or the like of a gradation due to the display of this shaded figure is provided, it is possible to impart a visual judgment.

In the above, a description has been given of a case where a coating color is formed in which desired flip-flop texture is obtained by selecting a curve of desired flip-flop texture from varied-angle characteristic curves rendered on the CRT 14; however, the present invention is not limited to the same. For instance, coated plates having a plurality of different degrees of flip-flop texture may be formed in advance as samples, and selection may be made therefrom. If a need is expressed by the designer or the like to cope with sensuous expressions such as "a color having a greater degree of flip-flop texture," it suffices if a plurality of varied-angle characteristic curves are determined in the above-described manner, and characteristic value vectors having greater degrees of flip-flop texture are selected consecutively.

Next, a description will be given of a 10th embodiment. In the 10th embodiment, a coating color which is affected by mirror reflection that is sensuously expressed as the glossy texture or lustrous texture is reproduced.

Figure 54:
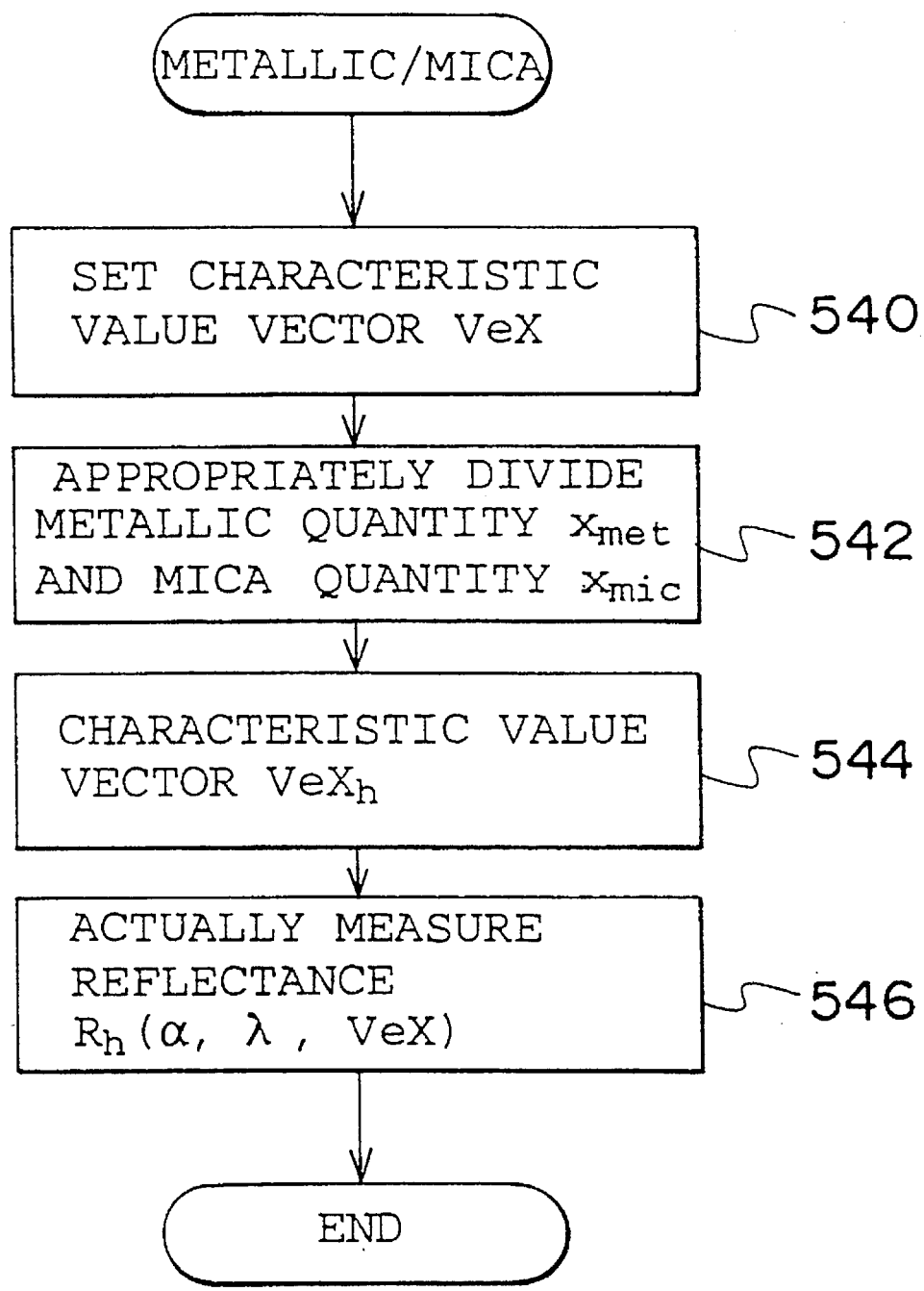
FIG. 54 is a flowchart illustrating processing for obtaining a coating color on which metallic material and mica material are reflected in accordance with an eighth embodiment.

The glossy texture or lustrous texture is mainly dependent on the surface finish (polishing or the like), but is also dependent on the thickness (quantity) of a clear coat. It suffices if the normalized-value setting routine in FIG. 54 is executed by setting the clear coat material as a component material $x_{ce}$ and by setting a quantity thereof as $q_{ce}$ and substituting the clear coat material $x_{met}$ for the metallic material $x_{met}$ and the mica material $x_{mic}$ in the above-described eighth embodiment. In this case, the quantity $q_{ce}$ is divided into p parts as $q_{ce1} < q_{ce2} < \ldots < q_{cep}$, and reflectances thereof are determined. Accordingly, it is possible to produce P samples in the same way as in Table 3 above.

In a case where the quantity of the clear coat material $x_{ce}$ is varied, the quantities of the color materials and bright materials are fixed, and only the quantity of the clear coat material is varied. Generally, it is preferable to divide the quantity of the clear coat material of 0 to MAX (maximum value, e.g., 100 g) into 30 to 50 parts so as to produce samples. In addition, in accordance with an interpolation method similar to those of the first and third embodiments, it is possible to obtain a more detailed lustrous texture on the basis of the relationships of the aforementioned P samples.

Next, a description will be given of an 11th embodiment. In the 11th embodiment, a coating color which is affected by the states of material other than those mentioned above and which are expressed sensuously is reproduced. Senses felt by the designer and the like due to these other states of material mainly include a texture of depth. Such textures perceived by the designer or the like are related to reflectance characteristics and varied-angle characteristics. If relationships between such a texture and a reflectance can be known, the characteristic value vector is determined, so that it is possible to reproduce a coating color having a texture of depth. A detailed description will be given of a process for handing this texture of depth quantitatively.

The texture of depth is a sensuous expression used by a person who perceives an object surface. This texture of depth can be broadly classified into a texture of depth A which appears as if the object surface has a geometrically three-dimensional depth, a texture of depth B which appears as if the object surface has a virtually three-dimensional depth, and a texture of depth C which makes the viewer to associate it with high-grade qualities, such as by imparting him a sense of magnificence, a sense of splendid style, and a sense of awe. These textures, i.e., the texture of geometric depth A, the texture of virtual depth B, and the texture of depth C imparting high-grade qualities are mainly related to hue and material texture. The material texture referred to here is mainly due to the bright material. In an extreme case, one does not sense a depth in a chromium-plated surface. As a reason for this, it can be conjectured that since the chromium-plated layer gives only mirror reflection, the chromium-plated layer does not transmit information about such as the internal structure and effect.

Accordingly, the texture of depth is conceivably attributable to propagation of reflected light due to the internal structure of the object surface when visually observed. The form of reflection of this reflected light, if broadly classified, includes mirror reflection and diffuse reflection, as is known.

Figure 61:
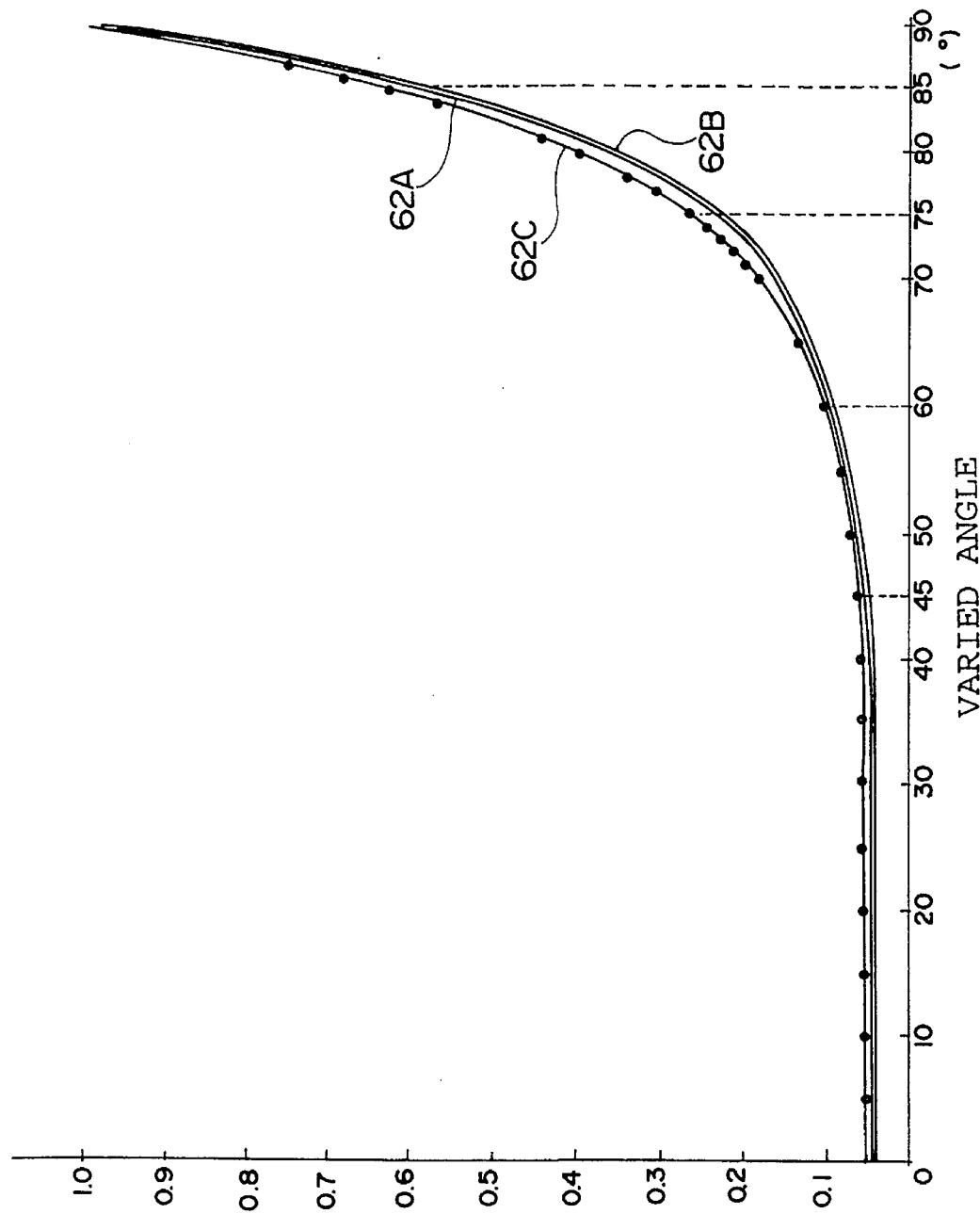
FIG. 61 is a diagram illustrating spectral reflectance characteristics for explaining mirror reflectance.

The mirror reflection is unrelated to the type of coated surface, and substantially conforms to Fresnel reflection. FIG. 61 shows, as experimental examples, a reflectance curve 62A of Metallic Color A4245 (gold), a reflectance curve 62B of Solid Color 3E5 (red), and an ideal reflectance curve 62C determined by computation on the basis of Fresnel's formula shown in Formula (43) below. Thus, it can be seen that, as a physical amount for expressing a texture of depth, mirror reflection is unrelated, and only diffuse reflection is involved. This diffuse reflection can be determined by measurement by the aforementioned gonio-spectrophotometer 24.

$$f = \frac{1}{2} \left\{ \left[ \frac{n_2\cos\theta_2 - n_1\cos\theta_1}{n_2\cos\theta_2 + n_1\cos\theta_1} \right]^2 + \left[ \frac{\cos\theta_2/n_2 - \cos\theta_1/n_1}{\cos\theta_2/n_2 + \cos\theta_1/n_1} \right]^2 \right\} \quad (43)$$

where f: Fresnel's reflectance (an intermediate value between an S-wave and a P-wave)

$n_1$: refractive index of air≅1.00

$n_2$: refractive index of a medium (1.567 in this embodiment)

$\theta_1$: incident angle $\theta_2$: reflection angle $n_1/n_2 = \sin\theta_1/\sin\theta_2$ (Snell's law)

Next, with respect to this texture of depth, a description will be given of the texture of depth B and the texture of depth C. First, a case is considered in which the coating color is uniform. There are cases where portions of a coated surface having an identical hue differ in the texture of depth. Since this difference in the texture of depth is considered to correspond to the difference in brightness due to the varied angle, the difference in the texture of depth can be expressed by the difference in the varied-angle characteristic (see FIG. 58).

Figure 62A:
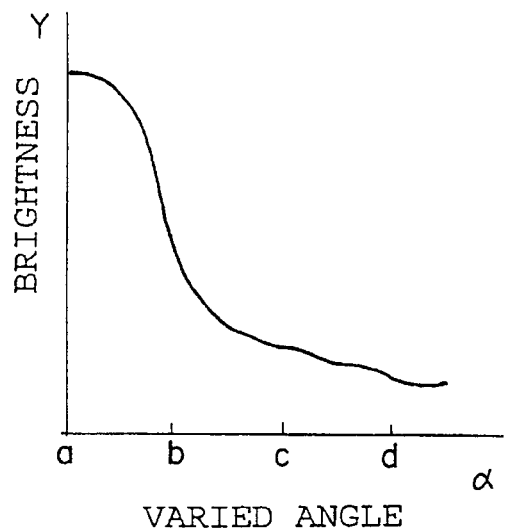
FIG. 62A is a diagram illustrating the varied-angle characteristic.
Figure 62B:
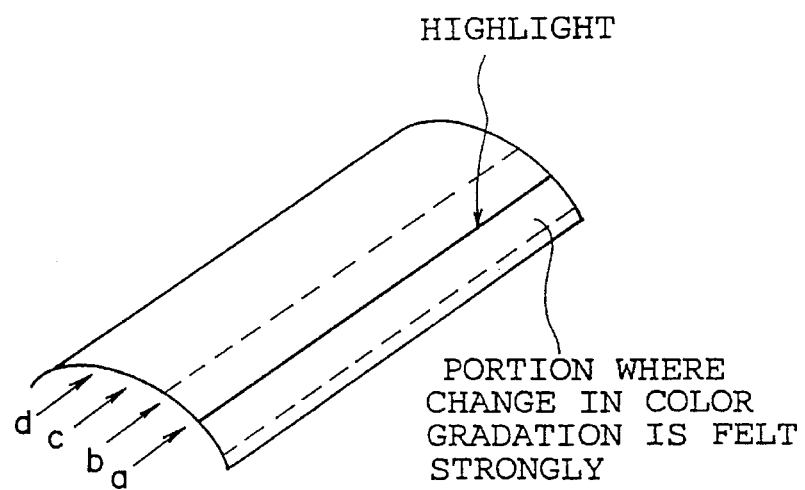
FIG. 62B is an image diagram illustrating a configuration of a coated surface to be measured.

Accordingly, an experiment, which is described below, was conducted to determine the conditions of the texture of depth with respect to a coated plate whose coating color was uniform. As an experimental object, a coated plate which had a texture of depth was prepared, and the coated plate was formed in a semicircular shape to permit the varied-angle characteristic of the coated plate to be measured univalently, as shown in FIG. 62B. Reflectances at a plurality of positions a, b, c, and d on the coated surface of this semicircular coated plate were measured. The position a was a highlight position of this coated plate, while positions b, c, and d were offset by predetermined varied angles, respectively, from the position a in a predetermined direction. On the basis of these measured reflectances, brightness $Y_j$ was calculated by using Formula (42) so as to determine the varied-angle characteristic (see FIG. 62A). At a position in the vicinity of the positions a and b, i.e., near the highlight (at a portion where the light and shade varied from the highlight a to b and c), a change in brightness became intense. Through this experiment, it was found that if the coated plate was viewed with an area at these positions a and b masked, the sense of the texture of depth was not felt at the positions c and d where the change in brightness was relatively flat. Consequently, it can be assumed that the sense of the texture of depth is felt in the vicinity of a highlight (at the portion where the light and shade varies from the highlight a to b and c).

Figure 63:
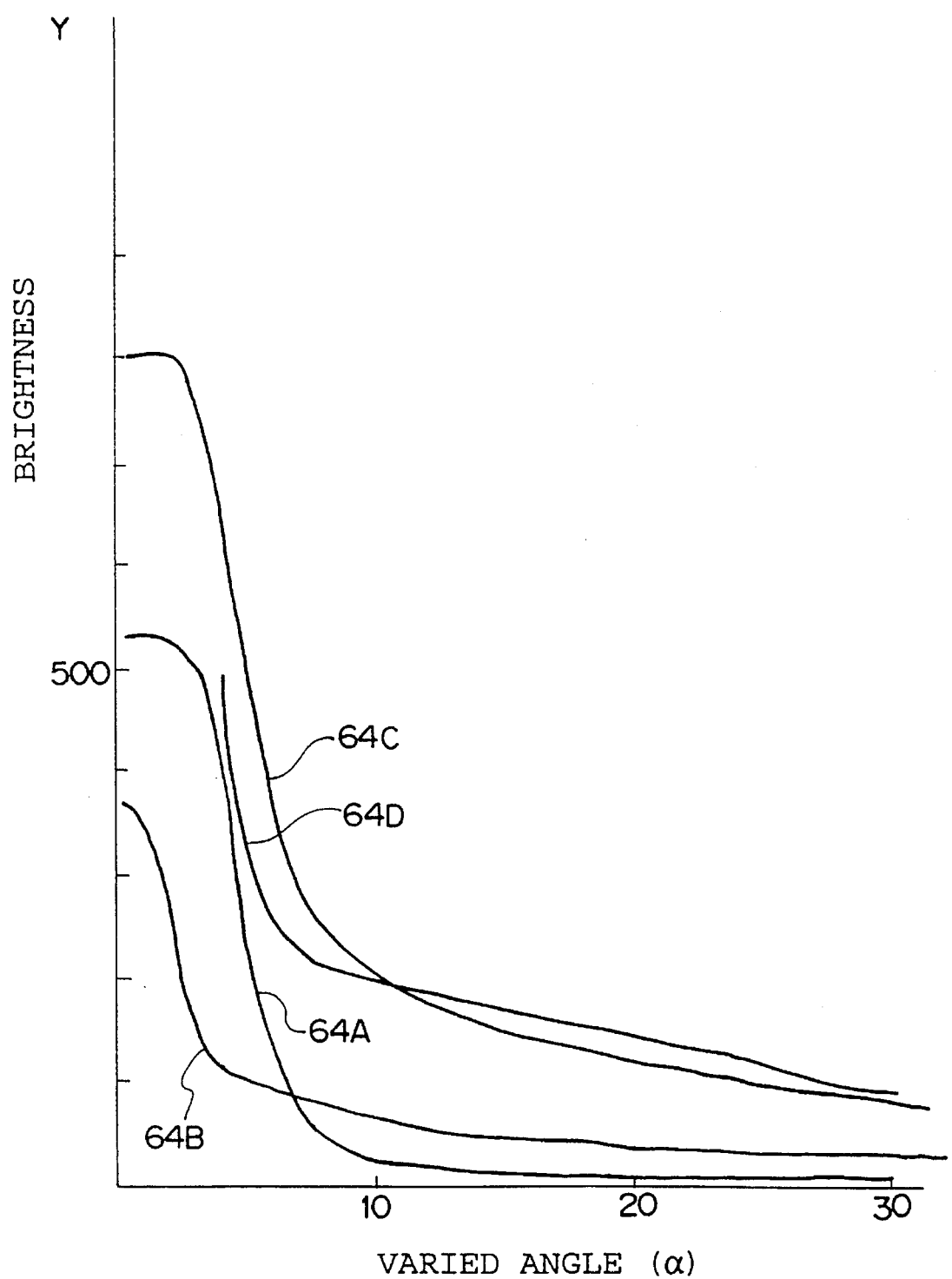
FIG. 63 is a diagram illustrating varied-angle characteristics.

FIG. 63 shows characteristics 64A, 64B, 64C, and 64D illustrating the relationship between the varied angle and brightness when the above-described experiment was conducted with respect to a plurality of coated plates. As can be appreciated from FIG. 63, it was found that in a case where the varied-angle characteristic of varied angle $\alpha \geq 5°$ was relatively small, and the change was slower, the sense of the texture of depth was more easily felt (characteristics 64A and 64B in FIG. 63). Meanwhile, the sense of the texture of depth was not felt in a case where the highlight (position a) shone brightly, the change in brightness between adjacent positions (between the positions a and b, and b and c, . . . ) was small, and the overall reflectance was high (characteristics 64C and 64D in FIG. 63). Accordingly, the following conditions (i) and (ii) of depth are set as the conditions of the texture of depth in a coated plate where the coating color is uniform:

(i) The brightness Y of an area with $\alpha \geq 5°$ excluding a highlight portion is not large.

(ii) The change in brightness of an area where the brightness Y is not large is slow.

From these conditions (i) and (ii), it can be estimated that the sense of the texture of "depth" is similar to the sense of "dark." However, it is not that the overall coated surface is uniformly dark, but a slow change in brightness is present there. This is similar to a situation in which one looks at the sun that appears vaguely in the form of streaks of light shining through layers of trees in a thicket of a dark forest, for instance. In this case, the sun may be compared to the highlight, and the light and shade of the trees in the forest to the brightness of the paint.

Next, a case will be considered where the coating color is varied by fixing the amounts of bright materials and the like determining material texture. Between bright colors and dark colors, the sense of the texture of depth is generally more easily felt in the case of the dark colors, as described above. Accordingly, if a paint consisting of color materials such as chromatic pigments is formed, and if the reflectance is determined at a varied angle (e.g., $\alpha=40°$), excluding mirror reflection, with respect to a plate coated with this paint, it is possible to obtain correspondence between the coating color and the reflectance. For instance, reflectances $R_0$ of such colors as indigo, dark blue, and black are low, while reflectances $R_0$ of such colors as white and yellow are high. Accordingly, it can be understood that the condition of the texture of depth concerning color is the following condition of depth (iii):

(iii) The reflectance of a diffuse reflection portion is low.

Thus, conditions of depth specifying the texture of depth are set. To quantify these conditions of depth (i), (ii), and (iii), a value $F_1$ is defined by using the following Formula (44):

$$F_1 = m_1 f_1 \left[ \int_\lambda \int_\alpha R(\alpha, \lambda, VeX) \cdot \bar{y}(\lambda) \, d\alpha d\lambda \right] \quad (44)$$

where wavelength: $380 < \alpha < 720$ varied angle: $5° \geq \alpha \geq 90°$ $m_1$: positive constant $f_1(x)$: decreasing function in a broad sense (when $x_1 < x_2$, $f_1(x_1) \geq f_1(x_2)$; hereafter referred to as the decreasing function)

This value $F_1$ becomes greater as the reflectance $R(\alpha, \lambda, VeX)$ becomes smaller, corresponding to an increase in the sense of the texture of depth.

Next, since a smooth continuous curve obtained by spline interpolation or the like by using the brightness $Y_1, Y_2, \ldots$ for each varied angle as points in Formula (42) above is a function of the varied angle $\alpha$, in this embodiment, the function $Y(\alpha)$ is defined as a function expressing the brightness Y with respect to the varied angle $\alpha$. A differential value $dY(\alpha)/d\alpha$ in which this function $Y(\alpha)$ differentiated with respect to the varied angle $\alpha$ expresses the gradient of the function $Y(\alpha)$.

With respect to the varied angle $\alpha$ ranging from 5° to 90°, N angles $\alpha_1, \alpha_2, \ldots, \alpha_n$ (5°$\geq \alpha_1 < \alpha_2 < \ldots < \alpha_n$=90°) are appropriately selected (e.g., 86 angles including 5°, 6°, ... , 89°, 90° in units of 1°). Differential values are determined with respect to each of the selected angles $\alpha_i$ by using Formula (45) below. Namely, the angle $\alpha_i$ can be determined freely, if measurement points ($\alpha_i$, $Y_i$) are plotted on two-dimensional coordinates with the varied angle $\alpha$ and brightness Y set as axes, and if the function $Y(\alpha)$ which becomes a smooth curve is obtained such as by minimizing square errors with respect to measurement points through approximation processing by spline interpolation or the like. This smooth curve can be differentiated, so that the differential values $a_i = dY(\alpha)/d\alpha$ can be determined.

$$a_i = \frac{dY(\alpha)}{d\alpha} \bigg|_{\alpha=\alpha_1} \quad (45)$$

By using the differential values $a_1, a_2, \ldots, a_n$ thus determined, a dispersion $\alpha_A^2$ and a mean value $\mu_A$ are determined by the following Formulae (46) and (47):

$$\sigma_A^2 = \frac{1}{N} \sum_{i=1}^{N} (a_i - \mu_A)^2 \quad (46)$$

$$\mu_A = \frac{1}{N} \sum_{i=1}^{N} a_i \quad (47)$$

Here, the fact that the change in brightness Y is slow means that the dispersion $\alpha_A^2$ is small, and that the absolute value $|\mu_A|$ of the mean value is small. Accordingly, the following amount shown in Formula (48) is defined.

$$F_2 = m_2 f_2(\sigma_A) + m_3 f_2(|\mu_A|) \quad (48)$$

where $m_2$, $m_3$: positive constants $f_2(x)$, $f_3(x)$: decreasing functions

Consequently, the greater the value $F_1$, the more the condition of depth (iii) is satisfied, and the more the texture of depth increases. In this way, the texture of virtual depth B and the texture of depth C appealing to the sense can be quantified.

Next, a description will be given of the texture of depth A. The fact that a person senses the presence of a geometrically three-dimensional depth in an object corresponds to the fact that that person perceives a perspective.

Figure 64B:
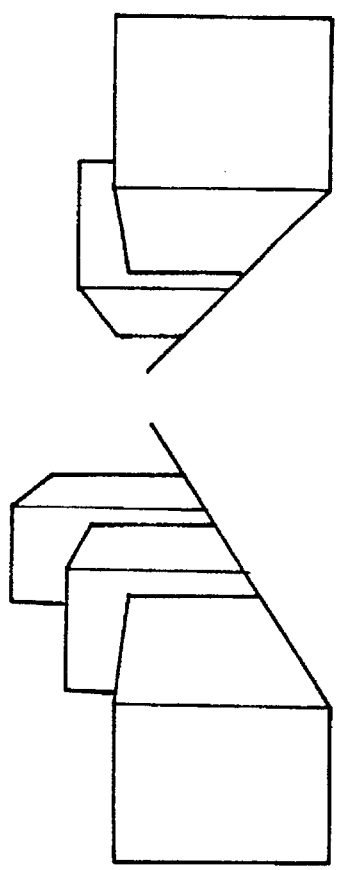
FIGS. 64A and 64B are image diagrams with and without a perspective of an image, respectively.
Figure 64A:
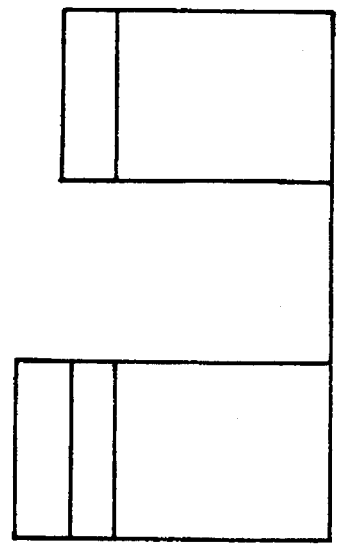

FIG. 64A shows an image without a perspective, while FIG. 64B shows an image in an accurate perspective.

Even if an accurate perspective is not provided as in FIG. 64A, it is possible to sense a texture of depth to a certain extent. For instance, when stars in the night sky are viewed, one will be able to feel a depth of the universe. The large moon appears to be closer than small stars. In addition, flickering stars may appear to be much closer, while bluish stars may be felt to be more distant than reddish stars.

When the case of a paint is considered, particles of a bright material are considered to correspond to the aforementioned stars. In the case of stars, experientially speaking, the greater the number of stars having different sizes, colors and, twinkling light, the more one will feel a depth. Accordingly, the more numerous the particle sizes, colors, and reflection characteristics the bright materials in the paint have, the more one will feel a depth.

Figure 65A:
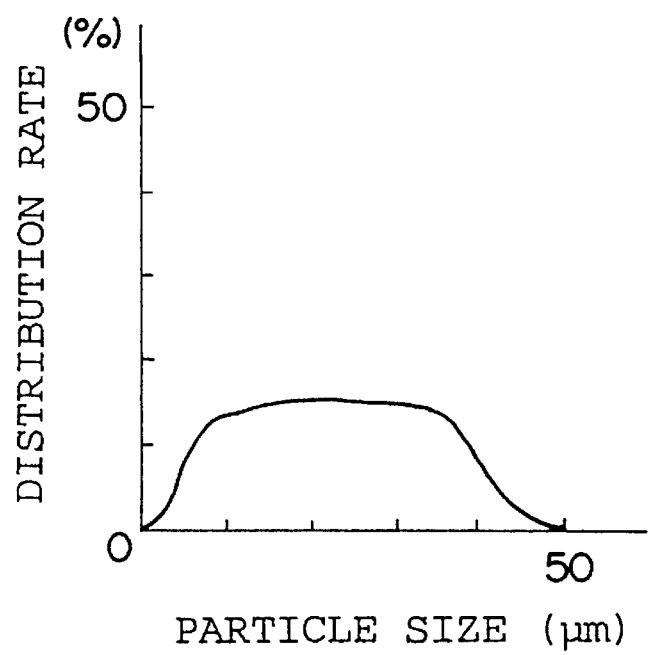
FIGS. 65A and 65B are diagrams illustrating characteristic curves of particle-size distributions of two bright materials, respectively.
Figure 65B:
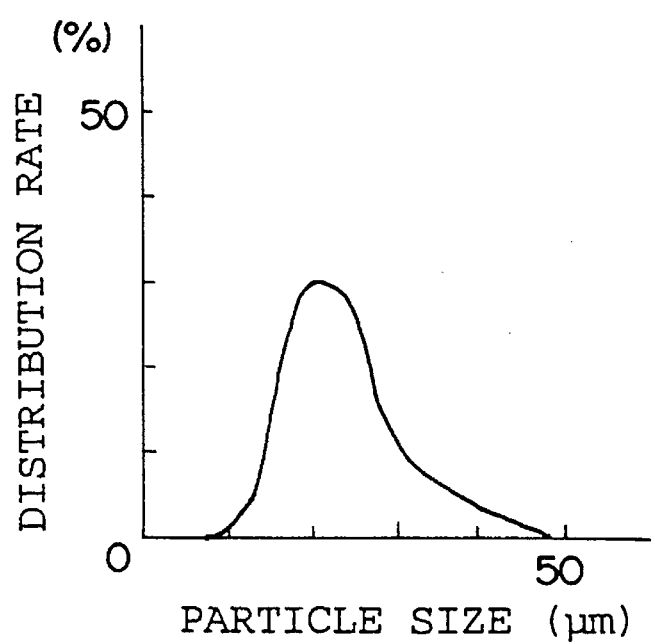

For example, if a comparison is made between two paints containing bright materials having different particle-size distributions as shown in FIGS. 65A and 65B, it can be said that the paint containing the bright material shown in FIG. 65B gives a greater sense of depth than the counterpart shown in FIG. 65A.

Accordingly, of bright materials $x_i$, the number of bright materials having a particle size $\xi$ (nm) is assumed to be $a_\xi$. For instance, the following [Example] is known as the range of particle size:

Example

Micro titanium yellow: 0.03 μm Silver plated glass flake: 10 to 40 μm Aluminum solid-solution flake red iron oxide: 10 to 40 μm Small-particle-size pearl: 15 μm or less Thus, various bright materials and their particle sizes are known, but their particle size may be considered in the range of 0 to 50 μm. The particle-size distribution can be determined easily by image analysis techniques.

Next, the dispersion $\sigma_g^2$ of the particle-size distribution is determined as in Formula (46) above, and it is assumed that the greater the value of the dispersion $\sigma_r^2$, the greater the sense of the texture of depth. Furthermore, although the dispersion $\sigma_r^2$ is determined on the basis of the particle-size distribution, dispersions $\sigma_C^2$, $\sigma_R^2$ are also determined with respect to the variation of color and the variation of the reflectance characteristic, and a value $F_3$ weighted by appropriate positive real numbers $m_4$, $m_5$, and $m_6$ is defined as shown in the following Formula (49):

$$F_3 = m_4 f_4(\sigma_r^2) + m_5 f_5(\sigma_C^2) + m_6 f_6(\sigma_R^2) \quad (49)$$

The texture of depth A can be quantified by this value $F_3$. Consequently, if the depth index F is determined by using this value $F_3$ as well as the values $F_1$, $F_2$ determined above, as shown in Formula (50) below, then each of the texture of depth A, the texture of depth B, and the texture of depth C can be quantified.

$$F = F_1 + F_2 + F_3 \quad (50)$$

where $f_4(x)$, $f_5(x)$, $f_6(x)$: increasing functions in a broad sense (if $x_1 < x_2$, then $f_i(x_1) \leq f_i(x_2)$ (i=4, 5, 6)) It is assumed that the greater the depth index F, the greater the depth.

Here, $f_1(x)$, $f_2(x)$, . . . are defined as in the following Formulae (51):

$$f_1(x) = f_2(x) = f_3(x) = 1/x$$

$$f_4(x) = f_5(x) = f_6(x) = x \quad (51)$$

As a result, the depth index F can be expressed by Formula (52) shown below.

$$F = \frac{m_1}{f_1} + \frac{m_2}{\sigma_A} + \frac{m_3}{|\mu_A|} + m_4 \sigma_r^2 + m_5 \sigma_C^2 + m_6 \sigma_R^2$$

where, $$f_1 = \int_\lambda \int_{\alpha=25} R(\alpha, \lambda, VeX) \cdot \bar{y}(\lambda) \, d\alpha d\lambda$$

$$380 \leq \lambda \leq 720$$

In addition, as for the dispersion $\sigma_C^2$, a coating color based on a bright material is set as coordinate values $_c(L_1^*, a_1^*, b_1^*)$, $_c(L_2^*, a_2^*, b_2^*)$, . . . , in an Lab colorimetric system, a reference coating color is set as coordinate values $_{cw}((L_w^*, a_w^*, b_w^*)$, and coating colors $_{c1}, _{c2}, \ldots$ are defined in terms of deviations $\xi_1=|\varphi_w-\varphi_1|$, $\xi_2=|\varphi_w-\varphi_2|$, ... with respect to white. Hereafter, the deviation $\xi$ will be expressed as the coating color $\xi$. It is assumed that the number of bright materials used in a coating color $\xi_i$ is $a_i$, and the dispersion $\sigma_C^2$ is determined in the same manner as in Formula (46).

It should be noted that, in this embodiment, white in which $L_w^*=100$, $a_w^*=b_w^*=0$ is used as a reference coating color $\varphi_w$. Also, the color of the bright material as a single substance can be measured by spectrophotometric colorimetry of the surface consisting of the bright material alone.

As for the dispersion $\sigma_R^2$, the brightness Y, which is calculated by using Formula (42) above from the reflectance when the varied angle of a coated surface made of a bright material i is 40°, is set as the brightness $\xi_i$. At this time, values expressing positions in a permutation in which brightness $\xi_1$, $\xi_2$, ... are rearranged in an ascending order are set as values $n_1$, $n_2$, ..., ($n_1 \leq n_2 \leq$ ... ). If the number of bright materials having the brightness of the value $n_i$ is $\alpha_i$, the dispersion $\sigma_R^2$ can be determined in the same way as in Formula (46).

Next, a description will be given of the operation of this embodiment. The following description will be given by assuming that the reflectance of a coated surface with respect to a characteristic value vector VeX in which the coating color or material is fixed is $R(\alpha, \lambda, \text{VeXi})$, and that the depth index with respect to this characteristic value vector VeX is $F_i$. To simplify the description that follows, correspondences are determined between reflectances and depth indexes by fixing chromatic pigments or the like and varying the quantities of bright materials.

Figure 66:
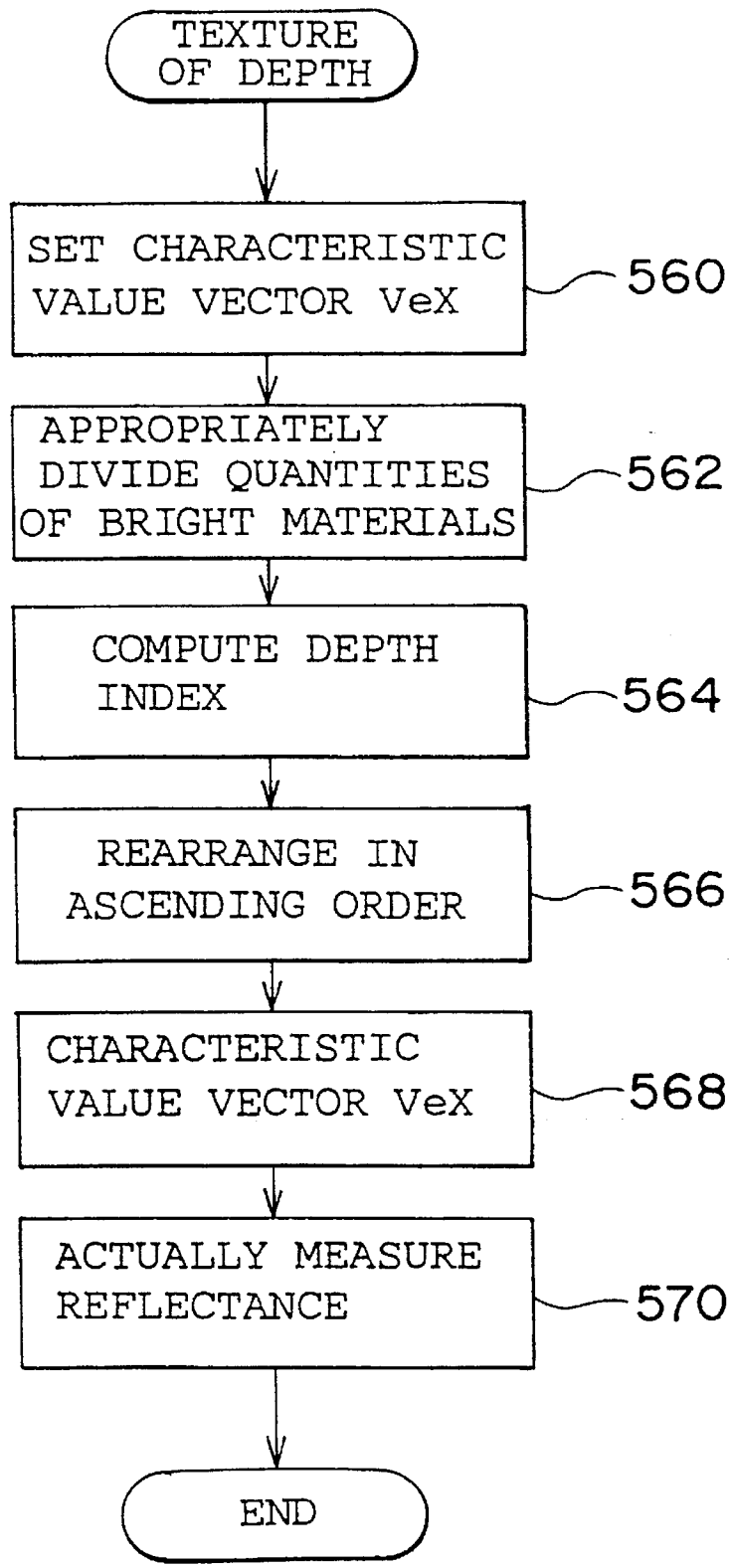
FIG. 66 is a flowchart illustrating the flow of processing for obtaining a coating color having a texture of depth in accordance an 11th embodiment.

In Step 560 in FIG. 66, characteristic value vectors VeX based on component materials $x_i$ including the color materials and bright materials used in the color-material mixing apparatus 20 are determined.

In an ensuing Step 562, in the same way as in the above-described embodiments, the quantities of metallic material and the mica material are appropriately divided by a boundary value into [P+1] parts. Consequently, each of the bright materials including the metallic material and mica material is developed into P quantities in which the component quantity increases or decreases in stages. Therefore, the combinations of the characteristic value vectors VeX based on these component quantities become P combinations.

In an ensuing Step 564, the respective P characteristic value vectors $\text{VeX}_h$ (h=1, 2, ..., P) are determined. In other words, each of the characteristic value vectors $\text{VeX}_h$ when the quantities of the bright materials are consecutively varied is determined. In an ensuing Step 566, the depth index F described above is determined in correspondence with each of these characteristic value vectors $\text{VeX}_h$, and the depth indexes F are rearranged in order starting with a minimum value in an ensuing Step 568. As a result, characteristic value vectors of a plurality of coating colors having varying textures of depth are determined with respect to coating colors of an identical hue determined by these characteristic value vectors $\text{VeX}_h$.

In an ensuing Step 570, a paint is produced by mixing color materials and the like on the basis of the quantities of the component materials having the characteristic value vectors $\text{VeX}_h$ thus determined. The reflectance $R_h(\alpha, \lambda, \text{VeX}_h)$ of a plate coated with the produced paint is determined by actual measurement. Accordingly, as shown in Table 4 below, P samples can be produced, and correspondences can be obtained between the reflectances and depth indexes by fixing the chromatic pigments and varying the bright materials. Incidentally, the depth indexes in Table 4 are such that $F_1 \leq F_2 \leq$ ... $\leq F_p$.

TABLE 4

| Characteristic Value | Reflectance | Depth Index | Texture of Depth |
|---|---|---|---|
| $\text{VeX}_1$ | $R_1(\alpha, \lambda, \text{VeX}_1)$ | $R_1$ | small |
| $\text{VeX}_2$ | $R_2(\alpha, \lambda, \text{VeX}_2)$ | $F_2$ | ⇑ |
| . | . | . | ⇓ |
| . | . | . |  |
| $\text{VeX}_p$ | $R_p(\alpha, \lambda, \text{VeX}_p)$ | $F_p$ | large |

As described above, in accordance with the foregoing embodiments, coating colors or materials can be generated virtually on the CRT and can be selected prior to manufacturing actual objects (objects of various configurations coated with paints or the like thereon). In addition, since it suffices if a characteristic value vector is derived for the first time when a desired coating color is generated (selected), and if an actual object is manufactured on the basis of the characteristic value vector thus derived, it is possible to substantially reduce the cost required for manufacturing the actual object.

Although, in the above, a description has been given of a case where a coated plate having an identical hue and different textures of depth is formed, the present invention is not limited to the same, and may be applied to cases when a coating color is selected. In this case, if the depth indexes F are determined as described above after the determination of a coating color, and if only coating colors having textures of depth are displayed in the ascending order of the depth index F, it is possible to select a coating color having a desired color and a desired texture of depth among the coating colors having the displayed textures of depth. Further, if a need is expressed by the designer or the like to cope with sensuous expressions such as "a color with a texture of greater depth," it suffices if the depth indexes F are determined in the above-described manner after the determination of a coating color, and characteristic value vectors having greater depth indexes F are selected consecutively.

In a case where a finer indexing of the depth index is required to reproduce a subtle texture of depth, it suffices if relationships of correspondence are increased by interpolation referred to in the second and fifth embodiments.

In addition, a coating color may be reproduced as a color image by connecting to the color reproducing apparatus a color copying apparatus, which is based on a thermal transfer process, an ink-jet process, an electrophotographic process, a silver-halide photographic process, or the like for outputting color copy images using color data in the RGB colorimetric system or the like as input values.

What is claimed is:

1. A color reproducing device to which first data expressing a color expressed in a first colorimetric system is inputted, and which reproduces a color corresponding to the inputted first data and to be expressed in a second colorimetric system different than the first colorimetric system, comprising:

a measuring device measuring each of a predetermined number of colors reproduced by inputting a predetermined number of first data to said color reproducing device, and outputting a predetermined number of second data expressing a color expressed in the second colorimetric system;

estimating means for estimating relationships of interpolated correspondence expressing relationships between second data other than the measured second data and first data corresponding to the second data other than the measured second data, on the basis of a plurality of relationships of correspondence between the first data inputted to said color reproducing device and the measured second data; and selecting means for, after second data which is the same as or closest to data of a color to be reproduced is selected on the basis of the relationships of correspondence and the relationships of interpolated correspondence, selecting first data corresponding to the selected second data on the basis of the relationships of correspondence and the relationships of interpolated correspondence, wherein the selected first data is inputted to said color reproducing device, and said color reproducing device reproduces the color to be reproduced.

2. A color reproducing device according to claim 1, wherein the plurality of relationships of correspondence are nonlinear relationships.

3. A color reproducing device according to claim 1, wherein the first colorimetric system is an RGB colorimetric system, the second colorimetric system is an XYZ colorimetric system, the first data is data relating to at least one of a color material and a bright material, and the second data is data relating to tristimulus values.

4. An outputting device for outputting information for reproducing a color of a coated surface which is formed with one or a plurality of layers on an object to be coated and in which each of the layers is formed of at least one component material, comprising:

a color material mixing device to which characteristic values expressing respective quantities of all of the component materials forming the coated surface are inputted, and which generates a paint for forming the coated surface on the basis of the inputted characteristic values;

a measuring device measuring physical quantities expressing one of a spectral reflectance distribution and tristimulus values of each of a predetermined number of coated surfaces formed by coating on the object to be coated a paint which is generated by inputting to said color material mixing device a predetermined number of characteristic values in which at least one of the component material quantities is respectively different;

estimating means for estimating relationships of interpolated correspondence expressing relationships between physical quantities other than the measured physical quantities and characteristic values corresponding to the physical quantities other than the measured physical quantities, on the basis of a plurality of relationships of correspondence between the characteristic values inputted to said color material mixing device and the measured physical quantities;

selecting means for, after physical quantities relating to physical quantities of a paint color to be reproduced have been selected on the basis of the relationships of correspondence and the relationships of interpolated correspondence, selecting the characteristic values corresponding to the selected physical quantities on the basis of the relationships of correspondence and the relationships of interpolated correspondence; and outputting means for outputting the selected characteristic values as information for reproducing the color of the coated surface.

5. An outputting device according to claim 4, wherein the physical quantities relating to physical quantities of the paint color to be reproduced are physical quantities which are the same as or closest to physical quantities of the paint color to be reproduced.

6. An outputting device according to claim 4, wherein said color material mixing device generates the paint on the basis of the information outputted from said outputting means.

7. An outputting device according to claim 4, further comprising:

display means for reproducing and displaying the color of the coated surface on the basis of the information outputted from said outputting means.

8. An outputting device according to claim 4, wherein said selecting means determines coordinate values on a coordinate expressing colors of a predetermined colorimetric system with respect to each of the tristimulus values in the relationships of correspondence and relationships of interpolated correspondence, and sets a plurality of coordinate values among the determined coordinate values as reference color coordinate values for expressing reference colors, and consecutively selects, as the characteristic values corresponding to the physical quantities, the characteristic values corresponding to the coordinate values between the tristimulus values of the paint color to be reproduced and at least one of the reference color coordinate values.

9. An outputting device according to claim 8, wherein said color material mixing device generates the paint on the basis of the information outputted from said outputting means.

10. An outputting device according to claim 8, further comprising:

display means for reproducing and displaying the color of the coated surface on the basis of the information outputted from said outputting means.

11. An outputting device according to claim 4, wherein said selecting means determines varied-angle characteristics of the coated surface expressing flip-flop relationships between a varied angle which is a light-receiving angle varied during reception of light reflected from the coated surface and brightness at the varied angle, on the basis of the spectral reflectance distributions in the relationships of correspondence and in the relationships of interpolated correspondence, and selects the characteristic values corresponding to the determined varied-angle characteristics as the characteristic values corresponding to the physical quantities.

12. An outputting device according to claim 11, wherein said color material mixing device generates the paint on the basis of the information outputted from said outputting means.

13. An outputting device according to claim 11, further comprising:

display means for reproducing and displaying the color of the coated surface on the basis of the information outputted from said outputting means.

14. An outputting device according to claim 4, wherein said selecting means determines a particle-size distribution of each of the component materials for each of the characteristic values in the relationships of correspondence and the relationships of interpolated correspondence, and determines depth indexes expressing the depth of paint colors on the basis of the determined particle-size distributions and the spectral reflectance distributions in the relationships of correspondence and in the relationships of interpolated correspondence, and selects the characteristic values corresponding to the determined depth indexes as characteristic values corresponding to the physical quantities.

15. An outputting device according to claim 14, wherein said color material mixing device generates the paint on the basis of information outputted from said outputting means.

16. An outputting device according to claim 14, further comprising:

display means for reproducing and displaying the color of the coated surface on the basis of the information outputted from said outputting means.

* * * * *